(12) United States Patent
Kawabe

(10) Patent No.: US 10,322,530 B2
(45) Date of Patent: Jun. 18, 2019

(54) REINFORCED THERMOPLASTIC-RESIN MULTILAYER SHEET MATERIAL

(75) Inventor: Kazumasa Kawabe, Fukui (JP)

(73) Assignee: FUKUI PREFECTURAL GOVERNMENT, Fukui-shi, Fukui (JP)

( * ) Notice: Subject to any disclaimer, the term of this patent is extended or adjusted under 35 U.S.C. 154(b) by 0 days.

(21) Appl. No.: 13/486,779

(22) Filed: Jun. 1, 2012

(65) Prior Publication Data

US 2012/0270009 A1 Oct. 25, 2012

Related U.S. Application Data

(63) Continuation of application No. 12/376,525, filed as application No. PCT/JP2007/072520 on Nov. 21, 2007, now abandoned.

(30) Foreign Application Priority Data

Nov. 22, 2006 (JP) .................................. 2006-316157
Feb. 15, 2007 (JP) .................................. 2007-035428
(Continued)

(51) Int. Cl.
  *B32B 5/02* (2006.01)
  *B32B 5/12* (2006.01)
  (Continued)

(52) U.S. Cl.
  CPC ............ *B29C 43/146* (2013.01); *B29C 43/20* (2013.01); *B29C 43/203* (2013.01); *B29C 43/30* (2013.01);
  (Continued)

(58) Field of Classification Search
  CPC ..... B32B 27/12; B32B 27/04; B32B 2255/02; B32B 2260/021; B32B 2260/023;
  (Continued)

(56) References Cited

U.S. PATENT DOCUMENTS 1,162 A 5/1839 Goodwin, Jr.
4,445,951 A * 5/1984 Lind et al. ..................... 156/93
(Continued)

FOREIGN PATENT DOCUMENTS

JP 63-183836 A 7/1988
JP 02-134233 A 5/1990
(Continued)

OTHER PUBLICATIONS

Korean Office Action corresponding to Korean Patent Application No. 10-2009-7001138, dated Sep. 28, 2012.

*Primary Examiner* — Joanna Pleszczynska
(74) *Attorney, Agent, or Firm* — Sughrue Mion, PLLC

(57) ABSTRACT

A high-quality multilayer thermoplastic-resin-reinforced sheet material having excellent mechanical properties and drapeability in which a thermoplastic resin excellent in recycling efficiency and shock resistance is used as a matrix. A thermoplastic-resin multilayer reinforced molding formed of the multilayer thermoplastic-resin-reinforced sheet material, in which the high quality and the mechanical properties are maintained. The multilayer thermoplastic-resin-reinforced sheet material (11) is formed by stacking thermoplastic-resin-reinforced sheet materials (21A) to (21D) each formed of a reinforcing-fiber sheet material (31), consisting of a plurality of reinforcing fibers (31*f*) arranged in a predetermined direction in a sheet-like structure, and a thermoplastic-resin sheet material (41) joined to a surface of the reinforcing-fiber sheet material (31), and stitching them together with an integration thermoplastic-resin fiber tow (51) composed of the same material as the thermoplastic-resin sheet material (41). The reinforcing-fiber sheet materials (31) are stacked such that their reinforcing directions are multiaxial.

6 Claims, 18 Drawing Sheets

(30) Foreign Application Priority Data

| Nov. 7, 2007 | (JP) | 2007-289785 |
|---|---|---|
| Nov. 20, 2007 | (JP) | 2007-300002 |

(51) Int. Cl.

| *B32B 5/26* | (2006.01) |
|---|---|
| *B32B 7/12* | (2006.01) |
| *B32B 27/12* | (2006.01) |
| *B29C 43/14* | (2006.01) |
| *B29C 43/20* | (2006.01) |
| *B29C 43/30* | (2006.01) |
| *B29C 43/36* | (2006.01) |
| *B29C 70/46* | (2006.01) |
| *B29C 70/50* | (2006.01) |
| *B29C 70/54* | (2006.01) |
| *B29C 70/20* | (2006.01) |
| *B32B 7/08* | (2019.01) |
| *B29C 33/10* | (2006.01) |
| *B29C 43/46* | (2006.01) |
| *B29K 101/12* | (2006.01) |
| *B29K 105/08* | (2006.01) |
| *B29C 70/08* | (2006.01) |
| *B29C 70/24* | (2006.01) |

(52) U.S. Cl.
CPC ............ *B29C 43/305* (2013.01); *B29C 43/36* (2013.01); *B29C 70/202* (2013.01); *B29C 70/465* (2013.01); *B29C 70/504* (2013.01); *B29C 70/543* (2013.01); *B32B 5/12* (2013.01); *B32B 5/26* (2013.01); *B32B 7/08* (2013.01); *B32B 27/12* (2013.01); *B29C 33/10* (2013.01); *B29C 43/46* (2013.01); *B29C 70/086* (2013.01); *B29C 70/24* (2013.01); *B29C 2043/3644* (2013.01); *B29K 2101/12* (2013.01); *B29K 2105/0854* (2013.01); *Y10T 156/10* (2015.01); *Y10T 156/1095* (2015.01); *Y10T 428/187* (2015.01); *Y10T 428/24033* (2015.01); *Y10T 428/2481* (2015.01); *Y10T 428/2495* (2015.01); *Y10T 428/24124* (2015.01); *Y10T 428/24851* (2015.01); *Y10T 428/249941* (2015.04); *Y10T 428/249942* (2015.04); *Y10T 442/30* (2015.04); *Y10T 442/3472* (2015.04); *Y10T 442/643* (2015.04)

(58) Field of Classification Search
CPC ......... B32B 5/02–12; B32B 5/22; B32B 7/12; B32B 2305/07; B32B 2305/073; B32B 2305/076; B32B 5/26; C08L 2205/16; B29C 70/06; Y10T 428/187
USPC ... 428/56, 102, 113, 114, 220, 292.1, 297.1, 428/297.4, 297.7, 298.1, 55, 299.1, 299.4, 428/299.7, 300.7, 301.4; 442/261, 366, 442/367
See application file for complete search history.

(56) References Cited

U.S. PATENT DOCUMENTS

| 4,997,693 | A |   | 3/1991 | Sonoh et al. | |
|---|---|---|---|---|---|
| 5,085,928 | A |   | 2/1992 | Krueger | |
| 5,198,281 | A |   | 3/1993 | Muzzy et al. | |
| 5,445,693 | A |   | 8/1995 | Vane | |
| 5,520,995 | A |   | 5/1996 | Fukushima et al. | |
| 5,534,210 | A | * | 7/1996 | Shirai | B29C 70/16 242/555 |
| 6,565,944 | B1 | * | 5/2003 | Hartness et al. | 428/109 |
| 2004/0137208 | A1 | * | 7/2004 | Mitani et al. | 428/292.1 |
| 2004/0219855 | A1 |   | 11/2004 | Tsotsis | |
| 2006/0172636 | A1 | * | 8/2006 | Bech | B29B 11/16 442/1 |

FOREIGN PATENT DOCUMENTS

| JP | 05-031839 | A |   | 2/1993 |
|---|---|---|---|---|
| JP | 05-269938 | A |   | 10/1993 |
| JP | 9-254310 | A |   | 9/1997 |
| JP | 11-320729 | A |   | 11/1999 |
| JP | 2003-165851 | A |   | 6/2003 |
| JP | 2004-035604 | A |   | 2/2004 |
| JP | 2004-142165 | A |   | 5/2004 |
| JP | 2006-138031 | A |   | 6/2006 |
| JP | 2008-221833 | A |   | 9/2008 |
| KR | 1020010106510 | A |   | 11/2001 |
| WO | 0021742 | A1 |   | 4/2000 |
| WO | WO 00/27632 |   | * | 5/2000 |
| WO | 2000/056539 | A1 |   | 9/2000 |
| WO | 2005/002819 | A2 |   | 1/2005 |

* cited by examiner

0° DIRECTION

90° DIRECTION

85A

85B

REINFORCED THERMOPLASTIC-RESIN MULTILAYER SHEET MATERIAL

CROSS REFERENCE TO PRIOR APPLICATION

This is a Continuation of application Ser. No. 12/376,525 filed Feb. 5, 2009 claiming priority based on Japanese Patent Application No. 2006-316157 filed on Nov. 22, 2006; Japanese Patent Application No. 2007-035428 filed on Feb. 15, 2007; Japanese Patent Application No. 2007-289785 filed on Nov. 7, 2007; and Japanese Patent Application No. 2007-300002 filed on Nov. 20, 2007, the contents of all of which are incorporated herein by reference in their entirety.

TECHNICAL FIELD

The present invention relates to a sheet material suitable for producing a three-dimensional thermoplastic-resin composite-material molding and a method for forming the same. More specifically, the present invention relates to a multilayer thermoplastic-resin-reinforced sheet material formed by stacking and integrating a plurality of thermoplastic-resin-reinforced sheet materials each formed by joining a thermoplastic-resin sheet material to a reinforcing-fiber sheet material consisting of reinforcing fibers, such as carbon fibers, arranged in a sheet-like structure; a method for producing the same; and a method for forming a thermoplastic-resin composite-material molding from a molding material composed of the reinforcing fiber material and the thermoplastic resin material.

BACKGROUND ART

Fiber-reinforced composite materials composed of a fiber material and a matrix material are light and stiff materials, and enable various functional designs. Such fiber-reinforced composite materials are used in a wide range of fields, including aerospace field, transportation field, structural engineering field, and exercise equipment field. Currently, fiber-reinforced plastics (FRPs) composed of a reinforcing fiber material, such as carbon fibers or glass fibers, and a thermosetting resin material are the mainstream. However, it is thought that the development of moldings using a thermoplastic resin material as a matrix resin will increase in the future because of their advantages such as improvements in recycling efficiency, short-time moldability, and shock resistance of the moldings.

Meanwhile, in forming moldings, to ease forming and reduce the forming cost, moldings formed of a multiaxially reinforced sheet material, in which reinforcing fiber materials are stacked such that their reinforcing directions are multiaxial, and a method for forming the same are attracting attention.

Thus, it is expected to produce a sheet material composed of a multiaxially reinforced sheet material, in which reinforcing fiber materials are multiaxially laminated, and a thermoplastic resin material, and a high-quality, low-cost molding composed of such a sheet material, which can be produced in a short-time.

As an example of the sheet material composed of a reinforcing fiber material and a thermoplastic resin material, Patent Document 1 discloses that a prepreg sheet or a semi-prepreg sheet containing a thermoplastic resin is formed by stacking a reinforcing fiber sheet formed of a plurality of reinforcing fiber tows arranged in one direction and a thermoplastic-resin nonwoven fabric made of thermoplastic resin fibers formed into nonwoven fabric, and applying pressure while applying heat to melt the thermoplastic-resin nonwoven fabric so that the reinforcing fiber tows are impregnated or half-impregnated with the thermoplastic resin.

As an example of the sheet material composed of a reinforcing fiber material that is multiaxially reinforced and a thermoplastic resin material, Patent Document 2 discloses a reinforcing multiaxial stitched fabric formed by stacking at least two layers, each formed of multiple reinforcing fiber filaments arranged parallel to one another in a sheet-like structure, in a crosswise manner to form a laminate, and stitching the laminate with a low-melting polymer thread. Also disclosed is that, by impregnating the reinforcing multiaxial stitched fabric with a thermosetting resin or a thermoplastic resin and subjecting it to heat molding at the melting point of the low-melting polymer thread or higher, an FRP molding having excellent surface smoothness with no organization of the stitching thread is obtained.

Patent Document 3 discloses a fiber-reinforced sheet reinforced in three directions and a method for producing the same, in which a prepreg sheet impregnated with a thermoplastic resin is arranged in a longitudinal direction and another thermoplastic-resin prepreg sheet is spirally wrapped around this thermoplastic-resin prepreg sheet. Also disclosed is a fiber-reinforced sheet reinforced in four directions formed by disposing a thermoplastic-resin prepreg sheet on the three-directionally reinforced fiber-reinforced sheet at 90° with respect to the longitudinal direction thereof.

Patent Document 4 discloses a method and apparatus for producing a multiaxially fiber-reinforced composite sheet, in which a cohesive unidirectional lap is formed from a combined filament yarn consisting of a reinforcing filament and an organic material filament, the lap is folded laterally with respect to the traveling direction and subjected to heat or heat and pressure to fix the reinforcing threads/organic material. Also disclosed is that the organic material is a thermoplastic resin serving as a base material, and the composite sheet is provided to enable production of complex-shaped composite-material moldings.

Patent Document 5 discloses a multiaxially laminated reinforcing fiber sheet and a method for producing the same, in which reinforcing fiber tows are spread and widened such that the width of 1000 threads is 1.3 mm or more and formed into a reinforcing fiber sheet, the reinforcing fiber sheet is then formed into oblique reinforcing fiber sheets whose reinforcing directions are oblique, and then the oblique reinforcing fiber sheets are stacked and bonded together with a heat adhesive or stitched together with a thread or a fiber having a reinforcing effect. Also disclosed is a method in which, when the oblique reinforcing fiber sheets are stacked, a matrix layer composed of a thermoplastic resin is disposed between the layers.

Patent Document 6 discloses a method for forming a fiber-reinforced thermoplastic composite material, in which a multiaxially laminated sheet is produced by integrally stitching multiaxially laminated prepreg tapes composed of reinforcing fibers impregnated with a thermoplastic resin, and the multiaxially laminated sheet is cut or laminated. Also disclosed is that, because the reinforcing fibers are preliminarily impregnated with the thermoplastic resin, forming can be performed in a relatively short time and the forming cycle can be reduced.

As a method for forming a molding using a thermoplastic resin material as a matrix resin, for example, Patent Document 7 discloses a method in which a material is disposed between a flat plate and a patterned plate and inserted into a hot press to melt the thermoplastic resin, the material, disposed between the plates, is taken out and then inserted into a cold press to be subjected to cooling, and the molding is taken out. Patent Document 8 discloses a method for producing a fiber-reinforced thermoplastic composite molding in which a fiber-reinforced thermoplastic composite material is placed in a female open mold, the entire open mold is covered with a heat-resistant bag, the air between the bag and the open mold is evacuated, and then hot pressing is performed.

Patent Document 1: Japanese Unexamined Patent Application Publication No. 2003-165851

Patent Document 2: Japanese Unexamined Patent Application Publication No. 2002-227066

Patent Document 3: Japanese Unexamined Patent Application Publication No. 2006-224543

Patent Document 4: Japanese Unexamined Patent Application Publication (Translation of PCT Application) No. 2004-530053

Patent Document 5: Japanese Unexamined Patent Application Publication No. 2006-130698

Patent Document 6: Japanese Unexamined Patent Application Publication No. 2007-1089

Patent Document 7: Japanese Unexamined Patent Application Publication No. Hei 6-320655

Patent Document 8: Japanese Unexamined Patent Application Publication No. 2004-276471

Patent Document 9: Pamphlet of International Publication No. 2005/002819

Patent Document 10: Japanese Unexamined Patent Application Publication No. 2005-029912

Non-Patent Document 1: Kazumasa Kawabe et al. "Simulation of Thermoplastic Resin Impregnation for Developing Thermoplastic Resin Prepreg Apparatus", Industrial Technology Center of Fukui Prefecture, Heisei 12 Research Report No. 17

DISCLOSURE OF INVENTION

Problems to be Solved by the Invention

In the above-described Patent Document 1, using a thermoplastic resin in the form of nonwoven fabric, a prepreg sheet or a semi-prepreg sheet formed of fiber tows impregnated or half-impregnated with the thermoplastic resin is obtained. As a result of the thermoplastic resin being melted and impregnated or half-impregnated into the fiber tows, the drapeability of the prepreg sheet is degraded even if it is thin. Thus, it is difficult to fit the prepreg sheet into a three-dimensional metal mold. Furthermore, when the prepreg sheet or the semi-prepreg sheet is produced, application of heat and pressure to the extent that the thermoplastic-resin nonwoven fabric is melted and impregnated into the fiber tows is needed. This raises problems in that the molding apparatus becomes large and the molding speed cannot be reduced.

In Patent Document 2, a reinforcing multiaxial stitched fabric is impregnated with a resin to produce an FRP molding. When a thermosetting resin having good flowability is to be impregnated, the resin can be easily impregnated into fibers of the reinforcing fiber filaments constituting the reinforcing multiaxial stitched fabric. However, when a thermoplastic resin that is viscous in a melted state and has poor flowability is to be impregnated, impregnation of the resin into the fibers of the reinforcing fiber filaments is very difficult. Therefore, a thermoplastic-resin composite-material molding formed of such a reinforcing multiaxial stitched fabric has problems in that the time for resin impregnation to obtain a molding is long, which increases the molding cost, and in that many portions not impregnated with the resin, i.e., voids (gaps), are formed, which degrades the mechanical properties.

In Patent Documents 3 and 6, a multiaxially reinforced sheet is produced from a prepreg sheet and a prepreg tape impregnated with a thermoplastic resin. There is a problem, however, in that, because the prepreg sheet and the prepreg tape composed of reinforcing fiber tows impregnated with a thermoplastic resin material are stiff, a sheet formed of such sheets or tapes that are multiaxially oriented has poor drapeability and is difficult to be fitted to a three-dimensional metal mold. In addition, in order to produce the thermoplastic-resin prepreg sheet and tape, a prepreg-sheet producing process, in which reinforcing fiber tows are impregnated with a thermoplastic resin, is required. However, because impregnation of a thermoplastic resin into reinforcing fiber tows is not easy and requires production time, this results in a problem in that the production cost of FRP moldings increases.

In Patent Document 4, a combined filament yarn composed of a reinforcing filament and an organic material filament is used. However, it is difficult to uniformly combine the reinforcing filament and the organic material filament. Thus, it is highly possible that the resulting composite-material molding exhibits non-uniform distribution of fibers has voids. Furthermore, because the combined filament yarn is produced one by one, the production cost of the combined filament yarn is high. This leads to a problem in that the cost of the resulting composite-material molding increases.

In Patent Document 5, a plurality of spread and widened reinforcing fiber tows are bonded together into a reinforcing fiber sheet with a thread having an adhesive function, an adhesive fiber web, or a porous adhesive layer. Because the plurality of spread and widened reinforcing fiber tows are bonded together with only the thread having an adhesive function, the adhesive fiber web, or the porous adhesive layer, a certain amount of the thread or adhesive is necessary. If the amount of the thread having an adhesive function, adhesive fiber web, or porous adhesive layer to be used is insufficient, it is difficult to bond the plurality of reinforcing fiber tows. Even if bonding was possible, because the reinforcing fiber tows are easily unraveled and the spread and widened reinforcing fiber tows are bundled, the shape of a reinforcing fiber sheet cannot be maintained.

In the example, a uniaxial reinforcing fiber sheet is formed in which carbon fiber tows spread and widened to a width of 31 mm are arranged and bonded together with a fiber web having a weight of 4 g/m2 made of hot-melt adhesive fibers. Because the amount of the carbon fibers used is about 24.5 g/m2, the amount of the hot-melt adhesive used is about 16.3% of the amount of the carbon fibers used.

In Patent Document 5, after an oblique reinforcing fiber sheet is produced from a reinforcing fiber sheet, the oblique reinforcing fiber sheet and a thermoplastic resin matrix layer are stacked and bonded together with a heat adhesive or stitched together with a thread or a fiber having a reinforcing effect. Thus, a multiaxially laminated reinforcing fiber sheet for producing a thermoplastic-resin composite-material molding is produced. Because a certain amount of the thread having an adhesive function, adhesive fiber web, or porous adhesive layer is used to make the reinforcing fiber sheet, such an adhesive is combined with the thermoplastic resin serving as the matrix. This may degrade the mechanical properties of the composite-material molding. In addition, stitching with the thread or the fiber having a reinforcing effect may destroy the straightness of the reinforcing fibers because, when a multiaxially laminated reinforcing fiber sheet is subjected to hot press molding to produce a composite-material molding, the thickness provided by the stacked oblique reinforcing fiber sheet and thermoplastic resin matrix layer decreases as a result of the impregnation of the thermoplastic resin into the reinforcing fiber tows, which slackens the thread or the fiber having a reinforcing effect. Such a slack thread or fiber does not reinforce the composite-material molding in the thickness direction, but rather exists as a foreign matter and causes degradation of the mechanical properties of the composite-material molding.

As a result of intensive research and development, the present inventor confirmed that, as disclosed in Non-Patent Document 1, as the thickness of fiber tows decreases, a viscous thermoplastic resin can be impregnated into fiber tows in a shorter time, and developed, as disclosed in Patent Document 9, a tow-spreading method for producing a wide and thin multi-filament spread sheet from a large-fineness fiber tow, which is low in material cost. Furthermore, as disclosed in Patent Document 10, a method and apparatus for producing a thermoplastic-resin prepreg sheet from a sheet composed of a plurality of multi-filament spread threads arranged in a width direction without leaving gaps and a thermoplastic resin sheet is developed.

On the basis of the above-described findings and tow-spreading method, the present invention intends to provide a thermoplastic-resin-reinforced sheet material using a thermoplastic resin, which is excellent in recycling efficiency and shock resistance, as a matrix and having excellent straightness and distribution of fibers and excellent moldability into a molding; a high-quality multilayer thermoplastic-resin-reinforced sheet material having excellent mechanical properties and drapeability that can be produced at low cost; and a method for efficiently producing these sheet materials in a short time and at low cost.

The above-described thermoplastic-resin composite-material molding has challenges to overcome, for example, how to impregnate a reinforcing fiber material, such as carbon fibers or glass fibers, with a thermoplastic resin material, such as polypropylene resin, polyamide 6 resin, or polyetherimide resin in a short time, without gaps (voids) but with excellent fiber distribution; and how to perform accurate forming, i.e., how to form a three-dimensional shape with no warpage.

In Patent Document 7, the plates are patterned only on the material sides and are flat on the sides to be in contact with press plates. Because the thickness of the plates is not uniform, heat transfer to the material is uneven. Thus, uniform heating or cooling is not performed during heating and cooling. This makes it difficult to reduce the molding time and causes warpage due to partially insufficient resin impregnation.

Typically, the press plates of a press are flat. Thus, shaping molds are flat on the sides to be in contact with the press plates and are patterned according to the shape of the molding on the material sides. Therefore, the shaping molds are made of a metal such as iron and formed to have a certain thickness so that the patterned portions are not deformed during pressing. Accordingly, the time for heating and cooling the shaping molds themselves is required.

The known forming method using a heat-vacuum bag or the like, as Patent Document 8, involves time-consuming operations such as enclosing molds (shaping molds) with the bag and taking the molds (shaping molds) out of the bag. Because the bag has a problem in heat resistance, it is difficult to perform high-temperature molding at 300° or higher. In addition, because reuse of such a bag is difficult, the bag has to be replaced every forming processing. This leads to a problem in that the cost burden is significant.

Therefore, an object of the present invention is to provide a method for forming a thermoplastic-resin composite-material molding having almost no gaps and having excellent fiber distribution, in a short time without causing warpage.

Means for Solving the Problems

A multilayer thermoplastic-resin-reinforced sheet material of the present invention is formed by stacking and integrating a plurality of thermoplastic-resin-reinforced sheet materials each formed of a reinforcing-fiber sheet material, consisting of a plurality of reinforcing fibers arranged in a predetermined direction, and a thermoplastic-resin sheet material that are joined together. In each of the thermoplastic-resin-reinforced sheet materials, one of the thermoplastic-resin sheet material and the reinforcing-fiber sheet material is joined to each surface of the other sheet material. The thermoplastic-resin-reinforced sheet materials are each formed of a plurality of narrow thermoplastic-resin-reinforced sheet materials arranged in a width direction, the plurality of narrow thermoplastic-resin-reinforced sheet materials each formed of a narrow reinforcing-fiber sheet material, consisting of a plurality of reinforcing fibers arranged in a predetermined direction, and a narrow thermoplastic-resin sheet material that are joined together. The thermoplastic-resin-reinforced sheet materials are each formed by weaving a narrow thermoplastic-resin-reinforced sheet material formed of a narrow reinforcing-fiber sheet material, consisting of a plurality of reinforcing fibers arranged in a predetermined direction, and a narrow thermoplastic-resin sheet material that are joined together. The thermoplastic-resin-reinforced sheet materials are stacked such that arrangement directions of the reinforcing-fiber sheet materials are multiaxial. The cross-sectional thickness of each reinforcing-fiber sheet material is set within ten times the diameter of each reinforcing fiber. The plurality of stacked thermoplastic-resin-reinforced sheet materials are stitched together with an integration thermoplastic-resin fiber tow composed of the same material as the thermoplastic-resin sheet materials. The plurality of stacked thermoplastic-resin-reinforced sheet materials are bonded together by thermal adhesion of the thermoplastic-resin sheet materials. The plurality of stacked thermoplastic-resin-reinforced sheet materials are bonded together by partial thermal adhesion of the thermoplastic-resin sheet materials. The thermoplastic-resin-reinforced sheet materials each have a bonding thermoplastic-resin material that is melted or softened at a temperature lower than the melting temperature of the thermoplastic-resin sheet material and deposited on one or both surfaces of at least one of the reinforcing-fiber sheet material and the thermoplastic-resin sheet material. The thermoplastic-resin-reinforced sheet materials are each formed of the reinforcing-fiber sheet material and the thermoplastic-resin sheet material that are bonded together with the bonding thermoplastic-resin material. In the multilayer thermoplastic-resin-reinforced sheet material, the thermoplastic-resin-reinforced sheet materials each being formed of the reinforcing-fiber sheet material and the thermoplastic-resin sheet material that are bonded together with the bonding thermoplastic-resin material, the bonding thermoplastic-resin material being deposited on one or both surfaces of each thermoplastic-resin-reinforced sheet material, the amount of deposition per unit area of the bonding thermoplastic-resin material for bonding the reinforcing-fiber sheet material and the thermoplastic-resin sheet material is different from the amount of deposition per unit area of the bonding thermoplastic-resin material deposited on one or both surfaces of each thermoplastic-resin-reinforced sheet material. In the multilayer thermoplastic-resin-reinforced sheet material, the thermoplastic-resin-reinforced sheet materials each being formed of the reinforcing-fiber sheet material and the thermoplastic-resin sheet material that are bonded together with the bonding thermoplastic-resin material, the bonding thermoplastic-resin material being deposited on one or both surfaces of each thermoplastic-resin-reinforced sheet material, the bonding thermoplastic-resin material for bonding the reinforcing-fiber sheet material and the thermoplastic-resin sheet material is a resin different from the bonding thermoplastic-resin material deposited on one or both surfaces of each thermoplastic-resin-reinforced sheet material. The amount of deposition per unit area of the bonding thermoplastic-resin material is within 3% of the weight per unit area of the reinforcing-fiber sheet material. The plurality of stacked thermoplastic-resin-reinforced sheet materials are bonded together by heat-melting or heat-softening the bonding thermoplastic-resin material. The plurality of stacked thermoplastic-resin-reinforced sheet materials are partially bonded together by partially heat-melting or heat-softening the bonding thermoplastic-resin material.

A method for producing a multilayer thermoplastic-resin-reinforced sheet material of the present invention includes: a sheet forming step for forming a thermoplastic-resin-reinforced sheet material by joining a reinforcing-fiber sheet material, consisting of a plurality of reinforcing fibers arranged in a predetermined direction, and a thermoplastic-resin sheet material, a stacking step for stacking a plurality of the thermoplastic-resin-reinforced sheet materials in a thickness direction, and an integration step for integrating the plurality of stacked thermoplastic-resin-reinforced sheet materials. In the sheet forming step, one of the thermoplastic-resin sheet material and the reinforcing-fiber sheet material is joined to each surface of the other sheet material. In the sheet forming step, a narrow thermoplastic-resin-reinforced sheet material is formed by joining a narrow reinforcing-fiber sheet material, consisting of a plurality of reinforcing fibers arranged in a predetermined direction, and a narrow thermoplastic-resin sheet material, and a plurality of the narrow thermoplastic-resin-reinforced sheet materials are arranged in a width direction to form the thermoplastic-resin-reinforced sheet material. In the sheet forming step, a narrow thermoplastic-resin-reinforced sheet material is formed by joining a narrow reinforcing-fiber sheet material, consisting of a plurality of reinforcing fibers arranged in a predetermined direction, and a narrow thermoplastic-resin sheet material, the narrow thermoplastic-resin-reinforced sheet material is woven into the thermoplastic-resin-reinforced sheet material. In the method for forming the narrow thermoplastic-resin-reinforced sheet material in the sheet forming step, after the thermoplastic-resin-reinforced sheet material is formed by joining the reinforcing-fiber sheet material, consisting of the plurality of reinforcing fibers arranged in a predetermined direction, and the thermoplastic-resin sheet material, the thermoplastic-resin-reinforced sheet material is cut in a length direction, at a desired interval in a width direction, to form the plurality of narrow thermoplastic-resin-reinforced sheet materials. In the stacking step, a plurality of the thermoplastic-resin-reinforced sheet materials are stacked such that the arrangement directions of the reinforcing fibers are multiaxial. In the sheet forming step, the reinforcing-fiber sheet material is formed into a sheet-like structure in which a plurality of reinforcing fibers are arranged in a predetermined direction, the cross-sectional thickness of the reinforcing-fiber sheet material being set within ten times the diameter of each reinforcing fiber. In the sheet forming step, the reinforcing-fiber sheet material is formed from a wide and thin multi-filament spread thread formed by continuously spreading, in a width direction, a reinforcing fiber tow consisting of a plurality of filament-type reinforcing fibers bundled together. The sheet forming step includes a deposition step for depositing a bonding thermoplastic-resin material that is melted or softened at a temperature lower than the melting temperature of the thermoplastic-resin sheet material on one or both surfaces of the thermoplastic-resin-reinforced sheet material or the narrow thermoplastic-resin-reinforced sheet material. The sheet forming step includes a deposition step for depositing a bonding thermoplastic-resin material that is melted or softened at a temperature lower than the melting temperature of the thermoplastic-resin sheet material to one or both surfaces of at least one of the reinforcing-fiber sheet material and the thermoplastic-resin sheet material, and a joining step for joining the reinforcing-fiber sheet material and the thermoplastic-resin sheet material by disposing one of the reinforcing-fiber sheet material and the thermoplastic-resin sheet material on one or both surfaces of the other sheet material with the bonding thermoplastic-resin material therebetween and by subjecting them to heat or heat and pressure at a temperature lower than the melting temperature of the thermoplastic-resin sheet material to melt or soften the bonding thermoplastic-resin material. In the integration step, the plurality of stacked thermoplastic-resin-reinforced sheet materials are stitched together with an integration thermoplastic-resin fiber tow composed of the same material as the thermoplastic-resin sheet materials. In the integration step, the plurality of stacked thermoplastic-resin-reinforced sheet materials are bonded together by applying heat or heat and pressure to the plurality of stacked thermoplastic-resin-reinforced sheet materials to allow the thermoplastic-resin sheet materials in the respective layers to be thermally adhered to the reinforcing-fiber sheet materials in upper and lower layers in a thickness direction. In the integration step, heat or heat and pressure is partially applied to the plurality of stacked thermoplastic-resin-reinforced sheet materials to allow the thermoplastic-resin sheet materials in the respective layers to be thermally adhered to the reinforcing-fiber sheet materials in upper and lower layers in a thickness direction. In the integration step, heat or heat and pressure is applied to the plurality of stacked thermoplastic-resin-reinforced sheet materials at a temperature at which the bonding thermoplastic-resin material is melted or softened so as to bond the layers of the plurality of stacked thermoplastic-resin-reinforced sheet materials with the bonding thermoplastic-resin material. In the integration step, heat or heat and pressure is partially applied to the plurality of stacked thermoplastic-resin-reinforced sheet materials at a temperature at which the bonding thermoplastic-resin material is melted or softened so as to partially bond the layers of the plurality of stacked thermoplastic-resin-reinforced sheet materials with the bonding thermoplastic-resin material.

A thermoplastic-resin multilayer reinforced molding of the present invention is obtained by cutting a multilayer thermoplastic-resin-reinforced sheet material produced by the above-described production method into pieces having a desired size, stacking a desired number of the pieces in a shaping mold at a desired angle, and performing hot press molding to allow the reinforcing-fiber sheet material to be impregnated with the thermoplastic-resin sheet material, and, in the case of stitch-integration, with the integration thermoplastic-resin fiber tow.

Another thermoplastic-resin multilayer reinforced molding of the present invention is obtained by cutting a multilayer thermoplastic-resin-reinforced sheet material produced by the above-described production method into pieces having a desired size, stacking a desired number of the pieces in a preforming mold at a desired angle, performing hot press molding to allow the reinforcing-fiber sheet material to be impregnated with the thermoplastic-resin sheet material, and, in the case of stitch-integration, with the integration thermoplastic-resin fiber tow, to obtain a preformed laminate, heating the preformed laminate to make it deformable, placing it in a shaping mold, and performing press molding.

A method for forming a thermoplastic-resin composite-material molding of the present invention is a method for forming a thermoplastic-resin composite-material molding from a molding material composed of a reinforcing fiber material and a thermoplastic resin material. The method includes: disposing the molding material between a pair of shaping molds formed to have a uniform thickness at contact portions with respect to the molding material; clamping the molding material between the shaping molds in a manner that inside gas can be discharged from the periphery of the molding material; placing the shaping molds clamping the molding material therebetween between a pair of hot press molds having contact surfaces formed to fit contact surfaces of the shaping molds; performing hot pressing; placing the shaping molds having gone through the hot pressing between a pair of cold press molds having contact surfaces formed to fit the contact surfaces of the shaping molds; and performing cold pressing to cure the thermoplastic resin material melted and impregnated into the layers. The molding material is clamped such that a space into which gas inside the molding material is discharged is formed between the shaping molds, and the space into which the gas is discharged is brought into a vacuum or reduced pressure state. A plurality of the shaping molds clamping the molding material are stacked and subjected to hot pressing and cold pressing. Hot pressing is sequentially performed using a plurality of hot press molds having different temperatures. Cold pressing is sequentially performed using a plurality of cold press molds having different temperatures. The contact portions of the shaping molds are formed to be thin. The shaping molds are composed of a carbon fiber carbon composite material. The contact surfaces of the shaping molds to be in contact with the molding material are treated with a release treatment. In the molding material, the thermoplastic resin material serving as a matrix is unevenly distributed between layers of the reinforcing fiber materials.

Advantages

The multilayer thermoplastic-resin-reinforced sheet material of the present invention is formed by stacking a plurality of thermoplastic-resin-reinforced sheet materials each formed of a reinforcing-fiber sheet material, consisting of a plurality of reinforcing fibers arranged in a predetermined direction in a sheet-like structure, and a thermoplastic-resin sheet material that are joined together. Therefore, when the multilayer thermoplastic-resin-reinforced sheet material is subjected to hot pressing to obtain a composite-material molding, because, in each of the stacked thermoplastic-resin-reinforced sheet materials, the thermoplastic-resin sheet material serving as a matrix (base material) is joined to the reinforcing-fiber sheet material, the thermoplastic resin can be easily impregnated into the reinforcing fibers. That is, unlike forming in which the entire fabric composed of multiaxially arranged multilayer reinforcing fiber tows is impregnated with a thermoplastic resin, because the reinforcing-fiber sheet material and the thermoplastic-resin sheet material are disposed in each layer, the distance over which the thermoplastic resin flows between the reinforcing fibers for impregnation is reduced. Accordingly, a molding having few voids (gaps) can be formed in a short time.

Because the thermoplastic-resin-reinforced sheet material is formed of the reinforcing-fiber sheet material and the thermoplastic-resin sheet material that are joined together, the shape of the sheet is maintained and handling is easy. Furthermore, a state in which the distribution of the reinforcing fibers is maintained can be kept.

In addition, because the thermoplastic-resin-reinforced sheet material is formed of the reinforcing-fiber sheet material and the thermoplastic-resin sheet material that are joined together, unlike a prepreg sheet in which reinforcing fibers are impregnated with a thermoplastic resin material, the drapeability of the sheet is excellent. The use of the narrow thermoplastic-resin-reinforced sheet materials further improves the drapeability of the sheet and the conformability to a three-dimensional shape.

In the case of the thermoplastic-resin-reinforced sheet material formed by joining one of the thermoplastic-resin sheet material and the reinforcing-fiber sheet material to each surface of the other sheet material, because the sheet materials composed of the same material are joined to both surfaces, the thermoplastic reinforced sheet material is not curled and deformed toward one of the surfaces and can maintain a flat shape.

In particular, in the case of the thermoplastic-resin-reinforced sheet material formed by joining the reinforcing-fiber sheet material to each surface of the thermoplastic-resin sheet material, when the composition ratios of both sheet materials are set to predetermined values, half the reinforcing-fiber sheet material is joined to each surface of the thermoplastic-resin sheet material, and the thickness of the reinforcing-fiber sheet material can be set to small. This reduces the impregnation distance during impregnation of the reinforcing-fiber sheet material with the thermoplastic resin. Accordingly, a high-quality molding having fewer gaps, such as voids, can be formed in a shorter time.

When the thickness of the thermoplastic-resin-reinforced sheet material is to be reduced, because the thickness of the reinforcing-fiber sheet material can be reduced more easily than that of the thermoplastic-resin sheet material, by joining thin reinforcing-fiber sheet materials to both surfaces of the thermoplastic-resin sheet material, the thickness of the thermoplastic-resin-reinforced sheet material can be further reduced.

The multilayer thermoplastic-resin-reinforced sheet material is formed by stacking a plurality of thermoplastic-resin-reinforced sheet materials. In the case of the multilayer thermoplastic-resin-reinforced sheet material formed by stacking the thermoplastic-resin-reinforced sheet materials such that their reinforcing directions are the same, a unidirectionally reinforced, thick, and high-quality sheet material or molding can be obtained in a short time. In the case of the multilayer thermoplastic-resin-reinforced sheet material formed by stacking the thermoplastic-resin-reinforced sheet materials such that their reinforcing directions are different, a multi-directionally reinforced, thick, and high-quality sheet material or molding can be obtained in a short time.

Furthermore, by using the thermoplastic-resin-reinforced sheet material formed by weaving a narrow thermoplastic-resin-reinforced sheet material, a single sheet material can provide biaxial reinforcing directions, and a sheet material having excellent handling property and drapeability can be obtained.

In addition, because the cross-sectional thickness of each reinforcing-fiber sheet material is set within ten times the diameter of each reinforcing fiber, the distance over which the thermoplastic resin flows between the reinforcing fibers for impregnation is further reduced. Thus, forming processing in a short time can be achieved. Moreover, by further reducing the distance over which the thermoplastic resin flows between the reinforcing fibers, random orientation of the reinforcing fibers due to flow of the resin is suppressed and the uniform distribution of the reinforcing fibers is maintained. Thus, voids (gaps), into which the resin does not flow, can be further reduced.

Furthermore, because the multilayer thermoplastic-resin-reinforced sheet material is formed of the plurality of thermoplastic-resin-reinforced sheet materials stacked and stitched together with the integration thermoplastic-resin fiber tow, or formed of the thermoplastic-resin sheet materials bonded together by thermal adhesion, the sheet material has excellent drapeability. When the sheets are bonded together, by bonding them partially, not entirely, the drapeability can be further improved.

The multilayer thermoplastic-resin-reinforced sheet material is formed of the plurality of stacked thermoplastic-resin-reinforced sheet materials stitched together with the integration thermoplastic-resin fiber tow composed of the same material as the thermoplastic resin material. Therefore, when the multilayer thermoplastic-resin-reinforced sheet material is subjected to hot pressing to obtain a composite-material molding, the integration thermoplastic-resin fiber tow is also melted and integrated with the thermoplastic resin material and exists as the base material (matrix). Furthermore, melting of the integration thermoplastic-resin fiber tow allows the reinforcing fibers to be unraveled more easily and the fibers to be uniformly distributed. That is, unlike the known technique, there is no situation in which a thread or a fiber having reinforcing effect, used for integration and existing in the base material (matrix), degrades the mechanical properties of the composite-material molding or inhibits unraveling of the reinforcing fibers.

Furthermore, as a result of the integration thermoplastic-resin fiber tow being melted and constituting the base material (matrix), the surface of the molded composite-material molding becomes smooth. In other words, if, as in the known technique, a thread or a fiber having a reinforcing effect for integration is used, the thread or the fiber having a reinforcing effect remains on the surface of the composite-material molding. In particular, when the layers are thin, the surface becomes more uneven because of the influence of the thread or the fiber having a reinforcing effect.

The multilayer thermoplastic-resin-reinforced sheet material is formed of the plurality of stacked thermoplastic-resin-reinforced sheet materials that are bonded together by thermal adhesion. Because this does not require a thread for integration, which is used in the known technique, a composite-material molding formed of the multilayer thermoplastic-resin-reinforced sheet material maintains the surface smoothness and the mechanical properties.

The thermoplastic-resin-reinforced sheet material has the bonding thermoplastic-resin material that is melted or softened at a temperature lower than the melting temperature of the thermoplastic-resin sheet material and is deposited on one or both surfaces of at least one of the reinforcing-fiber sheet material and the thermoplastic-resin sheet material. Thus, when the thermoplastic-resin-reinforced sheet material is cut and stacked in the required orientations, by applying heat or heat and pressure at a temperature at which the bonding thermoplastic-resin material is melted or softened, the layers of the stacked thermoplastic-resin-reinforced sheet materials can be bonded together with the bonding thermoplastic-resin material. This eases handling of the stacked thermoplastic-resin-reinforced sheet materials, and when placed in the shaping molds, the stacked thermoplastic-resin-reinforced sheet materials can be easily placed in the shaping molds while the reinforcing directions of the reinforcing fibers and the arrangement state of the reinforcing fibers are maintained.

In addition, the thermoplastic-resin-reinforced sheet material is formed by joining one of the reinforcing-fiber sheet material and the thermoplastic-resin sheet material to one or both surfaces of the other sheet material with the bonding thermoplastic-resin material. Therefore, the thermoplastic-resin sheet material is securely joined to the reinforcing-fiber sheet material. Thus, the shape of the thermoplastic-resin-reinforced sheet material is maintained and handling becomes easy. Moreover, the arrangement state of the reinforcing fibers constituting the reinforcing-fiber sheet material can be maintained.

In addition, in the thermoplastic-resin-reinforced sheet material, because the amount of deposition per unit area of the bonding thermoplastic-resin material for bonding the reinforcing-fiber sheet material and the thermoplastic-resin sheet material and the amount of deposition per unit area of the bonding thermoplastic-resin material deposited on one or both surfaces of the thermoplastic-resin-reinforced sheet material are different, or, because the bonding thermoplastic-resin material for bonding the reinforcing-fiber sheet material and the thermoplastic-resin sheet material and the bonding thermoplastic-resin material deposited on one or both surfaces of the thermoplastic-resin-reinforced sheet material are different, it is possible to obtain a multilayer thermoplastic-resin-reinforced sheet material in which the adhesiveness of the reinforcing-fiber sheet material to the thermoplastic-resin sheet material layer and the adhesiveness between the thermoplastic-resin-reinforced sheet materials are different. Therefore, the layers of the thermoplastic-resin-reinforced sheet material can be shifted from each other while the arranged state and distributed state of the reinforcing fibers are maintained by joining the reinforcing-fiber sheet material to the thermoplastic-resin sheet material. That is, the multilayer thermoplastic-resin-reinforced sheet material is formed of a plurality of thermoplastic-resin-reinforced sheet materials bonded together and is easy to handle. At the same time, the multilayer thermoplastic-resin-reinforced sheet material can, when placed in the shaping molds for forming, conform to the shape of the molds at curved portions by shifting the layers of the thermoplastic-resin-reinforced sheet materials from each other without loosing the arranged state and distribution state of the reinforcing fibers, and has a further improved drapeability to a complex shape.

Furthermore, when the amount of deposition per unit area of the bonding thermoplastic-resin material in the thermoplastic-resin-reinforced sheet material is within 3% of the weight per unit area of the reinforcing-fiber sheet material, the influence of the bonding thermoplastic-resin material on the mechanical properties and thermal properties of a molding become negligible.

In the method for producing the multilayer thermoplastic-resin-reinforced sheet material of the present invention, first, a sheet-like thermoplastic-resin-reinforced sheet material is formed by joining the reinforcing-fiber sheet material, consisting of the plurality of reinforcing fibers arranged in a predetermined direction in a sheet-like structure, and the thermoplastic-resin sheet material. Then, a plurality of the thermoplastic-resin-reinforced sheet materials are stacked in the thickness direction. Thus, the reinforcing fibers and the thermoplastic resin materials can be arranged in the respective layers with high production efficiency.

Because the thermoplastic-resin-reinforced sheet material has a certain width, the thermoplastic-resin-reinforced sheet materials in the respective layers of the multilayer thermoplastic-resin-reinforced sheet material can be efficiently formed.

By joining the reinforcing-fiber sheet material and the thermoplastic-resin sheet material, random orientation of the reinforcing fibers constituting the reinforcing-fiber sheet material is suppressed and the fiber straightness is maintained. Moreover, because the sheet-shape stability of the thermoplastic-resin-reinforced sheet material improves, handling becomes easy.

The narrow thermoplastic-resin-reinforced sheet material can be efficiently produced by joining a reinforcing-fiber sheet material, consisting of a plurality of reinforcing fibers arranged in a predetermined direction in a narrow sheet-like structure, and a narrow sheet-like thermoplastic-resin sheet material. A plurality of the narrow thermoplastic-resin-reinforced sheet materials can be more efficiently produced by producing a wide thermoplastic-resin-reinforced sheet material and cutting the thermoplastic-resin-reinforced sheet material in the length direction at a desired interval in the width direction.

Furthermore, when the thermoplastic-resin-reinforced sheet material is produced, by using the multi-filament spread threads of the reinforcing fiber tow as the reinforcing-fiber sheet material, a sheet-like structure formed of a plurality of reinforcing fibers arranged in a predetermined direction, the cross-sectional thickness thereof being within ten times the diameter of the reinforcing fiber, can be efficiently formed. Because large fineness fiber tows, whose material price is low, can be used, low-cost production is possible.

As a method for integrating the plurality of stacked thermoplastic-resin-reinforced sheet materials, stitch integration with a stitching thread or bonding integration by thermal adhesion is performed. Thus, high-speed integration of the stacked thermoplastic-resin-reinforced sheet materials is performed. In particular, in the case of bonding integration by thermal adhesion, because the thermoplastic-resin sheet material is not melted to be impregnated into the reinforcing fibers, the layers can be bonded together in a short time.

In the sheet forming step, heat or heat and pressure is applied at a temperature lower than the melting temperature of the thermoplastic-resin sheet material to join the reinforced sheet material and the thermoplastic-resin sheet material with the bonding thermoplastic-resin material. Because heating is performed at a temperature lower than the melting temperature of the thermoplastic-resin sheet material, shrinkage of the thermoplastic-resin sheet material associated with heating hardly occurs. Therefore, it is possible to obtain a thermoplastic-resin-reinforced sheet material in which the straightness of the reinforcing fibers, the quality of the thermoplastic-resin sheet material, etc. are maintained.

Because of the method in which the bonding thermoplastic-resin material is deposited on the thermoplastic-resin sheet material, the surface of the thermoplastic-resin sheet material is smooth. This makes it easy to uniformly deposit a small amount of bonding thermoplastic-resin material on the entire sheet, and also improves the adhesiveness between the reinforcing-fiber sheet material and the thermoplastic-resin sheet material.

Furthermore, because the reinforced sheet material and the thermoplastic-resin sheet material are joined with the bonding thermoplastic-resin material, the thermoplastic-resin sheet material does not have to be melted and impregnated into the reinforcing fibers constituting the reinforcing-fiber sheet material to be thermally adhered thereto. Thus, equipment for applying heat or heat and pressure can be made compact. Furthermore, equipment for continuously processing a wide thermoplastic-resin-reinforced sheet material at a high speed can be installed relatively easily and at low cost. During application of heat or heat and pressure to join the reinforced sheet material and the thermoplastic-resin sheet material with the bonding thermoplastic-resin material, a release sheet material may be required. In such a case, because the heating temperature is low, release paper or the like can be used as the release sheet material. Thus, a wide thermoplastic-resin-reinforced sheet material can be obtained at a low running cost.

By heat-melting the bonding thermoplastic-resin material to bond the plurality of stacked thermoplastic-resin-reinforced sheet materials, the stacked thermoplastic-resin-reinforced sheet materials can be integrated at high speed. Because bonding integration with the bonding thermoplastic-resin material does not require the thermoplastic-resin sheet material to be melted and impregnated into the reinforcing fibers, the layers can be bonded together in a short time.

Because the reinforcing-fiber sheet material is not impregnated with the thermoplastic-resin sheet material, the drapeability of the thermoplastic-resin-reinforced sheet material is maintained. Thus, a multiaxial or multiaxial multilayer sheet material having excellent conformability to a three-dimensional shape can be obtained.

Although the thermoplastic-resin multilayer reinforced molding of the present invention is formed of the multilayer thermoplastic-resin-reinforced sheet material, because the multilayer thermoplastic-resin-reinforced sheet material is stitched or bonded together, handling, as well as cutting and stacking for production of a molding, is easy. Furthermore, because the multilayer thermoplastic-resin-reinforced sheet material is formed of the plurality of stacked thermoplastic-resin-reinforced sheet materials and has a certain thickness, the number of layers to be stacked to produce a molding can be reduced. That is, the thermoplastic-resin multilayer reinforced molding is a labor-saving, low-cost molding.

Furthermore, because the multilayer thermoplastic-resin-reinforced sheet material is used, during production of moldings, the reinforcing-fiber sheet material is impregnated with the resin in a short time, and the resulting moldings have few voids (gaps) and exhibit excellent fiber straightness, fiber distribution, and surface smoothness. That is, the thermoplastic-resin multilayer reinforced molding of the present invention is a high-quality molding.

The thermoplastic-resin multilayer reinforced molding is formed of a preformed laminate which is preliminarily formed from the multilayer thermoplastic-resin-reinforced sheet material. In a method in which a plate-shaped preformed laminate, which is easy to be molded and typically high quality, is preliminarily formed, heated, and then subjected to press-molding to obtain a molding, the heating process and the molding process can be divided. Thus, a molding having a three-dimensional shape can be efficiently produced in a short time. That is, the thermoplastic-resin multilayer reinforced molding according to the present invention is high quality and produced in a shorter time.

In the method for forming a thermoplastic-resin composite-material molding according to the present invention, because of the above-described configuration, the molding material, composed of the reinforcing fiber material and the thermoplastic resin material, is heated and cooled while being subjected to pressure so that the thermoplastic resin material is uniformly melted, impregnated, and cured. Thus, a thermoplastic-resin composite-material molding almost free from gaps, having excellent fiber distribution, and having no warpage can be formed.

That is, the molding material is disposed and clamped between a pair of shaping molds whose contact portions with respect to the molding material have a uniform thickness. Then, the shaping molds are placed between a pair of hot press molds having contact surfaces formed to fit the contact surfaces of the shaping molds, and are subjected to hot pressing. Thus, heat from the hot press molds is uniformly conducted to the entire molding material through the contact portions of the shaping molds having a uniform thickness.

Thus, the entire thermoplastic resin material constituting the molding material is more uniformly melted and impregnated. Furthermore, because the molding material is sandwiched between the shaping molds and clamped in such a manner that the internal gas can be discharged from the periphery of the molding material, the gas in the molding material is discharged along with impregnation of the thermoplastic resin material. Thus, the thermoplastic resin material is impregnated without generating gaps. In addition, because the molding material is always clamped between the contact surfaces of the shaping molds, the arrangement of the reinforcing fiber material is not disturbed because of the flow of the thermoplastic resin material during impregnation. Thus, the fiber distribution is maintained.

The shaping molds having undergone hot pressing are then placed between a pair of cold press molds having contact surfaces formed to fit the contact surfaces of the shaping molds and are subjected to cold pressing through the contact portions of the shaping molds having a uniform thickness. Thus, the entire molding material can be uniformly cooled, whereby the melted and impregnated thermoplastic resin material can be evenly cured and uniformly molded. Thus, an excellent molding having no warpage can be produced.

By performing heating and cooling using different press molds, these processes can be efficiently performed. Thus, compared to the case in which these processes are performed using one press mold, the molding time can be significantly reduced.

By clamping the molding material such that a space into which gas inside the molding material is discharged is formed between the shaping molds, and by bringing the space into which the gas is discharged into a vacuum or reduced pressure state, during melting and impregnation of the thermoplastic resin material, impregnation of the thermoplastic resin material into the reinforcing fiber material is accelerated and the impregnation time can be significantly reduced. Moreover, gaps in the resulting molding can be reduced, and a high-quality molding can be obtained.

By evacuating or reducing the pressure inside the shaping molds, atmospheric pressure acts on the entire outer surface of the shaping molds. Thus, when the shaping molds are placed in the hot press mold or the cold press mold, the molding material sandwiched between the shaping molds can always be kept in a clamped state, making it possible to obtain a high-quality molding in which the straightness, distribution, etc., of the reinforcing fiber material are maintained.

By stacking a plurality of shaping molds sandwiching the molding materials and subjecting them to hot pressing and cold pressing, a plurality of thermoplastic-resin composite-material moldings can be formed simultaneously. Thus, the molding time can be reduced. When the plurality of shaping molds are stacked, by making the shaping molds have one common gas-discharging space and evacuating or reducing the pressure, the shaping molds can be efficiently evacuated or depressurized.

By sequentially performing hot pressing using a plurality of hot press molds having different temperatures or by sequentially performing a cooling/heating process using a plurality of cold press molds having different temperatures, hot pressing or cold pressing can be gradually performed. This enables to control heating or cooling of the thermoplastic resin material, whereby impregnation into layers formed of the arranged reinforcing fiber materials is smoothly performed and sudden shrinkage of the thermoplastic resin material is prevented. Thus, a high-quality thermoplastic-resin composite-material molding having excellent fiber straightness can be obtained.

Because the contact portions of the shaping molds are thin, the thermal conductivity of the shaping molds during heating and cooling is improved. Thus, the molding time can be reduced.

By making the shaping molds from the carbon fiber carbon composite material, which hardly exhibits thermal deformation during heating and cooling and has excellent thermal conductivity, a thermoplastic-resin composite-material molding almost free from warpage can be formed.

In addition, by applying a release treatment to the contact surfaces of the shaping molds to be brought into contact with the molding material or by providing a release sheet material on a portion of the molding material to be brought into contact with the shaping molds, the formed molding can be easily removed from the shaping molds.

When, a material in which the thermoplastic resin materials serving as a matrix is unevenly distributed between layers of the reinforcing fiber materials is used as the molding material, because the thermoplastic resin materials are distributed in the layer direction, the thermoplastic resin materials are simultaneously heated and melted, and impregnated in the direction perpendicular to the layer direction during hot pressing. Thus, smooth impregnation can be performed. Furthermore, because the thermoplastic resin materials are impregnated from both sides of each layer, the air inside the layer is efficiently discharged in the direction in which the reinforcing fiber materials are arranged. Thus, almost no air remains in the layer.

In addition, by forming the molding material by stacking a plurality of thermoplastic-resin-reinforced sheet materials each formed of a reinforcing-fiber sheet material, consisting of a plurality of reinforcing fibers arranged in a predetermined direction in a sheet-like structure, and a thermoplastic-resin sheet material joined to one or both surfaces of the reinforcing-fiber sheet material, an easy-to-produce molding material having excellent mechanical properties and drapeability during molding can be used.

BEST MODES FOR CARRYING OUT THE INVENTION

Embodiments of the present invention will be described in detail below. Although the embodiments described below include various technical limitations since they are preferable specific examples for implementing the present invention, the present invention is not limited to these embodiments unless otherwise stated in the following description.

FIG. 1 is a schematic view showing a part of a multilayer thermoplastic-resin-reinforced sheet material 11 according to an embodiment of the present invention. The multilayer thermoplastic-resin-reinforced sheet material 11 is formed by stacking thermoplastic-resin-reinforced sheet materials 21A to 21D each formed of a reinforcing-fiber sheet material 31, consisting of a plurality of reinforcing fibers 31$f$ arranged in a sheet-like structure, and a thermoplastic-resin sheet material 41 joined to a surface thereof, and integrating them with an integration thermoplastic-resin fiber tow 51 composed of the same material as the thermoplastic-resin sheet material 41. In FIG. 1, the thermoplastic-resin-reinforced sheet materials 21A to 21D are stacked such that the reinforcing fibers in the thermoplastic-resin-reinforced sheet materials are oriented in different axial directions. Then, the thermoplastic-resin-reinforced sheet materials are integrated with the integration thermoplastic-resin fiber tow 51.

The reinforcing-fiber sheet materials 31 are each formed of a plurality of reinforcing fiber tows, each consisting of a plurality of reinforcing fibers bundled together with a sizing agent or the like so as not to be unraveled, arranged in a sheet-like structure, for example. Examples of the reinforcing fibers 31$f$ include high-strength, high-modulus inorganic fibers used for FRPs, such as carbon fiber, glass fiber, ceramic fiber, polyoxymethylene fiber, and aromatic polyamide fiber, or organic fibers. Fiber tows of the aforementioned fibers may be used in combination. The fineness is not specified.

The thermoplastic-resin sheet materials 41 serve as a base material (matrix) resin, and may be composed of polypropylene, polyethylene, polystyrene, polyamide (nylon 6, nylon 66, nylon 12, etc.), polyacetal, polycarbonate, acrylonitrile-butadiene-styrene copolymer (ABS), polyethylene terephthalate, polybutylene terephthalate, polyetherimide, polyethersulfone, polyphenylene sulfide, polyetherketone, or polyetheretherketone. Alternatively, a polymer alloy composed of two or more of the aforementioned thermoplastic resins may be used as the base material (matrix) resin.

The integration thermoplastic-resin fiber tow 51 is a thermoplastic resin fiber composed of the same material as the matrix resin used. The "same material" may be a material whose main polymer has the same chemical composition, and its molecular weight, crystallinity, type of compounds, etc. may be different. Because the resin is heat-melted when a molding is to be obtained, as long as the chemical compositions of the main polymers are the same, the thermoplastic-resin sheet materials 41 and the integration thermoplastic-resin fiber tow 51 are melted, combined, and become the base material (matrix).

Although, when the thermoplastic-resin sheet materials 41 are made of a polymer alloy, it is preferable that an integration thermoplastic-resin fiber tow made of the same polymer alloy resin be used, an integration thermoplastic-resin fiber tow made of one of the thermoplastic resins combined to make the polymer alloy resin may be used. Although the composition ratio of the thermoplastic resins constituting the polymer alloy is locally and slightly changed as a result of heat-melting for obtaining a molding, because the thermoplastic-resin sheet materials 41 serving as the base material (matrix) and the integration thermoplastic-resin fiber tow 51 are melted and combined and the shape of the fibers disappears, a molding having improved distribution of the reinforcing fibers and surface smoothness can be obtained without lowering mechanical properties.

Although the multilayer thermoplastic-resin-reinforced sheet material 11 shown in FIG. 1 is formed by stacking four thermoplastic-resin-reinforced sheet materials 21A to 21D, the number of layers is not limited to four, but may be two or more. At this time, the reinforcing directions of these thermoplastic-resin-reinforced sheet materials may be either the same or different. They may be stacked in any orientations. In the case of FIG. 1, the thermoplastic-resin-reinforced sheet material 21A is fiber-reinforced in 0° direction, the thermoplastic-resin-reinforced sheet material 21B is fiber-reinforced in 45° direction, the thermoplastic-resin-reinforced sheet material 21C is fiber-reinforced in 90° direction, and the thermoplastic-resin-reinforced sheet material 21D is fiber-reinforced in −45° direction.

FIGS. 2 to 4 are schematic views showing a part of a thermoplastic-resin-reinforced sheet material 21 according to embodiments of the present invention. The thermoplastic-resin-reinforced sheet material 21 in FIG. 2 consists of the reinforcing-fiber sheet material 31 formed of a plurality of reinforcing fiber tows 31$t$, each consisting of a plurality of reinforcing fibers 31$f$ bundled together with a sizing agent or the like, arranged in a width direction in a sheet-like structure and the thermoplastic-resin sheet material 41 joined to a surface thereof. The thermoplastic-resin-reinforced sheet material 21 in FIG. 3 has a structure in which one of the reinforcing-fiber sheet material 31 and the thermoplastic-resin sheet material 41 is joined to each surface of the other sheet material. In FIG. 3A, the reinforcing-fiber sheet material 31 is joined to each surface of the thermoplastic-resin sheet material 41, and in FIG. 3B, the thermoplastic-resin sheet material 41 is joined to each surface of the reinforcing-fiber sheet material 31.

The thermoplastic-resin-reinforced sheet material 21 is formed by joining the reinforcing-fiber sheet material 31 formed of a plurality of reinforcing fiber tows, each consisting of a plurality of reinforcing fibers bundled together with a sizing agent or the like so as not to be unraveled, arranged in a sheet-like structure and the thermoplastic-resin sheet material 41. Therefore, not only the reinforcing fiber tows are kept arranged and are not unraveled, but also the reinforcing fibers constituting the reinforcing fiber tows are not unraveled because of the effect of the sizing agent deposited thereon. Thus, random orientation of the fibers is prevented and fray is less likely to be generated.

Herein, "join" means to integrate the reinforcing-fiber sheet material and the thermoplastic-resin sheet material in a manner that they do not come apart by bonding the thermoplastic-resin sheet material to the entirety or several portions of one or both surfaces of the reinforcing-fiber sheet material by thermal adhesion, or by thinly applying an adhesive not affecting the mechanical properties or the like of a finished molding. Although the surface layer portion of the reinforcing-fiber sheet material may be slightly impregnated with the thermoplastic-resin sheet material when the thermoplastic-resin sheet material is thermally adhered to the reinforcing-fiber sheet material, even in such a case, the sheets exhibit sufficient drapeability and are in a joined state.

In the thermoplastic-resin sheet material shown in FIG. 3, one of the thermoplastic-resin sheet material and the reinforcing-fiber sheet material is joined to each surface of the other sheet material. Because the sheet materials composed of the same material are joined to both surfaces, the thermoplastic reinforced sheet material is not curled toward one of the surfaces. Although deformation, such as curl, tends to occur as the thickness of the thermoplastic-resin-reinforced sheet material is reduced, by employing the structure shown in FIG. 3, the sheet material can be maintained flat.

In the case of the thermoplastic-resin-reinforced sheet material in which the reinforcing-fiber sheet materials are joined to both surfaces of the thermoplastic-resin sheet material as shown in FIG. 3A, when the composition ratio of these sheet materials is set to a predetermined value, half the amount of the reinforcing-fiber sheet material is joined to each surface of the thermoplastic-resin sheet material. Thus, the thickness of the reinforcing-fiber sheet material can be set to small. This reduces the impregnation distance during impregnation of the reinforcing-fiber sheet material with the thermoplastic resin.

When the thickness of the thermoplastic-resin-reinforced sheet material is to be reduced, the thicknesses of the thermoplastic-resin sheet material and the reinforcing-fiber sheet material need to be reduced. Because the thickness of the reinforcing-fiber sheet material can be reduced more easily than that of the thermoplastic-resin sheet material, by joining thin reinforcing-fiber sheet materials to both surfaces of the thermoplastic-resin sheet material, the thickness of the thermoplastic-resin-reinforced sheet material can be further reduced and the impregnation distance can be reduced. Accordingly, a high-quality molding having fewer gaps, such as voids, can be obtained in a shorter time.

The thermoplastic-resin-reinforced sheet material 21 shown in FIG. 4 has a configuration in which a plurality of narrow thermoplastic-resin-reinforced sheet materials 21H, each formed of a narrow reinforcing-fiber sheet material 31, consisting of a plurality of reinforcing fibers 31f, and a narrow thermoplastic-resin sheet material 41 joined to a surface thereof, are arranged in a width direction in a sheet-like structure. By arranging the plurality of narrow thermoplastic-resin-reinforced sheet materials 21H both in the width direction and the thickness direction in this manner, a unidirectionally reinforced thermoplastic-resin-reinforced sheet material is obtained. By weaving the narrow thermoplastic-resin-reinforced sheet materials 21H, a thermoplastic-resin-reinforced sheet material reinforced bidirectionally, for example, in 0° direction and 90° direction, can be obtained.

Although, in each narrow thermoplastic-resin-reinforced sheet material 21H shown in FIG. 4, the narrow thermoplastic-resin sheet material 41 is joined to a surface of the narrow reinforcing-fiber sheet material 31, the narrow thermoplastic-resin sheet material may be joined to each surface of the narrow reinforcing-fiber sheet material. Furthermore, the narrow reinforcing-fiber sheet material may be joined to each surface of the narrow thermoplastic-resin sheet material.

By setting the thickness of the reinforcing-fiber sheet materials 31 within ten times the diameter of the reinforcing fibers 31f, when a molding is formed, the distance for impregnation over which the thermoplastic-resin sheet material flows between the reinforcing fibers is further reduced. The diameter of a single thread of carbon fiber, which is a typical reinforcing fiber of composite materials, is 0.005 to 0.007 mm. Accordingly, the thickness of the reinforcing-fiber sheet materials 31 is in the range from 0.05 to 0.07 mm. According to a model calculation disclosed in Non-Patent Document 1, it is expected that the reinforcing fiber tows are impregnated with a thermoplastic-resin sheet material within a few seconds. Thus, forming processing in a short time can be achieved. In addition, by further reducing the distance over which the thermoplastic-resin sheet material flows between the reinforcing fibers, random orientation of the reinforcing fibers due to resin flow is suppressed. Thus, a molding having improved distribution of the reinforcing fibers and having few voids (gaps) can be obtained.

To set the thickness of the reinforcing-fiber sheet materials 31 within ten times the diameter of the reinforcing fibers 31f, a method using a fiber tow consisting of a small number of fibers, a method in which a fiber tow is spread, etc., may be employed. In the method in which a fiber tow is spread, a fiber tow consisting of a large number of fibers (a large fineness fiber tow) can be spread in a wide and thin layer. Because the material cost of the large fineness fiber tow is relatively low, a low-cost molding can be obtained. The shape of the multi-filament spread thread is stable because of the effect of the sizing agent or the like used in a filament state.

The thickness or weight of the thermoplastic-resin sheet materials 41 joined to the reinforcing-fiber sheet materials 31 is determined in relation to the weight (fiber weight per unit area) of the reinforcing-fiber sheet material, the fiber volume content of a finished molding, and the like.

Another thermoplastic-resin-reinforced sheet material used in a multilayer thermoplastic-resin-reinforced sheet material will now be described. FIG. 5 is a schematic view showing a part of a thermoplastic-resin-reinforced sheet material 22 according to an embodiment of the present invention.

The thermoplastic-resin-reinforced sheet material 22 has a configuration in which a thermoplastic-resin sheet material 42 is joined to a surface of a sheet-like reinforcing-fiber sheet material 32 formed of a plurality of reinforcing fiber tows 32t, each consisting of a plurality of reinforcing fibers 32f bundled together with a sizing agent or the like, arranged in the width direction, and a bonding thermoplastic-resin material 52 melted or softened at a temperature lower than the melting temperature of the thermoplastic-resin sheet material 42 is deposited on the surface of the thermoplastic-resin sheet material 42 to which the reinforcing-fiber sheet material 32 is not joined.

The bonding thermoplastic-resin material may be deposited on the surface of the reinforcing-fiber sheet material to which the thermoplastic-resin sheet material is not joined. The thermoplastic-resin sheet material may be joined to each surface of the reinforcing-fiber sheet material. In such a case, the bonding thermoplastic-resin material is deposited on the surface of one or both of the thermoplastic-resin sheet materials to which the reinforcing-fiber sheet material is not joined. Furthermore, the reinforcing-fiber sheet material may be joined to each surface of the thermoplastic-resin sheet material. In such a case, the bonding thermoplastic-resin material is deposited on the surface of one or both of the reinforcing-fiber sheet materials to which the thermoplastic-resin sheet material is not joined.

Because the bonding thermoplastic-resin material 52 is deposited on the surface, when the thermoplastic-resin-reinforced sheet material is cut into pieces and stacked in the required orientations, by applying heat or heat and pressure at a temperature at which the bonding thermoplastic-resin material is melted or softened, the layers of the stacked thermoplastic-resin-reinforced sheet materials can be bonded together with the bonding thermoplastic-resin material. That is, handling of the stacked thermoplastic-resin-reinforced sheet materials becomes easy, and, when placed in a shaping metal mold, the stacked thermoplastic-resin-reinforced sheet materials can be easily placed in metal molds while the reinforcing directions of the reinforcing fibers and the arrangement of the reinforcing fibers are maintained.

Typically, a reinforcing-fiber sheet material constituting a thermoplastic-resin-reinforced sheet material is formed of reinforcing fiber tows each consisting of a plurality of reinforcing fibers bundled together with a sizing agent or the like so as not to be unraveled. In such a case, because the base material (matrix) resin is a thermoplastic resin, it is preferable that a sizing agent taking into consideration the adhesiveness to the base material resin be used as the sizing agent for bundling reinforcing fiber tows. Because of the effect of the sizing agent deposited on the reinforcing fibers, the reinforcing fibers are prevented from being unraveled, being oriented randomly, and being frayed. At the same time, the reinforcing fibers are allowed to move and be shifted from each other. Thus, a reinforcing-fiber sheet material having excellent drapeability can be obtained.

Taking into consideration the adhesiveness between the reinforcing fibers and the base material resin, reinforcing fiber tows on which no or little amount of sizing agent is deposited may be used, or reinforcing fiber tows, after the sizing agent deposited thereon is removed, may be formed into a reinforcing-fiber sheet material. Even in such cases, the reinforcing fibers can be prevented from being unraveled by joining the thermoplastic-resin sheet material and the reinforcing-fiber sheet material. In particular, by spreading the reinforcing fiber tows to reduce the number of reinforcing fibers arranged in the thickness direction, the reinforcing fibers can be further prevented from being unraveled.

The reinforcing-fiber sheet material 32 and the thermoplastic-resin sheet material 42 shown in FIG. 5 are joined by a method in which the thermoplastic-resin sheet material is thermally adhered to the entirety or several portions of one or both surfaces of the reinforcing-fiber sheet material or a method in which the reinforcing-fiber sheet material and the thermoplastic-resin sheet material are bonded with a thinly spread adhesive not affecting the mechanical properties or the like of a finished molding. Although the surface layer portion of the reinforcing-fiber sheet material may be slightly impregnated with the thermoplastic-resin sheet material when the reinforcing-fiber sheet material is thermally adhered to the thermoplastic-resin sheet material, even in such a case, the sheets exhibit sufficient drapeability and are in a joined state.

FIG. 6 is a schematic view showing a part of another thermoplastic-resin-reinforced sheet material 22 according to an embodiment of the present invention. The thermoplastic-resin-reinforced sheet material 22 has a configuration in which the thermoplastic-resin sheet material 42 is joined to a surface of the sheet-like reinforcing-fiber sheet material 32 formed of a plurality of reinforcing fiber tows 32$t$, each consisting of a plurality of reinforcing fibers 32$f$ bundled together with a sizing agent or the like, arranged in the width direction, with the bonding thermoplastic-resin material 52 melted or softened at a temperature lower than the melting temperature of the thermoplastic-resin sheet material 42. The thermoplastic-resin sheet material 42 may be joined to each surface of the reinforcing-fiber sheet material 32. Furthermore, the reinforcing-fiber sheet material 32 may be joined to each surface of the thermoplastic-resin sheet material 42.

In FIG. 6, by bonding the reinforcing-fiber sheet material 32 and the thermoplastic-resin sheet material 42 with the bonding thermoplastic-resin material 52 so as not to come apart, the reinforcing-fiber sheet material 32 and the thermoplastic-resin sheet material 42 are joined. That is, because the reinforcing-fiber sheet material and the thermoplastic-resin sheet material are joined without being heated to the melting temperature of the thermoplastic-resin sheet material, the shape of the reinforcing-fiber sheet material and the shape of the thermoplastic-resin sheet material are maintained. Accordingly, the resulting sheet material has excellent drapeability of the thermoplastic-resin-reinforced sheet material and has excellent straightness and distribution of the reinforcing fibers.

The thermoplastic-resin-reinforced sheet material 22 shown in FIG. 7 is formed of a plurality of narrow thermoplastic-resin-reinforced sheet materials 22H arranged in a width direction in a sheet-like structure. The narrow thermoplastic-resin-reinforced sheet materials 22H are each formed by joining the narrow thermoplastic-resin sheet material 42 to a surface of the narrow reinforcing-fiber sheet material 32, consisting of a plurality of reinforcing fibers 32$f$, with the bonding thermoplastic-resin material 52 melted or softened at a temperature lower than the melting temperature of the thermoplastic-resin sheet material 42. By arranging the plurality of narrow thermoplastic-resin-reinforced sheet materials 22H in the width direction and the thickness direction in this manner, the unidirectionally reinforced thermoplastic-resin-reinforced sheet material 22 is obtained. Furthermore, by weaving the narrow thermoplastic-resin-reinforced sheet materials 22H, a thermoplastic-resin-reinforced sheet material reinforced bidirectionally, for example, in 0° direction and 90° direction, can be obtained.

Also in each narrow thermoplastic-resin-reinforced sheet material 22H shown in FIG. 7, the narrow thermoplastic-resin sheet material 42 is joined to a surface of the narrow reinforcing-fiber sheet material 32 with the bonding thermoplastic-resin material 52. However, the narrow thermoplastic-resin sheet material may be joined to each surface of the narrow reinforcing-fiber sheet material with the bonding thermoplastic-resin material. Furthermore, the narrow reinforcing-fiber sheet material may be joined to each surface of the narrow thermoplastic-resin sheet material with the bonding thermoplastic-resin material.

Although FIGS. 6 and 7 are the drawings in which no bonding thermoplastic-resin material is deposited on the surface of the thermoplastic-resin-reinforced sheet material 22, the bonding thermoplastic-resin material may be dispersed and deposited on one or both surfaces of the thermoplastic-resin-reinforced sheet material 22.

In the thermoplastic-resin-reinforced sheet material, it is possible to differentiate the amount of deposition per unit area of the bonding thermoplastic-resin material for bonding the reinforcing-fiber sheet material and the thermoplastic-resin sheet material and the amount of deposition per unit area of the bonding thermoplastic-resin material deposited on one or both surfaces of the thermoplastic-resin-reinforced sheet material. Also it is possible to differentiate the bonding thermoplastic-resin material for bonding the reinforcing-fiber sheet material and the thermoplastic-resin sheet material and the bonding thermoplastic-resin material deposited on one or both surfaces of the thermoplastic-resin-reinforced sheet material.

By setting the amount of deposition per unit area of the bonding thermoplastic-resin material for bonding the reinforcing-fiber sheet material and the thermoplastic-resin sheet material larger than the amount of deposition per unit area of the bonding thermoplastic-resin material deposited on one or both surfaces of the thermoplastic-resin-reinforced sheet material, or by selecting a bonding thermoplastic-resin material having a greater adhesiveness than the bonding thermoplastic-resin material deposited on one or both surfaces of the thermoplastic-resin-reinforced sheet material as a bonding thermoplastic-resin material for bonding the reinforcing-fiber sheet material and the thermoplastic-resin sheet material, a multilayer thermoplastic-resin-reinforced sheet material having greater adhesiveness between the reinforcing-fiber sheet material and the thermoplastic-resin sheet material layer than between the thermoplastic-resin-reinforced sheet materials can be obtained.

This allows the layers of the thermoplastic-resin-reinforced sheet material to be shifted from each other while the reinforcing-fiber sheet material is joined to the thermoplastic-resin sheet material. That is, the multilayer thermoplastic-resin-reinforced sheet material is formed of a plurality of thermoplastic-resin-reinforced sheet materials bonded together and is easy to handle. At the same time, the multilayer thermoplastic-resin-reinforced sheet material can, when placed in the shaping molds for forming, conform to the shape of the molds at curved portions by locally breaking the adhesion between the layers of the thermoplastic-resin-reinforced sheet material and by shifting the layers of the thermoplastic-resin-reinforced sheet material from each other without loosing the arranged state and distribution state of the reinforcing fibers, and has more excellent drapeability. This enables to obtain a high-quality complex-shaped laminated molding.

Herein, the term "adhesiveness" refers to the strength with which the reinforcing-fiber sheet material and the thermoplastic-resin sheet material, the reinforcing-fiber sheet material and the reinforcing-fiber sheet material, and the thermoplastic-resin sheet material and the thermoplastic-resin sheet material are bonded together with the bonding thermoplastic-resin material, and the phrase "great adhesiveness" refers to "great bonding strength". The phrase "the reinforcing-fiber sheet material and the thermoplastic-resin sheet material are joined" refers to a state in which the reinforcing-fiber sheet material and the thermoplastic-resin sheet material are not separated or do not come apart during normal handling, for example, conveying, lifting, or cutting the sheet material.

The thickness or weight of the thermoplastic-resin sheet material 42 to be joined to the reinforcing-fiber sheet material 32 is determined according to the weight (fiber weight per unit area) of the reinforcing-fiber sheet material, the fiber volume content when finished as a molding, and the like.

The reinforcing-fiber sheet material 32 is formed of, for example, the plurality of reinforcing fiber tows 32$t$ arranged in a sheet-like structure, each consisting of the plurality of reinforcing fibers 32$f$ bundled together with a sizing agent or the like so as not to be unraveled. Examples of the reinforcing fibers 32$f$ include high-strength, high-modulus inorganic fibers used for FRPs, such as carbon fiber, glass fiber, ceramic fiber, aramid fiber, poly para-phenylene benzo-bisoxazole (PBO) fiber, and metal fiber, or organic fibers. Fiber tows of the aforementioned fibers may be used in combination. The fineness is not specified. Similarly to the above-described reinforcing-fiber sheet materials 31, by setting the thickness of the reinforcing-fiber sheet material 32 within ten times the diameter of the reinforcing fibers 32$f$, when a molding is formed, the distance over which the thermoplastic-resin sheet material flows between the reinforcing fibers for impregnation is further reduced. Because the reason and method therefor are the same as those in the case of the reinforcing-fiber sheet materials 31, an explanation thereof will be omitted.

The thermoplastic-resin sheet material 42 serves as the base material (matrix) resin and is composed of the same resin material as the above-described thermoplastic-resin sheet materials 41.

The bonding thermoplastic-resin material 52 serves to bond and integrate the reinforcing-fiber sheet material 32 and the thermoplastic-resin sheet material 42. The bonding thermoplastic-resin material 52 is composed of a thermoplastic resin that is melted or softened at a temperature lower than the melting temperature of the thermoplastic-resin sheet material to be formed and that is capable of bonding the reinforcing-fiber sheet material and the thermoplastic-resin sheet material, and a release sheet material and the reinforcing-fiber sheet material or the thermoplastic-resin sheet material. The bonding thermoplastic-resin material 52 is deposited on one or both surfaces of at least one of the reinforcing-fiber sheet material 32 and the thermoplastic-resin sheet material 42. Preferably, the thermoplastic resin material 52 is deposited on one or both surfaces of at least one of the reinforcing-fiber sheet material 32 and the thermoplastic-resin sheet material 42 and is uniformly distributed. This achieves secure bonding between the reinforcing-fiber sheet material 32 and the thermoplastic-resin sheet material 42. Thus, the thermoplastic-resin sheet material is joined to the reinforcing-fiber sheet material, or a plurality of thermoplastic-resin-reinforced sheet materials are stacked and bonded together.

The bonding thermoplastic-resin material 52 may be either in a powder form or a fibrous form. In the case of a fibrous form, it can be used in the forms of dispersed filaments or staples, or fabric such as wovens, knits, or nonwovens.

Furthermore, a resin with its melting point in the range from 80 to 250° is preferable as the bonding thermoplastic-resin material 52. For example, polyamide, copolymerized polyamide, polyurethane, or the like is selected. In particular, copolymerized polyamide is preferable as the bonding thermoplastic-resin material because of its low melting point and excellent adhesiveness to the thermoplastic-resin sheet material serving as the base material. In addition, it is desirable that a bonding thermoplastic-resin material having good compatibility with the thermoplastic-resin sheet material to be formed be selected. This allows the bonding thermoplastic-resin material to be present in a conformable manner in the thermoplastic resin material serving as the base material when the bonding thermoplastic-resin material melts into the thermoplastic resin material serving as the base material.

It is preferable that the amount of deposition per unit area of the bonding thermoplastic-resin material 52 be set within 3% of the weight per unit area of the reinforcing-fiber sheet material, and it is more preferable that it be set in the range from 0.5 to 2%. By reducing the amount of the bonding thermoplastic-resin material 52 to be used, the influence of the bonding thermoplastic-resin material on the mechanical properties and the thermal properties of the resulting composite-material molding can be minimized.

It is desirable that the bonding thermoplastic-resin material 52 be distributed on one or both surfaces of at least one of the reinforcing-fiber sheet material 32 and the thermoplastic-resin sheet material 42, and it is more desirable that it be uniformly distributed on the surface. This enables the reinforcing-fiber sheet material and the thermoplastic-resin sheet material to be securely bonded, i.e., joined, even if the bonding thermoplastic-resin material is 3% or less, more preferably, in the range from 0.5 to 2%. Because of the reinforcing-fiber sheet material joined to the thermoplastic-resin sheet material, the shape of the fiber tows constituting the reinforcing-fiber sheet material, that is, the straightness and uniform distribution of the reinforcing fibers can be maintained, and the shape of the thermoplastic-resin sheet material as a sheet can be maintained. Thus, the sheet material is easy to handle.

From FIGS. 5 to 7, although not shown therein, a release sheet material can be bonded to the thermoplastic-resin-reinforced sheet material with the bonding thermoplastic-resin material 52. In particular, by bonding the release sheet material to the thermoplastic-resin-reinforced sheet material, on the reinforcing-fiber sheet material side, the shape of the reinforcing-fiber sheet material can be maintained and the straightness and uniform distribution of the reinforcing fibers constituting the reinforcing-fiber sheet material can be more stably maintained. Furthermore, when the thermoplastic-resin-reinforced sheet material is to be cut, by cutting it together with the release sheet material integrated thereto, the thermoplastic-resin-reinforced sheet material can be cut while random orientation of the fibers constituting the reinforcing-fiber sheet material is further suppressed. Thus, bonding and stacking of the thermoplastic-resin-reinforced sheet materials after being cut can be performed while scattering of the reinforcing fibers at the cut sections is minimized. Thus, a high-quality composite-material molding can be obtained. As the release sheet material, a release film such as a polyolefin resin sheet, a thermosetting polyimide resin sheet, or a fluororesin sheet, or release paper may be selected.

FIG. 8 is a schematic view showing a part of another multilayer thermoplastic-resin-reinforced sheet material 12 according to an embodiment of the present invention. The multilayer thermoplastic-resin-reinforced sheet material 12 is formed of four thermoplastic-resin-reinforced sheet materials 22A to 22D, shown in FIG. 5 or 6, stacked and bonded together with a bonding thermoplastic-resin material. In FIG. 8, the thermoplastic-resin-reinforced sheet materials 22A to 22D are stacked such that the reinforcing fibers in the thermoplastic-resin-reinforced sheet materials are oriented in different axial directions.

FIG. 9 is an explanatory diagram related to a production process of the thermoplastic-resin-reinforced sheet material. It is an explanatory diagram related to a process of producing the thermoplastic-resin-reinforced sheet material 21, in which the thermoplastic-resin sheet material 41 is attached and thermally adhered to a surface of the reinforcing-fiber sheet material 31 formed of reinforcing fiber multi-filament spread threads S1 arranged in the width direction, each consisting of the spread reinforcing fiber tows 31*t*. FIG. 9A is a plan view and FIG. 9B is a front view.

A thermoplastic-resin-reinforced sheet material producing apparatus 200 shown in FIG. 9 consists of a multiple-fiber-tow feeding mechanism 201, a multiple-fiber-tow spreading mechanism 202, a longitudinal-vibration applying mechanism 203, a width-direction-vibration applying mechanism 204, a heating mechanism 205, a cooling mechanism 206, a release film feeding mechanism 207, a release film take-up mechanism 208, and a sheet material take-up mechanism 209.

The multiple-fiber-tow feeding mechanism 201 includes a plurality of reinforcing-fiber-tow bobbins 31*b* wound with the reinforcing fiber tows 31*t* and allows the reinforcing fiber tows 31*t* to be fed at a substantially constant tension.

The fed reinforcing fiber tows 31*t* are spread into a wide and thin form by the multiple-fiber-tow spreading mechanism 202. This spreading mechanism employs a pneumatic tow-spreading method, in which a fluid (in FIG. 9, sucked air flow) flowing in one direction is allowed to act on the fiber tows using a wind-tunnel tube, i.e., a known method disclosed in Patent Document 9. Any spreading method for spreading the reinforcing fiber tows 31*t* may be employed.

In the wind-tunnel tube, a plurality of rolls are disposed a predetermined distance apart, and the reinforcing fiber tows 31*t* run while being in contact with the upper portion, the lower portion, the upper portion, the lower portion, . . . , and the upper portion of these rolls. Because the longitudinal-vibration applying mechanism 203 alternately tautens and slackens the reinforcing fiber tows 31*t*, when the reinforcing fiber tows 31*t* are slackened in the wind-tunnel tube, the reinforcing fiber tows 31*t* are instantaneously bent in the direction in which the air flows at the lower portion of the rolls, and the fibers are moved in the width direction and spread. Then, because the reinforcing fiber tows 31*t*, when tautened, run in a spread state while being in contact with the lower portions of the rolls, the fibers are straightened while the spread width is maintained. The reinforcing fiber tows 31*t* run while repeating these states and become the reinforcing fiber multi-filament spread threads S1 right after the wind-tunnel tube.

The plurality of reinforcing fiber multi-filament spread threads S1 arranged in the width direction are vibrated in the width direction by the width-direction-vibration applying mechanism 204 and formed into a multi-filament spread sheet having no gaps between the reinforcing fiber multi-filament spread threads S1, i.e., the wide and thin reinforcing-fiber sheet material 31 in which the reinforcing fibers are distributed.

After the thermoplastic-resin sheet material 41 is attached to a surface of the reinforcing-fiber sheet material 31, the reinforcing-fiber sheet material 31 is allowed to run through the heating mechanism 205 and the cooling mechanism 206. Thus, the thermoplastic-resin-reinforced sheet material 21, formed of the reinforcing-fiber sheet material 31 and the thermoplastic-resin sheet material 41 joined to a surface thereof, is obtained and taken up on a thermoplastic-resin-reinforced sheet material reel 21*b* by the sheet material take-up mechanism 209. In FIG. 9, a curved heating plate is used as the heating mechanism 205. By allowing the reinforcing-fiber sheet material 31 to run over the curved surface, continuous application of heat to the reinforcing fibers is possible and the straightness of the fibers can be increased.

In this mechanism, by attaching the thermoplastic-resin sheet material to the reinforcing-fiber sheet material and applying heat thereto, the thermoplastic-resin sheet material is melted and thermally adhered, i.e., joined, to the reinforcing-fiber sheet material. Although the surface layer portion of the reinforcing-fiber sheet material may be impregnated with the thermoplastic-resin sheet material depending on the heating conditions and the like, the amount thereof is negligible, and the drapeability of the thermoplastic-resin-reinforced sheet material can be sufficiently obtained. Because the purpose is not to impregnate the reinforcing-fiber sheet material with the thermoplastic-resin sheet material, the processing speed can be set to high and the pressing force need not be set to high. That is, the thermoplastic-resin-reinforced sheet material can be produced efficiently.

Although the thermoplastic-resin sheet material 41 is attached to a surface of the reinforcing-fiber sheet material 31 from above in FIG. 9, the thermoplastic-resin sheet material 41 may be attached from below, and it may also be attached to each surface of the reinforcing-fiber sheet material 31 from above and below. Furthermore, it is also possible that the reinforcing-fiber sheet material 31 is attached to each surface of the thermoplastic-resin sheet material 41, using another set of the mechanisms 201 to 204 disposed opposite the heating mechanism 205.

By placing release films 61 fed from the release film feeding mechanism 207 on both surfaces of the base fabric formed of the reinforcing-fiber sheet material 31 and the thermoplastic-resin sheet material 41 that are joined together, the thermoplastic-resin sheet material 41 melted on the heating mechanism 205 is prevented from being adhered to the apparatus, and at the same time, the base fabric is allowed to run without being damaged. The release films 61, after running through the cooling mechanism 206, are removed from the thermoplastic-resin-reinforced sheet material 21 serving as the base fabric and are taken up by the release film take-up mechanism 208.

A sheet-like material, such as a thermoplastic resin film or a thermoplastic-resin nonwoven fabric, may be used as the thermoplastic-resin sheet material 41. It is also possible that an extrusion mechanism is prepared, thermoplastic resin pellets are mixed and melted by the extruder and extruded as a film using a T-die or the like, and the film is directly attached to the reinforcing-fiber sheet material 31. Furthermore, a sheet material formed of thermoplastic resin fiber tows arranged in a width direction in a sheet-like structure each consisting of a plurality of thermoplastic resin fibers bundled together, a sheet material formed of the thermoplastic resin fiber tows spread in a sheet-like structure, or the like may also be used.

FIG. 10 is an explanatory diagram related to a production process of a thermoplastic-resin-reinforced sheet material using the above-described bonding thermoplastic-resin material. It is an explanatory diagram related to a process of producing the thermoplastic-resin-reinforced sheet material 22, in which the thermoplastic-resin sheet material 42 is attached and thermally adhered to a surface of the reinforcing-fiber sheet material 32 formed of reinforcing fiber multifilament spread threads S2 arranged in the width direction, each consisting of the spread reinforcing fiber tows 32$t$, and the bonding thermoplastic-resin material 52 in a powder form is dispersed and thermally adhered to the surface of the thermoplastic-resin sheet material 42. FIG. 10A is a plan view and FIG. 10B is a front view.

A thermoplastic-resin-reinforced sheet material producing apparatus 300 shown in FIG. 10 consists of a multiple-fiber-tow feeding mechanism 301, a multiple-fiber-tow spreading mechanism 302, a longitudinal-vibration applying mechanism 303, a width-direction-vibration applying mechanism 304, a heating mechanism 305, a cooling mechanism 306, a thermoplastic-resin sheet material feeding mechanism 307, a release sheet material feeding mechanism 308, a release sheet material take-up mechanism 309, and a reinforced sheet material take-up mechanism 310.

The multiple-fiber-tow feeding mechanism 301, the multiple-fiber-tow spreading mechanism 302, the longitudinal-vibration applying mechanism 303, and the width-direction-vibration applying mechanism 304 may be similar to the multiple-fiber-tow feeding mechanism 201, the multiple-fiber-tow spreading mechanism 202, the longitudinal-vibration applying mechanism 203 and the width-direction-vibration applying mechanism 204. Accordingly, a detailed explanation will be omitted. By employing these mechanisms, the reinforcing fiber tows 32$t$ can be efficiently processed into the wide and thin reinforcing fiber multifilament spread threads S2 in which the constituent reinforcing fibers 32$f$ are distributed. In the case of untwisted carbon fiber tows, the fiber tows can be spread to a width of about 2 to 7 times the width thereof in a filament state, at a processing speed of 5 m/min. or more, in such a manner that the reinforcing fibers are uniformly distributed.

The wide and thin reinforcing-fiber sheet material 32, after the thermoplastic-resin sheet material 42 is attached to a surface of the reinforcing-fiber sheet material 32, is allowed to run over the heating rolls 72 of the heating mechanism 305. Thus, the thermoplastic-resin sheet material 42 is thermally adhered to a surface of the reinforcing-fiber sheet material 32. The release sheet material feeding mechanism 308 feeds the release sheet material 62 between the reinforcing-fiber sheet material 32 and the heating roll 72. On the heating roll 72 subsequent to a reverse roll 73, the powdered bonding thermoplastic-resin material 52 is dispersed onto the surface of the thermoplastic-resin sheet material 42 joined to the reinforcing-fiber sheet material 32 with the powder-dispersing apparatus 71, and the bonding thermoplastic-resin material 52 is thermally adhered to the thermoplastic-resin sheet material 42. Then, by being allowed to run over cooling rolls 74 of the cooling mechanism 306, the thermoplastic-resin sheet material 42 is joined to a surface of the reinforcing-fiber sheet material 32, and the thermoplastic-resin-reinforced sheet material 22, on the surface of which the bonding thermoplastic-resin material 52 is deposited, is obtained. The resulting thermoplastic-resin-reinforced sheet material 22 is taken up on a thermoplastic-resin-reinforced sheet material reel 22$b$ by the reinforced sheet material take-up mechanism 310. The release sheet material 62 is taken up by the release sheet material take-up mechanism 309.

In this mechanism, by attaching the thermoplastic-resin sheet material to the reinforcing-fiber sheet material and applying heat thereto, the thermoplastic-resin sheet material is melted or softened and thermally adhered, i.e., joined, to the reinforcing-fiber sheet material. Although the surface layer portion of the reinforcing-fiber sheet material may be impregnated with the thermoplastic-resin sheet material depending on the heating conditions and the like, the amount thereof is negligible, and the drapeability of the thermoplastic-resin-reinforced sheet material can be sufficiently obtained. Because the purpose is not to impregnate the reinforcing-fiber sheet material with the thermoplastic-resin sheet material, the processing speed can be set to high and the pressing force need not be set to high. That is, the thermoplastic-resin-reinforced sheet material can be produced efficiently.

Although the thermoplastic-resin sheet material 42 is attached to a surface of the reinforcing-fiber sheet material 32 from above in FIG. 10, the thermoplastic-resin sheet material 42 may be attached from below, and it may also be attached to each surface of the reinforcing-fiber sheet material 32 from above and below. Furthermore, it is also possible that the reinforcing-fiber sheet material 32 is attached to each surface of the thermoplastic-resin sheet material 42, using another set of the mechanisms 301 to 304 disposed opposite the heating mechanism 305.

In FIG. 10, after the thermoplastic-resin sheet material is joined to the reinforcing-fiber sheet material, on the subsequent heating roll, a powdered bonding thermoplastic-resin material is dispersed and thermally adhered to the surface of the thermoplastic-resin sheet material. The temperature of the heating roll can be set to lower than the melting temperature of the thermoplastic-resin sheet material. Although only heating may be performed because the purpose is thermal adhesion, hot pressing using a pressing roll or the like may be performed, if necessary. In addition, although the bonding thermoplastic-resin material is dispersed only on a surface of the thermoplastic-resin sheet material, the bonding thermoplastic-resin material may be dispersed also on a surface of the reinforcing-fiber sheet material.

A sheet-like material, such as a thermoplastic resin film or a thermoplastic-resin nonwoven fabric, may be used as the thermoplastic-resin sheet material 42. It is also possible that an extrusion mechanism is prepared, thermoplastic resin pellets or powdered thermoplastic resin is mixed and melted by the extruder and extruded as a film using a T-die or the like, and the film is directly attached to the reinforcing-fiber sheet material 32. Furthermore, a sheet material formed of thermoplastic resin fiber tows arranged in a width direction in a sheet-like structure each consisting of a plurality of thermoplastic resin fibers bundled together, a sheet material formed of the thermoplastic resin fiber tows spread in a sheet-like structure, or the like may be used.

In particular, because the thermoplastic resin film has a smooth surface, it is easy to uniformly deposit the bonding thermoplastic-resin material on the entire sheet surface of the thermoplastic resin film. Accordingly, the reinforcing-fiber sheet material and the thermoplastic resin film can be securely joined even with a small amount of the bonding thermoplastic-resin material.

The bonding thermoplastic-resin material 52 is deposited by a method in which a fixed amount of the powdered bonding thermoplastic-resin material is uniformly dispersed and deposited on the surface of the reinforcing-fiber sheet material or thermoplastic-resin sheet material using the powder-dispersing apparatus 71, or a method in which the bonding thermoplastic-resin material in the form of nonwoven fabric is attached and adhered to the surface of the reinforcing-fiber sheet material or thermoplastic-resin sheet material. It is also possible to use a method in which the bonding thermoplastic-resin material is dissolved in a solvent or the like to make a solution, the solution is applied to the surface of the reinforcing-fiber sheet material or thermoplastic-resin sheet material, and the solvent is vaporized to allow the bonding thermoplastic-resin material to be deposited on the surface of the reinforcing-fiber sheet material or thermoplastic-resin sheet material. It is preferable that the bonding thermoplastic-resin material 52 be uniformly deposited on the sheet material, and the amount of deposition per unit area of the bonding thermoplastic-resin material be within 3% of the weight per unit area of the reinforcing-fiber sheet material.

FIG. 11 is an explanatory diagram related to another production process of a thermoplastic-resin-reinforced sheet material using the bonding thermoplastic-resin material. The process in which the reinforcing fiber tows 32*t* are spread into the reinforcing fiber multi-filament spread threads S2 and formed into the reinforcing-fiber sheet material 32 is the same as that shown in FIG. 10. It is an explanatory diagram related to a process of producing the thermoplastic-resin-reinforced sheet material 22, in which, after the aforementioned processes, the powdered bonding thermoplastic-resin material 52 is dispersed on a surface of the reinforcing-fiber sheet material 32, to which the thermoplastic-resin sheet material 42 is attached and thermally adhered. FIG. 11A is a plan view and FIG. 11B is a front view.

FIGS. 12 and 13 are each also an explanatory diagram related to another production process of a thermoplastic-resin-reinforced sheet material using the bonding thermoplastic-resin material. FIG. 12 is an explanatory diagram related to a process of producing the thermoplastic-resin-reinforced sheet material 22, in which the bonding thermoplastic-resin material 52 is dispersed on the thermoplastic-resin sheet material 42, to which the reinforcing-fiber sheet material 32 is attached and thermally adhered. FIG. 13 is an explanatory diagram related to a process of producing the thermoplastic-resin-reinforced sheet material 22, in which the bonding thermoplastic-resin material 52 is dispersed and thermally adhered to a surface of the thermoplastic-resin sheet material 42 of the thermoplastic-resin-reinforced sheet material obtained in FIG. 12. FIGS. 12 and 13 are front views.

In FIGS. 11, 12, and 13, the reinforcing-fiber sheet material 32 and the thermoplastic-resin sheet material 42 are joined with the bonding thermoplastic-resin material 52. At this time, because the melting or softening temperature of the bonding thermoplastic-resin material 52 capable of bonding the reinforcing-fiber sheet material and the thermoplastic-resin sheet material is lower than the melting temperature of the thermoplastic-resin sheet material 42, the temperature of the heating roll 72 can be set to a temperature lower than the melting temperature of the thermoplastic-resin sheet material. This can prevent or drastically reduce shrinkage of the thermoplastic-resin sheet material possibly caused by heating. Thus, a high-quality thermoplastic-resin-reinforced sheet material having no wavy fibers or the like can be obtained.

In FIG. 13, the bonding thermoplastic-resin material 52 is joined to each surface of the thermoplastic-resin sheet material. In this case, the total amount of deposition per unit area of the bonding thermoplastic-resin material deposited on both surfaces of the thermoplastic-resin sheet material is preferably within 3% of the weight per unit area of the reinforcing-fiber sheet material. That is, the bonding thermoplastic-resin material is used such that the total amount of deposition per unit area of the bonding thermoplastic-resin material used in the thermoplastic-resin-reinforced sheet material is within 3%, more preferably, in the range from 0.5 to 2%, of the weight per unit area of the reinforcing-fiber sheet material.

In addition, in FIG. 13, the amount of dispersion or resin type of the bonding thermoplastic-resin material 52 dispersed on the surface of the thermoplastic-resin sheet material 42 to allow the reinforcing-fiber sheet material 32 and the thermoplastic-resin sheet material 42 to be thermally adhered may be differentiated from the amount of dispersion or resin type of the bonding thermoplastic-resin material 52 dispersed on a surface of the thermoplastic-resin-reinforced sheet material 22 in the subsequent step.

From FIGS. 10 to 13, right after a plurality of reinforcing fiber tows are spread into a multi-filament spread sheet, a thermoplastic-resin sheet material is joined thereto in the same line. Thus, the thermoplastic-resin sheet material can be joined right after the distribution of the reinforcing fibers becomes good.

From FIGS. 10 to 13, the plurality of cooling rolls 74 serving as the cooling mechanism 306 are provided. Although the temperature of the cooling rolls 74 is lower than that of the heating rolls 72, if rapid cooling is needed, air cooling, water cooling, or the like may be performed. In contrast, if slow cooling is needed, gradual cooling is performed by providing the plurality of cooling rolls with a temperature gradient. Which of rapid cooling and slow cooling is to be performed may be determined from the shape of the thermoplastic-resin-reinforced sheet material to be produced.

From FIGS. 10 to 13, when the melted or softened bonding thermoplastic-resin material is adhered to the cooling roll, the following method may be adopted: After the bonding thermoplastic-resin material is dispersed, a release sheet material is disposed also on the other surface so as to sandwich the thermoplastic-resin-reinforced sheet material between the release sheet materials. Then, the sheet is allowed to run, and after the sheet is ejected from the cooling rolls, the release sheet materials are taken up.

The bonding thermoplastic-resin material is melted or softened by heating and cured by cooling. At this time, the bonding thermoplastic-resin material shrinks and causes curling of the reinforcing fibers, shrinkage of the thermoplastic-resin sheet materials, etc., which may degrade the quality of the thermoplastic-resin-reinforced sheet material. In such a case, after the bonding thermoplastic-resin material is dispersed on the thermoplastic-resin sheet material, heating and cooling are performed while pressure is applied. For example, from FIGS. 10 to 13, by applying tension to the thermoplastic-resin-reinforced sheet material and the release sheet material while the thermoplastic-resin-reinforced sheet material runs over the heating rolls and the cooling rolls, the thermoplastic-resin-reinforced sheet material is pressed against the rolls. Thus, the thermoplastic-resin-reinforced sheet material can run over the heating rolls and the cooling rolls while being subjected to continuous pressure. Furthermore, a pressing roll or the like for applying pressure may be used.

From FIGS. 10 to 13, although not shown therein, the bonding thermoplastic-resin material 52 may be dispersed on the surface of the release sheet material 62. As a result, the thermoplastic-resin-reinforced sheet material 22 and the release sheet material 62 are bonded together. Then, the thermoplastic-resin-reinforced sheet material 22 integrated with the release sheet material 62 is taken up by the reinforced sheet material take-up mechanism 310. In this case, the release sheet material take-up mechanism 309 is not needed.

From FIGS. 11 to 13, application of heat or heat and pressure is performed at a temperature lower than the temperature at which the thermoplastic-resin sheet material 42 is melted, and the thermoplastic-resin-reinforced sheet material 22 formed of the reinforcing-fiber sheet material 32 and the thermoplastic-resin sheet material 42 that are joined together with the bonding thermoplastic-resin material 52 is produced. Because heating rolls of low-temperature type may be used as the heating rolls 72, relatively low-cost rolls can be introduced. In particular, introduction of a wide heating roll also becomes easy.

Because the heating temperature is low, release paper or the like can be used as the release sheet material 62. Although a thermosetting polyimide resin sheet, a fluororesin sheet, or the like can be used as the release sheet material 62, the cost of the release sheet material increases. Thus, the use of release paper as the release sheet material 62 enables low-cost production. In addition, because the release paper is available in various widths and lengths, a wide and long thermoplastic-resin-reinforced sheet material 22 can be easily produced. Accordingly, it is possible to produce a thermoplastic-resin-reinforced sheet material having a width of 2 m or more.

In particular, when a heat-resistant thermoplastic-resin sheet material composed of a heat-resistant thermoplastic resin, such as PPS resin, PEI resin, or PEEK resin, is used as the thermoplastic-resin sheet material 42, and in a method in which the heat-resistant thermoplastic-resin sheet material is directly and thermally adhered to the reinforcing-fiber sheet material, to allow the reinforcing fibers and the thermoplastic resin to be thermally adhered, the reinforcing-fiber sheet material and the thermoplastic-resin sheet material have to be heated to a temperature at which the heat-resistant thermoplastic-resin sheet material is melted or softened at the moment when they are joined. Because such a temperature is high, equipment, release sheet material, and the like for high-temperature use have to be used. On the other hand, in a method in which the reinforcing-fiber sheet material and the heat-resistant thermoplastic-resin sheet material are joined with the bonding thermoplastic-resin material, the heating temperature may be low. Thus, equipment, release sheet material, and the like for low-temperature use can be used. Accordingly, a thermoplastic-resin-reinforced sheet material composed of a heat-resistant thermoplastic resin can be obtained while the initial cost and the running cost is further reduced.

FIG. 14 is an explanatory diagram related to a production process of a multilayer thermoplastic-resin-reinforced sheet material. FIG. 14 is an explanatory diagram related to a process for producing a multilayer thermoplastic-resin-reinforced sheet material in which, four wide thermoplastic-resin-reinforced sheet materials are sequentially stacked such that their fiber-reinforcing directions are oriented in different directions and are stitched with an integration thermoplastic-resin fiber tow.

A sheet-type multilayer thermoplastic-resin-reinforced sheet material producing apparatus 400 shown in FIG. 14 consists of an $\alpha°$ direction sheet material feeding mechanism 401, a 90° direction sheet material feeding mechanism 402, a $-\alpha°$ direction sheet material feeding mechanism 403, a 0° direction sheet material feeding mechanism 404, a stitch-type integration mechanism 405, and a sheet material take-up mechanism 406.

The sheet material feeding mechanisms 401 to 404 of the respective directions are configured to draw the thermoplastic-resin-reinforced sheet materials 21 from the thermoplastic-resin-reinforced sheet material reels 21b and feed. The mechanisms 401 to 403 draw the thermoplastic-resin-reinforced sheet materials 21 in predetermined directions by a length equal to or greater than the width of the multilayer thermoplastic-resin-reinforced sheet material 11, cut them off from the thermoplastic-resin-reinforced sheet material reels 21b with a cutting mechanism (not shown), and attach them to running rails 81 at both ends that allow the multilayer thermoplastic-resin-reinforced sheet material 11 to run. At this time, by attaching such that the leading edge of a thermoplastic-resin-reinforced sheet material to be attached abuts on the trailing edge of the preceding thermoplastic-resin-reinforced sheet material that is already attached and running, a sheet that is fiber-reinforced in predetermined directions and has no gaps or overlaps in the layers of the multilayer thermoplastic-resin-reinforced sheet material can be formed. Pins (not shown) or the like, to which the attached thermoplastic-resin-reinforced sheet materials can be fixed, are embedded in the running rails 81. The mechanism 404 has one or more thermoplastic-resin-reinforced sheet material reels 21b (not shown) such that a length equal to the width of the multilayer thermoplastic-resin-reinforced sheet material 11 is obtained, and continuously feeds the thermoplastic-resin-reinforced sheet material 21 in the 0° direction.

The mechanisms 401 and 403 feed the thermoplastic-resin-reinforced sheet materials in the $\alpha$-degree and $-\alpha°$ directions. At this time, although $\alpha°$ can be set in the range of $0°<\alpha°<90°$, it is preferable that $\alpha°$ be set in the range from 30 to 60°, from the standpoint of the size and ease of handling of the apparatus. In addition, although the feeding directions, feeding number, feeding order, etc., of the thermoplastic-resin-reinforced sheet materials can be freely set, they are preferably set according to the design of the molding. For example, when a quasi-isotropy material is to be obtained, a preferable stacking sequence of the thermoplastic-resin-reinforced sheet materials is [45°/0°/−45°/90°], [45°/−45°/0°/90°], or the like.

Then, the stacked thermoplastic-resin-reinforced sheet materials 21 are stitched with the integration thermoplastic-resin fiber tow 51 by the integration mechanism 405 by warp knitting or the like. Thus, the multilayer thermoplastic-resin-reinforced sheet material 11 having the layers stitched together is obtained. The resulting multilayer thermoplastic-resin-reinforced sheet material 11 is taken up on the multilayer thermoplastic-resin-reinforced sheet material reel 11b by the sheet material take-up mechanism 406.

At this time, stitching with the integration thermoplastic-resin fiber tow 51 is performed at a certain interval in the width direction of the multilayer thermoplastic-resin-reinforced sheet material 11. A reduction in the interval increases the amount of the integration thermoplastic-resin fiber tow 51, which increases the amount of the base material (matrix) and decreases the fiber volume content when a finished molding is to be obtained. In contrast, an increase in the interval makes it difficult to handle the multilayer thermoplastic-resin-reinforced sheet material 11 as a sheet, which makes it difficult to cut and stack the multilayer thermoplastic-resin-reinforced sheet material 11. The stitching interval of the integration thermoplastic-resin fiber tow 51 should be determined according to the design of the molding.

FIG. 15 is an explanatory diagram related to a mechanism used in the sheet material feeding mechanisms 401 to 403 shown in FIG. 14, which feeds the narrow thermoplastic-resin-reinforced sheet materials 21H arranged in the width direction while producing them.

While the thermoplastic-resin-reinforced sheet material 21 is drawn from the thermoplastic-resin-reinforced sheet material reel 21b wound with the wide thermoplastic-resin-reinforced sheet material 21, the thermoplastic-resin-reinforced sheet material 21 is continuously cut in the sheet length direction, at a desired interval in the width direction, with a plurality of cutter blades 82 arranged at a desired interval in the width direction of the thermoplastic-resin-reinforced sheet material 21 and a cutter-blade receiving roll 83. Thus, the plurality of narrow thermoplastic-resin-reinforced sheet materials 21H are fed while being produced. The width of the narrow thermoplastic-resin-reinforced sheet materials is determined according to the design of the resulting multilayer thermoplastic-resin-reinforced sheet material. When an improvement of the drapeability of the sheet is taken into consideration, a smaller width is better. However, an excessively small width can result in breakage of the narrow thermoplastic-resin-reinforced sheet materials, and their continuity can be lost. Therefore, the width is preferably in the range from 1 mm to 20 mm, and more preferably, in the range from 2 mm to 10 mm.

By adopting this mechanism, the plurality of narrow thermoplastic-resin-reinforced sheet materials 21H arranged in the width direction can be efficiently fed. Although the cutter blades 82 may be either rotatable or fixed, a method in which the round cutter blades 82 freely rotatable in response to running of the thermoplastic-resin-reinforced sheet material 21 and the receiving roll 83 below the cutter blades are provided, between which the thermoplastic-resin-reinforced sheet material 21 is allowed to run to be cut, is one of the methods for cutting the thermoplastic-resin-reinforced sheet material 21 while preventing the reinforcing fibers from being frayed. A method using a laser may be employed to cut the wide thermoplastic-resin-reinforced sheet material 21 at a desired interval in the width direction.

FIG. 16 is an explanatory diagram related to an apparatus 500 for producing the plurality of narrow thermoplastic-resin-reinforced sheet materials 21H from the wide thermoplastic-resin-reinforced sheet material 21 and for winding the narrow thermoplastic-resin-reinforced sheet materials on the bobbins or the like.

The narrow thermoplastic-resin-reinforced sheet material producing apparatus 500 consists of a sheet material feeding mechanism 501, a sheet material cutting mechanism 502, and a narrow-sheet-material take-up mechanism 503. The sheet material feeding mechanism 501 draws the wide thermoplastic-resin-reinforced sheet material 21 from the thermoplastic-resin-reinforced sheet material reel 21b at a constant tension. Then, the sheet material cutting mechanism 502 continuously cuts the thermoplastic-resin-reinforced sheet material 21 in the sheet length direction, at a desired interval in the width direction. Thus, the plurality of narrow thermoplastic-resin-reinforced sheet materials 21H are produced. Take-over rolls 84 allow the resulting narrow thermoplastic-resin-reinforced sheet materials 21H to run at a constant speed. The sheet material cutting mechanism 502 is substantially the same mechanism as the one shown in FIG. 15 and consists of the plurality of cutter blades 82 arranged at a desired interval in the width direction of the thermoplastic-resin-reinforced sheet material 21 and the cutter-blade receiving roll 83. The plurality of narrow thermoplastic-resin-reinforced sheet materials discharged from the take-over rolls 84 are taken up on respective bobbins 21Hb or the like while being traversed, by the narrow-sheet-material take-up mechanism 503. At this time, depending on the width, the narrow thermoplastic-resin-reinforced sheet materials 21H may be wound in a tape-like form without being traversed.

In FIGS. 15 and 16, a method for producing the plurality of narrow thermoplastic-resin-reinforced sheet materials 21H by continuously cutting the wide thermoplastic-resin-reinforced sheet material 21 in the sheet length direction, at a desired interval in the width direction, is shown. As another method, using the apparatus shown in FIG. 9, a narrow thermoplastic-resin-reinforced sheet material may be formed by joining a narrow thermoplastic-resin-reinforced sheet material to a surface of a narrow reinforcing-fiber sheet material, and the narrow thermoplastic-resin-reinforced sheet material may be wound on the bobbin or the like.

FIG. 17 is an explanatory diagram related to a process for producing the multilayer thermoplastic-resin-reinforced sheet material 11 in which, while the thermoplastic-resin-reinforced sheet materials 21 are formed from the narrow thermoplastic-resin-reinforced sheet materials 21H obtained in FIG. 16, four of them are sequentially stacked such that their fiber-reinforcing directions are oriented in different directions and stitched with the integration thermoplastic-resin fiber tow 51. A narrow-sheet-type multilayer thermoplastic-resin-reinforced sheet material producing apparatus 600 shown in FIG. 17 consists of an α° direction narrow-sheet-material feeding mechanism 601, a 90° direction narrow-sheet-material feeding mechanism 602, a −α° direction narrow-sheet-material feeding mechanism 603, a 0° direction narrow-sheet-material feeding mechanism 604, a stitch-type integration mechanism 605, and a sheet material take-up mechanism 606.

The narrow-sheet-material feeding mechanisms of the respective directions in the mechanisms 601 to 604 draw the narrow thermoplastic-resin-reinforced sheet materials 21H from the plurality of narrow thermoplastic-resin-reinforced sheet material bobbins 21Hb, arrange them in a sheet-like structure, and feed. The mechanism 601 to 603 each arrange the plurality of narrow thermoplastic-resin-reinforced sheet materials 21H in a sheet-like structure, hook them on an edge of the running rails 81 at both ends, which allow the multilayer thermoplastic-resin-reinforced sheet material 11 to run, guide them toward the other edge, and hook them on the other edge. By repeating this operation, the thermoplastic-resin-reinforced sheet materials in the respective layers are formed. At this time, the narrow thermoplastic-resin-reinforced sheet materials 21H are continuous without being cut, and the plurality of narrow thermoplastic-resin-reinforced sheet materials 21H are arranged with almost no gaps or overlaps in a sheet-like structure that is fiber-reinforced in predetermined directions. Pins (not shown) or the like are embedded in the running rails 81 so that the plurality of narrow thermoplastic-resin-reinforced sheet materials can be hooked and fixed. The mechanism 604 arranges the plurality of narrow thermoplastic-resin-reinforced sheet materials in a sheet-like structure such that a length equal to the width of the multilayer thermoplastic-resin-reinforced sheet material 11 can be provided, and continuously feeds the narrow thermoplastic-resin-reinforced sheet materials arranged in a sheet-like structure in the 0° direction.

The mechanisms 601 and 603 feed the narrow thermoplastic-resin-reinforced sheet materials in $\alpha$-degree and $-\alpha°$ directions. Similarly to the sheet-type multilayer thermoplastic-resin-reinforced sheet material producing apparatus 400 shown in FIG. 14, although $\alpha°$ can be set in the range of $0°<\alpha°<90°$, it is preferable that it be set in the range from 30 to 60° from the standpoint of the size and ease of handling of the apparatus. In addition, although the feeding directions, feeding number, feeding order, etc., of the narrow thermoplastic-resin-reinforced sheet materials to be fed can be freely set, they are preferably set according to the design of the molding.

Then, the thermoplastic-resin-reinforced sheet materials each formed of the plurality of narrow thermoplastic-resin-reinforced sheet materials 21H are stacked and stitched with the integration thermoplastic-resin fiber tow 51 by the stitch-type integration mechanism 605 by warp knitting or the like. Thus, the multilayer thermoplastic-resin-reinforced sheet material 11 having the layers stitched together is obtained. The stitching interval of the integration thermoplastic-resin fiber tow 51 should be determined according to the design of the molding or the like. The resulting multilayer thermoplastic-resin-reinforced sheet material 11 is taken up by the sheet material take-up mechanism 606 on the multilayer thermoplastic-resin-reinforced sheet material reel 11b.

FIG. 18 is an explanatory diagram related to a heat-integration mechanism 700 usable in stead of the stitch-type integration mechanism in the apparatus shown in FIGS. 14 and 17.

The heat-integration mechanism 700 allows the thermoplastic-resin-reinforced sheet materials, after being stacked, to run with the release films 61 fitted to the top and bottom surfaces thereof and applies heat or heat and pressure to the stacked thermoplastic-resin-reinforced sheet materials with heating rolls 85. Thus, the thermoplastic-resin sheet materials of the respective layers are melted and thermally adhered to the reinforcing-fiber sheet materials in upper and lower layers. After the melted thermoplastic-resin sheet materials are cured by cooling rolls 86 and the respective layers of the thermoplastic-resin-reinforced sheet materials are bonded together, the release films on the top and bottom surfaces are removed. Thus, the multilayer thermoplastic-resin-reinforced sheet material 11 is obtained. In FIG. 18, application of heat or heat and pressure at a higher speed is enabled by using the two pairs of heating rolls 85.

FIG. 19 is an explanatory diagram related to the heating rolls 85 used in the heat-integration mechanism 700 shown in FIG. 18. When a roll 85A having a flat roll surface as shown in FIG. 19A is used as the heating roll 85, heat or heat and pressure can be applied to the entire sheet surface of the stacked thermoplastic-resin-reinforced sheet materials. When a roll 85B having a patterned roll surface as shown in FIG. 19B is used, heat or heat and pressure can be applied not to the entire sheet surface of the stacked thermoplastic-resin-reinforced sheet materials, but to parts thereof.

A multilayer thermoplastic-resin-reinforced sheet material formed by partially applying heat or heat and pressure so as to partially bond the stacked thermoplastic-resin-reinforced sheet materials allows the layers of the thermoplastic-resin-reinforced sheet materials to be slightly moved or shifted from each other. Thus, the sheet material can have better drapeability.

Although a method using heating rolls as shown in FIG. 18 has been described as a method for applying heat or heat and pressure to the stacked thermoplastic-resin-reinforced sheet materials, another method is also possible. For example, a method using hot press plates, a method employing a double press method using metal belts, or the like may be used.

FIG. 20 is an explanatory diagram related to a production process for obtaining a thermoplastic-resin multilayer reinforced molding A from the multilayer thermoplastic-resin-reinforced sheet material 11. The multilayer thermoplastic-resin-reinforced sheet material 11 formed by the multilayer thermoplastic-resin-reinforced sheet material producing apparatuses 400 and 600 is cut into pieces having a desired size, at a desired angle. After thermoplastic-resin-reinforced sheet materials L1 and L2, after being cut, are stacked in a shaping lower metal mold 92 placed in a hot press molding apparatus 90, a shaping upper metal mold 91 is lowered and hot pressing is performed to allow the reinforcing fibers to be impregnated with the thermoplastic-resin sheet material, and, in the case of stitch-integration, with the integration thermoplastic-resin fiber tow. After cooling, the molded thermoplastic-resin multilayer reinforced molding A is taken out of the shaping metal molds.

Although two thermoplastic-resin-reinforced sheet materials L1 and L2 are cut out from the thermoplastic-resin-reinforced sheet material 11 in FIG. 20, the number of them is not limited to two. Depending on the design, a necessary number of sheet materials is cut out and stacked. Furthermore, it is desirable that the cutting angle be changed if necessary. When stacked, they may be placed upside-down in the metal molds, if necessary.

Because the resulting thermoplastic-resin multilayer reinforced molding A has aggregated fibers and the thermoplastic-resin sheet material in each layer, the reinforcing fiber tows are thoroughly impregnated with the thermoplastic resin, and the resulting molding has few voids (gaps). Furthermore, because the impregnation distance of the thermoplastic resin is reduced, the molding has excellent straightness and distribution of the reinforcing fibers, as well as excellent surface smoothness.

Another production process for obtaining the thermoplastic-resin multilayer reinforced molding will be described below. In FIG. 21, the multilayer thermoplastic-resin-reinforced sheet material 11 formed by the multilayer thermoplastic-resin-reinforced sheet material producing apparatuses 400 and 600 is cut into pieces having a desired size, at a desired angle, and the thermoplastic-resin-reinforced sheet materials L1 and L2, after being cut, are stacked on a flat lower metal mold 94, serving as a preforming lower mold, placed in the hot press molding apparatus 90. Then, a flat upper metal mold 93, serving as a preforming upper mold, is lowered, and hot pressing is performed to allow the reinforcing fibers to be impregnated with the thermoplastic-resin sheet material, and, in the case of stitch-integration, with the integration thermoplastic-resin fiber tow. After cooling, a preformed laminate B is taken out. Because the preforming molds are flat, the preformed laminate B is a flat laminate. Then, the preformed laminate B is heated by a heating unit 95 employing a heating method such as a far-infrared method or the like until the thermoplastic resin serving as the base material (matrix) is softened and melted. Thereafter, the preformed laminate B in that state is placed in the shaping lower metal mold 92 provided in a cold press molding apparatus 96. Then, the shaping upper metal mold 91 is immediately lowered and pressing is performed to form the preformed laminate B into a desired shape. Thus, the thermoplastic-resin multilayer reinforced molding A is obtained.

Because a preformed laminate is formed of the multilayer thermoplastic-resin-reinforced sheet material, the laminate has excellent straightness and distribution of the reinforcing fibers, as well as excellent surface smoothness, and has few voids. Furthermore, because a molding is formed from the preformed laminate, the resulting thermoplastic-resin multilayer reinforced molding is a high-quality molding having excellent straightness and distribution of the reinforcing fibers, as well as excellent surface smoothness, and having few voids. Making preforming molds have a flat shape to form a plate-shaped preformed laminate is preferable because there are advantages in that fabrication of the metal molds is easy, short-time forming is easy, and high-quality laminates can be easily produced.

Although it is thought that the molding time is required because press molding is performed twice, there are advantages in that the production of a plate-shaped laminate or the like, as a preformed laminate, is easy, and the processing time of a molding can be reduced because, when the preformed laminate is formed into a molding, the shaping metal molds can be maintained at a constant temperature (cooled state) and alternate heating and cooling of the shaping metal molds is not necessary. Accordingly, the resulting thermoplastic-resin multilayer reinforced molding is a low-cost molding.

Next, an embodiment related to a method for forming a thermoplastic-resin composite-material molding of the present invention will be described. FIG. 22 is a cross-sectional view showing a state in which a molding material 1, which is a multilayer thermoplastic-resin-reinforced sheet material, is disposed between a pair of shaping molds, 100 and 101. The shaping molds 100 and 101 are formed by processing thin plates having the same thickness, and in this example, stepped portions 100a and 101a are formed such that the shaping molds 100 and 101 are recessed downward in the middle. A material that exhibits little thermal deformation during heating and cooling and has excellent thermal conductivity is preferable for the material of the shaping molds 100 and 101. Although examples of such a material include a metal material, such as iron, and a carbon fiber carbon composite material, referred to as a "CC composite", the carbon fiber carbon composite material is particularly preferable.

Although thin plates are used as the shaping molds in this example, as long as contact portions, with which the molding material 1 is in contact, are formed to have a uniform thickness, the thicknesses of portions other than the contact portions may be different. In addition, the contact portions of the shaping molds with respect to the molding material are formed to have a uniform thickness so as to obtain uniform thermal conductivity. By reducing the thickness, the thermal conductivity can be increased.

In the molding material 1, a thermoplastic resin material is unevenly distributed between layers consisting of reinforcing fiber materials. In this example, the molding material 1 is formed by stacking a plurality of thermoplastic-resin-reinforced sheet materials 2 each formed of a reinforcing-fiber sheet material 3 and a thermoplastic-resin sheet material 4. The molding material 1 has excellent drapeability and is disposed such that the layer direction thereof extends along the mold surfaces of the shaping molds 100 and 101. A gas-discharging space 102 is formed around the molding material 1, between peripheral portions 100b and 101b of the shaping molds 100 and 101, and the peripheral portion of the molding material 1 is open without being closed.

As a molding material used in the present invention, a molding material in which a thermoplastic resin material serving as a matrix is unevenly distributed between layers formed of arranged reinforcing fiber materials is preferable, and in addition to the above-described multilayer thermoplastic-resin-reinforced sheet material, a molding material in which a thermoplastic resin material in powder or staple form is distributed between layers formed of arranged reinforcing fiber materials or a molding material in which a thermoplastic resin material in nonwoven fabric or fabric form is disposed between the layers can be used. Furthermore, a prepreg sheet formed of a reinforcing fiber material impregnated with a thermoplastic resin material may be used as a molding material.

The shaping molds 100 and 101 holding the molding material 1 therebetween are arranged so as to clamp the molding material 1 at a predetermined distance with a fastening member (not shown). If the molding material 1 can be held in a stable clamped state at a predetermined distance by the weight of the shaping mold 101, the fastening member does not need to be used.

To improve the releasability of a shaped molding, it is preferable that a release treatment, i.e., application of a known release agent, be performed on the surfaces of the shaping molds 100 and 101 to be in contact with the molding material 1. Alternatively, to improve the releasability, a release sheet material may be provided at portions of the molding material to be in contact with the shaping molds. As the release sheet material, a release film such as a polyolefin resin sheet, a thermosetting polyimide resin sheet, or a fluororesin sheet, or release paper may be selected.

FIG. 23 is an explanatory diagram showing a process of forming the molding material 1 placed between the shaping molds 100 and 101. First, as described with reference to FIG. 22, the molding material 1 is placed and clamped at a predetermined distance between the shaping molds 100 and 101 (FIG. 23A).

Next, the shaping molds 100 and 101, holding the molding material 1 therebetween, is set in a hot press 103 (FIG. 23B). Hot press molds 104 and 105 have mold surfaces formed in the same shape as the shaping molds 100 and 101. The lower hot press mold 104 has in its mold surface a stepped portion formed to fit the contact surface of the shaping mold 100. Similarly, the upper hot press mold 105 has in its mold surface a stepped portion formed to fit the contact surface of the shaping mold 101.

The hot press molds 104 and 105 are preliminarily heated to a predetermined heating temperature by a built-in heater and clamp the shaping molds 100 and 101 placed between the hot press molds 104 and 105 from both sides in the top-bottom direction to perform hot pressing. The heating temperature and the pressing pressure may be adequately set according to the material of the molding material.

During application of heat and pressure by the hot press molds, because the hot press molds and the shaping molds are in close contact, thermal conductivity is excellent, and because the shaping molds are formed to have a uniform thickness, the conducted heat is substantially uniformly applied to the entire molding material. Thus, the entire molding material is substantially uniformly heated. As a result, the entire thermoplastic-resin sheet material 4 arranged substantially parallel to the contact surfaces of the shaping molds is substantially simultaneously heated and melted, and then impregnated into the entire reinforcing-fiber sheet materials 3 on both sides thereof.

When the reinforcing-fiber sheet materials 3 are gradually impregnated with the thermoplastic resin material from both sides, the internal air flows and is discharged into the gas-discharging space 102 through the peripheral portion of the molding material 1. Thus, impregnation of the thermoplastic resin material is performed while the internal air of the reinforcing-fiber sheet materials 3 is efficiently discharged without remaining in the inside.

After the hot pressing, the shaping molds 100 and 101 are taken out of the hot press and set in a cold press 106 (FIG. 23C). Mold surfaces of cold press molds 107 and 108 are formed in the same shape as the shaping molds 100 and 101. The lower cold press mold 107 has in its mold surface a stepped portion formed to fit the contact surface of the shaping mold 100. Similarly, the upper hot press mold 108 has in its mold surface a stepped portion formed to fit the contact surface of the shaping mold 101.

The cold press molds 107 and 108 are preliminarily set to a predetermined cooling temperature (for example, a normal temperature state) by a cooling unit (not shown) and clamp the shaping molds 100 and 101 placed between the cold press molds 107 and 108 from both sides in the top-bottom direction to perform cold pressing. The cooling temperature and the pressing pressure may be adequately set according to the material of the molding material.

By performing cooling while applying pressure with the cold press molds, the thermoplastic resin material melted and impregnated inside the molding material 1 is cured while being subjected to pressure. At this time, as described above, because the thickness of the shaping molds 100 and 101 is set to be uniform, the thermal conductivity of the entire molding material 1 is substantially uniform, and the entire molding material 1 is substantially uniformly cooled. Therefore, the thermoplastic resin material is evenly cooled and cured, and the molding A having no warpage can be obtained (FIG. 23D).

FIG. 24 is an explanatory diagram of a process related to another embodiment for forming the molding material 1 using the shaping molds 100 and 101. In this example, a ring-shaped seal member 110 is disposed at the entire peripheral portion of the shaping mold 100. A tube 109 connected to an air suction unit (not shown) communicates with the shaping mold 101.

First, the molding material 1 is placed in the shaping mold 100, and the shaping mold 101 is placed on the molding material 1. The shaping molds 100 and 101 are then fastened with a fastening member (not shown) so as to clamp the molding material 1 (FIG. 24A). At this time, the seal member 110 is compressed by the shaping molds, making the inside in an airtight state. The tube 109 is attached so as to communicate with the gas-discharging space 102 provided at the peripheral portions of the shaping molds 100 and 101. After the inside of the shaping molds is brought into an airtight state by the seal member 110, the air suction unit is activated to bring the inside into a vacuum or reduced pressure state (FIG. 24B). In this case, the term "reduced pressure state" refers to a pressure state close to vacuum, which is, for example, a pressure state of 10 Torr or less.

Then, the shaping molds 100 and 101 in a vacuum or reduced pressure state are placed in the hot press 103 similar to that in the embodiment described with reference to FIG. 23, and are subjected to hot pressing (FIG. 24C). The heating allows the thermoplastic resin material in the molding material to be melted and impregnated. Because the inside of the shaping molds is in a vacuum or reduced pressure state, the melted thermoplastic resin material is sucked and impregnation into the reinforcing-fiber sheet material is accelerated. Thus, impregnation can be performed in a short time, without allowing air to remain inside.

After the hot pressing, cold pressing is performed with the cold press 106 similar to that in the embodiment described with reference to FIG. 23 (FIG. 24D). The melted and impregnated thermoplastic resin material is evenly cured through cooling, whereby the molding A having no warpage can be formed (FIG. 24E).

As shown in FIGS. 25A and 25B, when the seal member 110 is attached to the shaping molds, by forming groove portions 100c and 101c in the peripheral portions of the shaping molds 100 and 110 and by fitting the seal member 110 to the groove portions 100c and 101c to create an airtight state, an airtight structure can be more assuredly achieved in the inside of the shaping molds.

FIG. 26 is an explanatory diagram of a process related to an embodiment in which a plurality of molding materials are simultaneously molded. In this example, four flat shaping molds 111 are used. Molding materials 1A, 1B, and 1C are disposed between the shaping molds 111, and the shaping molds 111 are fastened with a fastening member (not shown) so as to clamp the molding materials at a predetermined distance (FIG. 26A).

Then, the shaping molds 111 are placed between hot press molds 104' and 105' of the hot press 103 (FIG. 26B). The hot press molds 104' and 105' have flat mold surfaces, and hot pressing is performed such that they are in close contact with the shaping molds 111. Because the thicknesses of the contact portions of the shaping molds 111 with respect to the molding materials are all the same, the thermal conductivity from the hot press molds 104' and 105' to the respective molding materials is substantially uniform. Thus, the entire thermoplastic resin materials in the respective molding materials are substantially simultaneously melted and impregnated.

The shaping molds 111 after the hot pressing are then placed between cold press molds 107' and 108' of the cold press 106 (FIG. 26C). The cold press molds 107' and 108' have flat mold surfaces, and cold pressing is performed such that they are in close contact with the shaping molds 111. The melted and impregnated thermoplastic resin material is evenly cured and molded through cold pressing, and the molding materials are each finished as a molding B having no warpage.

Thus, the use of a plurality of shaping molds having the same shape enables a plurality of molding materials to be formed simultaneously and the production efficiency to be significantly improved. Moreover, by fitting the seal member, as shown in FIG. 24, between the shaping molds to make the inside in a vacuum or reduced pressure state, impregnation of the melted thermoplastic resin material can be accelerated.

In the above-described embodiments, one hot press and one cold press are used. However, a plurality of hot presses or cold presses may be used to perform molding. In such a case, by differentiating heating-temperatures of the hot presses and performing hot pressing several times sequentially from low heating temperatures to high heating temperatures, melting and impregnation of the thermoplastic resin materials in the molding material can be assuredly performed. In addition, by differentiating cooling temperatures of the cold presses and performing cold pressing several times sequentially from high cooling temperatures to low cooling temperatures, the thermoplastic resin materials impregnated into the molding material can be assuredly cured.

EXAMPLE

Example 1

Using the following materials, a multilayer thermoplastic-resin-reinforced sheet material was produced.
<Materials Used>
(Fiber Tow Used as Reinforcing Fiber Tow)
TR50S-15K, fiber diameter: about 7 μm, number of fibers: 15000, produced by MITSUBISHI RAYON CO., LTD.
(Resin Used as Thermoplastic-Resin Sheet Material)
Nylon 6 resin film, film thickness: 20 μm, produced by Mitsubishi Chemical Corporation
(Fiber Tow Used as Integration Thermoplastic-Resin Fiber Tow)
Nylon 6 multi-filaments, 77 dtex-24 filaments, produced by Toray Industries, Inc.
<Production Process>
(1) Sixteen filaments of reinforcing fiber tow TR50S-15K were set 20 mm apart. Using a method for simultaneously spreading multiple filaments by air (refer to Patent Document 9), each reinforcing fiber tow was spread to a width of 20 mm.
(2) The reinforcing fiber multi-filament spread threads, each spread to a width of 20 mm, were vibrated in the width direction and formed into a reinforcing-fiber sheet material having no gaps between the reinforcing fiber multi-filament spread threads. The resulting reinforcing-fiber sheet material had a width of 320 mm and a fiber weight (fiber weight per unit area) of about 50 g/m².
(3) The resulting reinforcing-fiber sheet material was continuously fed to a heating mechanism by the production apparatus as shown in FIG. 9, and joined to a thermoplastic-resin sheet material. At this time, the temperature of the heating mechanism was controlled at about 270°. A thermosetting polyimide resin film (product name: UPILEX-S, thickness: 25 μm, manufacturer: UBE INDUSTRIES, LTD.), serving as a release film, was fed together with the reinforcing-fiber sheet material. The thermoplastic-resin-reinforced sheet material was joined to the reinforcing-fiber sheet material at a speed of 10 m/min.
(4) By removing the release film from the base fabric discharged from a cooling mechanism, a thermoplastic-resin-reinforced sheet material formed of the reinforcing-fiber sheet material and the thermoplastic-resin sheet material joined to a surface thereof was obtained.
(5) The resulting thermoplastic-resin-reinforced sheet materials were stacked in 45° direction, 0° direction, −45° direction, and 90° direction into a laminate sheet having a width of 320 mm by the production apparatus as shown in FIG. 14, and sewn with an integration thermoplastic-resin fiber tow with a zigzag stitch in 0° direction at an interval of 20 mm. Thus, a multilayer thermoplastic-resin-reinforced sheet material was obtained.
<Evaluation>

The resulting multilayer thermoplastic-resin-reinforced sheet material was a multiaxially reinforced sheet material that was fiber-reinforced in [45°/0°/−45°/90°] directions, in each layer of which the reinforcing fibers were formed in a sheet-like structure and the thermoplastic-resin sheet material was joined to a surface thereof. In the respective thermoplastic-resin-reinforced sheet materials, the reinforcing fibers were straight, uniformly distributed, and arranged in one direction. The thermoplastic-resin sheet material joined thereto prevented the reinforcing fibers from bundling or being unraveled and frayed.

Example 2

A plurality of narrow thermoplastic-resin-reinforced sheet materials were formed from the thermoplastic-resin-reinforced sheet material obtained by going through (1) to (4) of Example 1. Then, a multilayer thermoplastic-resin-reinforced sheet material was produced.
<Materials Used>

The reinforcing fiber tow, the thermoplastic-resin sheet material, and the integration thermoplastic-resin fiber tow were the same as those used in Example 1.
<Production Process>
(1) A thermoplastic-resin-reinforced sheet material having a width of 320 mm was formed by going through (1) to (4) of Example 1.
(2) Using the production apparatus as shown in FIG. 16, the resulting thermoplastic-resin-reinforced sheet material was continuously cut at a width of 10 mm, and 32 strips of narrow thermoplastic-resin-reinforced sheet materials were obtained. The cutter blade and the cutting method adopted at this time were round cutter blades freely rotatable in response to running of the thermoplastic-resin-reinforced sheet material and a method in which the thermoplastic-resin-reinforced sheet material was press-cut between the cutter blades and a cutter-blade receiving roll. Then, the resulting narrow thermoplastic-resin-reinforced sheet materials were taken up in a tape-like form. The wide thermoplastic-resin-reinforced sheet material was cut at a speed of 10 m/min.
(3) The 32 strips of the narrow thermoplastic-resin-reinforced sheet materials taken up in a tape-like form were arranged in the width direction in wide sheet-like structures without leaving gaps. Then, using the production apparatus as shown in FIG. 14, the sheet materials were stacked in 45° direction, 0° direction, −45° direction, and 90° direction into a laminate sheet having a width of 320 mm, and sewn with an integration thermoplastic-resin fiber tow with a zigzag stitch in 0° direction at an interval of 10 mm. Thus, a multilayer thermoplastic-resin-reinforced sheet material was obtained.
<Evaluation>

The resulting multilayer thermoplastic-resin-reinforced sheet material was a multiaxially reinforced sheet material that was fiber-reinforced in [45°/0°/−45°/90°], in each layer of which the narrow reinforcing fibers were formed in a sheet-like structure and the narrow thermoplastic-resin sheet materials were joined to a surface thereof. In the respective thermoplastic-resin-reinforced sheet materials, the reinforcing fibers were straight, uniformly distributed, and arranged in one direction. The thermoplastic-resin sheet material joined thereto prevented the reinforcing fibers from bundling or being unraveled and frayed. In addition, possibly because the thickness of the thin reinforcing-fiber sheet materials is small, fray of the reinforcing fibers at the edges of the cut narrow thermoplastic-resin-reinforced sheet materials was negligible, and handling was easy.

Example 3

A multilayer thermoplastic-resin-reinforced sheet material was produced by stacking a plurality of thermoplastic-resin-reinforced sheet materials obtained by going through (1) to (4) of Example 1 and subjecting them to hot pressing to bond the layers by thermal adhesion.
<Materials Used>
The reinforcing fiber tow and the thermoplastic-resin sheet material were the same as those used in Example 1.
<Production Process>
(1) A thermoplastic-resin-reinforced sheet material having a width of 320 mm was formed by going through (1) to (4) of Example 1.
(2) The resulting thermoplastic-resin-reinforced sheet materials were stacked in 45° direction, 0° direction, −45° direction, and 90° direction into a laminate sheet having a width of 320 mm by the production apparatus as shown in FIG. 14, and subjected hot pressing in the production apparatus as shown in FIG. 18. Thus, a multilayer thermoplastic-resin-reinforced sheet material was obtained. As the production apparatus, a single heating roll having a flat roll surface as shown in FIG. 19A was used. The thermosetting polyimide resin film (product name: UPILEX-S, thickness: 25 μm, manufacturer: UBE INDUSTRIES, LTD.) was used as a release film. The surface temperature of the heating roll was controlled at about 270°. The processing speed was 3 m/min.
<Evaluation>
Although hot pressing was performed on the entire sheet using the flat-surface heating roll, not the entire sheet in each layer was thermally adhered, and there were some parts not thermally adhered. However, because the respective reinforcing-fiber sheet materials were thermally adhered to the overlying and underlying thermoplastic-resin sheet materials in most part and were unable to come apart, they were obtained as an integrally bonded multilayer thermoplastic-resin-reinforced sheet material. The reinforcing fibers were straight also at the thermally adhered portions, and the layers were in a high-quality state in which the reinforcing fibers were straight and uniformly distributed.

Example 4

Using the following materials, a multilayer thermoplastic-resin-reinforced sheet material different from Example 1 was produced.
<Materials Used>
The reinforcing fiber tow, the thermoplastic-resin sheet material, and the integration thermoplastic-resin fiber tow were the same as those used in Example 1.
<Production Process>
(1) A production apparatus having another set of a multiple-fiber-tow feeding mechanism, a multiple-fiber-tow spreading mechanism, a longitudinal-vibration applying mechanism, and a width-direction-vibration applying mechanism disposed opposite the heating mechanism of the thermoplastic-resin-reinforced sheet material producing apparatus as shown in FIG. 9 was used. Eight filaments of reinforcing fiber tow TR50S-15K were set 40 mm apart in each of the multiple-fiber-tow feeding mechanisms. While the longitudinal-vibration applying mechanisms were applying longitudinal vibration to the reinforcing fiber tows, the multiple-fiber-tow spreading mechanisms spread the reinforcing fiber tows into reinforcing fiber multi-filament spread threads having a width of about 40 mm. Then, the width-direction-vibration applying mechanisms applied vibration in the width direction to the reinforcing fiber multi-filament spread threads to form continuous reinforcing-fiber sheet materials having a width about 320 mm and a fiber weight (fiber weight per unit area) of about 25 g/m$^2$ having no gaps between the reinforcing fiber multi-filament spread threads.
(2) Thereafter, while the reinforcing-fiber sheet materials were continuously fed from both sides of the heating mechanism, a thermoplastic-resin sheet material was continuously inserted between the reinforcing-fiber sheet materials. Then, the reinforcing-fiber sheet materials were joined to both surfaces of the thermoplastic-resin sheet material by the heating mechanism. At this time, the temperature of the heating mechanism was controlled at about 270°. The thermosetting polyimide resin film (product name: UPILEX-S, thickness: 25 μm, manufacturer: UBE INDUSTRIES, LTD.), serving as a release film, was fed together with the reinforcing-fiber sheet materials. The speed at which the reinforcing fiber tows were spread and formed into the reinforcing-fiber sheet materials, and the processing speed at which the reinforcing-fiber sheet materials were joined to both surfaces of the thermoplastic-resin sheet material were both 10 m/min.
(3) By removing the release film from the base fabric discharged from the cooling mechanism, a thermoplastic-resin-reinforced sheet material as shown in FIG. 3A, in which the reinforcing-fiber sheet materials were joined to both surfaces of the thermoplastic-resin sheet material, was obtained.
(4) The resulting thermoplastic-resin-reinforced sheet materials were stacked in 45° direction, 0° direction, −45° direction, and 90° direction into a laminate sheet having a width of 320 mm by the production apparatus as shown in FIG. 14, and sewn with the integration thermoplastic-resin fiber tow with a zigzag stitch in 0° direction at an interval of 20 mm. Thus, a multilayer thermoplastic-resin-reinforced sheet material was obtained.
<Evaluation>
The resulting multilayer thermoplastic-resin-reinforced sheet material was a multiaxially reinforced sheet material that was fiber-reinforced in [45°/0°/−45°/90°], in each layer of which the reinforcing-fiber sheet materials were joined to both surfaces of the thermoplastic-resin sheet material. In the respective thermoplastic-resin-reinforced sheet materials, the reinforcing fibers were straight, uniformly distributed, and arranged in one direction. The thermoplastic-resin sheet material joined thereto prevented the reinforcing fibers from bundling or being unraveled and frayed. In addition, the thermoplastic-resin-reinforced sheet materials had no problems, such as curling of the edges, and were stacked while the flatness of the sheet was maintained.

Example 5

Using the multilayer thermoplastic-resin-reinforced sheet material produced in Example 2, a recessed thermoplastic-resin multilayer reinforced molding was produced.
<Production Process>
(1) The multilayer thermoplastic-resin-reinforced sheet material obtained in Example 2 was cut in a longitudinal direction (0° direction) into four pieces having a length of 320 mm, and, as shown in FIG. 20, stacked in a shaping lower metal mold with sequences of [45°/0°/−45°/90°], [45°/0°/−45°/90°], [90°/−45°/0°/45°], and [90°/−45°/0°/45°]. The shaping lower metal mold had a recess with a width of 250 mm, a length of 250 mm, and a depth of 20 mm, and was rounded at curved portions and corners.

(2) After the shaping lower metal mold was placed in a hot press molding apparatus, a shaping upper metal mold was lowered. Then, while a pressure of 0.1 MPa was applied, the temperature of the shaping metal mold was raised to 270° in 30 minutes.

(3) After the temperature was raised, the shaping upper metal mold was lowered and hot pressing was performed on the base fabric at a pressure of 2 MPa for 60 seconds. Then, the shaping metal molds, still applying pressure, were rapidly cooled by water cooling. The cooling time was about 10 minutes. After cooling, the shaping upper metal mold was raised and a thermoplastic-resin multilayer reinforced molding was obtained.

<Evaluation>

A recessed thermoplastic-resin multilayer reinforced molding having a thickness of about 0.8 mm and a fiber volume content of about 58% was obtained. No trace of the integration thermoplastic-resin fiber tow used in stitching was left on the surface of the molding, and the surface of the molding exhibited excellent smoothness. In addition, the reinforcing fibers on the surface were straight and had excellent distribution. The molding was cut and the cross section was observed. As a result, it was confirmed that the molding exhibited excellent straightness and distribution of the reinforcing fibers and had few gaps (voids). Furthermore, it was confirmed that the molding was high quality and had no delamination at the curved portions and corners. Because the multilayer thermoplastic-resin-reinforced sheet material was formed of the narrow thermoplastic-resin-reinforced sheet materials, the shape conformability of the sheet material at the curved portions and the corners was excellent. Thus, forming was easy.

Example 6

Using the multilayer thermoplastic-resin-reinforced sheet material produced in Example 1, a recessed thermoplastic-resin multilayer reinforced molding was produced through a production process different from that of Example 4.

<Production Process>

(1) The multilayer thermoplastic-resin-reinforced sheet material obtained in Example 1 was cut in a longitudinal direction (0° direction) into four pieces having a length of 320 mm, and, as shown in FIG. 21, stacked on a flat lower metal mold with sequences of [45°/0°/−45°/90°], [45°/0°/−45°/90°], [90°/−45°/0°/45°], and [90°/−45°/0°/45°]. The flat lower metal mold had a width of 350 mm and a length of 350 mm.

(2) After the flat lower metal mold was placed in a hot press molding apparatus, a flat upper metal mold was lowered. Then, while a pressure of 0.1 MPa was applied, the temperature of the flat metal mold was raised to 270° in 10 minutes.

(3) After the temperature was raised, the flat upper metal mold was lowered and hot pressing was performed on the base fabric at a pressure of 2 MPa for 60 seconds. Then, the flat metal molds, still applying pressure, were rapidly cooled by water cooling. The cooling time was about 10 minutes.

After cooling, the flat upper metal mold was raised and a plate-shaped thermoplastic-resin multilayer reinforced molding was obtained.

(4) The resulting plate-shaped thermoplastic-resin multilayer reinforced molding was placed in a far-infrared heating unit controlled at 300° and was left for about 3 minutes so that the plate-shaped thermoplastic-resin multilayer reinforced molding was sufficiently softened.

(5) The plate-shaped thermoplastic-resin multilayer reinforced molding was placed in a shaping lower metal mold in a cold press molding apparatus whose temperature was controlled at about 80°, and the shaping upper metal mold was lowered. Then, molding was performed while a pressure of 1 MPa was applied for about 60 seconds. Thereafter, the shaping upper metal mold was raised and a thermoplastic-resin multilayer reinforced molding was obtained.

<Evaluation>

A recessed thermoplastic-resin multilayer reinforced molding having a thickness of about 0.8 mm and a fiber volume content of about 58% was obtained. No trace of the integration thermoplastic-resin fiber tow used in stitching was left on the surface of the molding, and the surface of the molding exhibited excellent smoothness. In addition, the reinforcing fibers on the surface were straight and had excellent distribution. The molding was cut and the cross section was observed. As a result, it was confirmed that the molding exhibited excellent straightness and distribution of the reinforcing fibers and had few gaps (voids). Furthermore, it was confirmed that the molding was high quality and had no delamination at the curved portions and corners.

Example 7

Using the multilayer thermoplastic-resin-reinforced sheet material produced in Example 3, a plate-shaped thermoplastic-resin multilayer reinforced molding was produced.

<Production Process>

(1) The multilayer thermoplastic-resin-reinforced sheet material obtained in Example 3 was cut in a longitudinal direction (0° direction) into two pieces having a length of 320 mm, and, as shown in FIG. 21, stacked in a flat lower metal mold with sequences of [45°/0°/−45°/90°] and [90°/−45°/0°/45°]. The flat lower metal mold had a width of 350 mm and a length of 350 mm.

(2) After the flat lower metal mold was placed in a hot press molding apparatus, a flat upper metal mold was lowered. Then, while a pressure of 0.1 MPa was applied, the temperature of the flat metal mold was raised to 270° in 10 minutes.

(3) After the temperature was raised, the flat upper metal mold was lowered and hot pressing was performed on the base fabric at a pressure of 2 MPa for 60 seconds. Then, the flat metal molds, still applying pressure, were rapidly cooled by water cooling. The cooling time was about 15 minutes. After cooling, the flat upper metal mold was raised and a plate-shaped thermoplastic-resin multilayer reinforced molding was obtained.

<Evaluation>

A plate-shaped thermoplastic-resin multilayer reinforced molding having a thickness of about 0.4 mm and a fiber volume content of about 60% was obtained. No trace of bonding by thermal adhesion was left on the surface of the molding, and the surface of the molding exhibited excellent smoothness. In addition, the reinforcing fibers on the surface were straight and had excellent distribution. The molding was cut and the cross section was observed. As a result, it was confirmed that the molding exhibited excellent straightness and distribution of the reinforcing fibers and had few gaps (voids).

Example 8

Using the following materials, a thermoplastic-resin-reinforced sheet material was produced.
<Materials Used>
(Fiber Tow Used as Reinforcing Fiber Tow)
TR50S-15K, fiber diameter: about 7 μm, number of fibers: 15000, produced by MITSUBISHI RAYON CO., LTD.
(Resin Used as Thermoplastic-Resin Sheet Material)
Nylon 6 resin pellets, produced by Mitsubishi Plastics, Inc.
(Resin Used as Bonding Thermoplastic-Resin Material)
Copolymerized polyamide resin powder, CM842P48, low-melting point (115° C.) resin, produced by Toray Industries, Inc.
<Production Process>
(1) Thirteen filaments of reinforcing fiber tow TR50S-15K were set 24 mm apart in the production apparatus as shown in FIG. 10. Using the multiple-fiber-tow spreading mechanism for simultaneously spreading multiple filaments by air and the longitudinal-vibration applying mechanism, the reinforcing fiber tows were spread into reinforcing fiber multi-filament spread threads having a width of 24 mm. Then, the reinforcing fiber multi-filament spread threads were vibrated in the width direction by the width-direction-vibration applying mechanism, and a reinforcing-fiber sheet material having no gaps between the reinforcing fiber multi-filament spread threads was obtained. The resulting reinforcing-fiber sheet material had a width of 310 mm and a fiber weight (fiber weight per unit area) of about 42 g/m².
(2) An apparatus consisting of an extruder and a T-die was disposed instead of the thermoplastic-resin sheet material feeding mechanism shown in FIG. 10. Nylon 6 pellets were inserted in the apparatus, and while a nylon 6 film having a width of 320 mm and a thickness 15 μm was being produced, the nylon 6 resin film was thermally adhered to a surface of the reinforcing-fiber sheet material. A release sheet material was not used. The heating temperature of the heating rolls 72 for bonding the reinforcing-fiber sheet material and the nylon 6 resin film was controlled at 150°.
(3) While the sheet, formed of the reinforcing-fiber sheet material and the nylon 6 resin film joined to a surface thereof, was allowed to run, copolymerized polyamide resin powder, serving as a bonding thermoplastic-resin material, was uniformly dispersed and deposited on the surface of the sheet on the nylon 6 resin film side, using the powder-dispersing apparatus 71. The amount of dispersion was about 0.3 g/m², and an amount equivalent to about 0.7% of the weight of the reinforcing fiber tows was deposited. The heating temperature of the heating rolls 72 were controlled at 120°. The speed at which the reinforcing-fiber sheet material was produced, the speed at which the nylon 6 resin film was produced by extrusion molding, and the speed at which the copolymerized polyamide resin powder was dispersed and deposited were about 8 m/min.
<Evaluation>
In the resulting thermoplastic-resin-reinforced sheet material, the reinforcing fibers constituting the reinforcing-fiber sheet material were straight and uniformly distributed. The nylon 6 resin film was joined to the entire reinforcing fiber sheet and stabilized the shape of the reinforcing fiber multi-filament spread threads. No gaps or bundled fibers were formed in the reinforcing-fiber sheet material. The copolymerized polyamide resin powder, serving as a bonding thermoplastic-resin material, was uniformly dispersed and deposited on a surface of the thermoplastic-resin-reinforced sheet material on the nylon 6 resin film side.

Example 9

Using the following materials, a thermoplastic-resin-reinforced sheet material was produced.
<Materials Used>
The reinforcing fiber tow and the bonding thermoplastic-resin material were the same as those in Example 8.
(Resin Used as Thermoplastic-Resin Sheet Material)
PEI (polyetherimide) resin film, film thickness: 15 μm, produced by Mitsubishi Plastics, Inc.
<Production Process>
(1) Using the production apparatus as shown in FIG. 12 and the method described in (1) of Example 8, a reinforcing-fiber sheet material having a width of 310 mm and a fiber weight of about 42 g/m² was obtained.
(2) While a PEI resin film, serving as a thermoplastic-resin sheet material, was allowed to run, copolymerized polyamide resin powder, serving as a bonding thermoplastic-resin material, was uniformly dispersed and deposited on a surface thereof, with the powder-dispersing apparatus. The amount of dispersion was about 0.3 g/m², which was about 0.7% of the weight of the reinforcing fiber tows.
(3) The PEI resin film, on which the copolymerized polyamide resin powder was dispersed, was joined to the reinforcing-fiber sheet material, and, together with a release sheet material, allowed to run over the heating roll and the cooling roll. Thus, the copolymerized polyamide resin powder was melted, and a thermoplastic-resin-reinforced sheet material formed of the reinforcing-fiber sheet material and the PEI resin film joined thereto was obtained. At this time, the temperature of the heating roll was controlled at about 120°. Release paper was fed as the release sheet material. The speed at which the reinforcing-fiber sheet material was produced, the speed at which the copolymerized polyamide resin powder was dispersed and deposited on the PEI resin film, and the speed at which the thermoplastic-resin-reinforced sheet material was joined to the reinforcing-fiber sheet material to produce the thermoplastic-resin-reinforced sheet material were about 10 m/min.
<Evaluation>
In the resulting thermoplastic-resin-reinforced sheet material, the reinforcing fibers constituting the reinforcing-fiber sheet material were straight and uniformly distributed. The reinforcing fiber multi-filament spread threads had stable shape by being attached to the PEI resin film. In addition, the reinforcing-fiber sheet material did not have gaps or bundled fibers. Furthermore, the PEI resin film hardly shrank by heating and was joined to the reinforced sheet material while stabilizing the shape of the sheet.

Example 10

Using the following materials, a thermoplastic-resin-reinforced sheet material was produced.
<Materials Used>
The reinforcing fiber tow was the same as that of Example 8.
(Resin Used as Thermoplastic-Resin Sheet Material)
PPS (polyphenylene sulfide) resin film, film thickness: 15 μm, produced by Toray Industries, Inc.
(Resin Used as Bonding Thermoplastic-Resin Material)
Polyamide resin powder, SP-500, melting point: 165° C., produced by Toray Industries, Inc.

<Production Process>
(1) According to (1) of Example 8, a reinforcing-fiber sheet material having a width of 310 mm and a fiber weight of about 42 g/m² was obtained.
(2) While a PPS resin film, serving as a thermoplastic-resin sheet material, was allowed to run, polyamide resin powder, serving as a bonding thermoplastic-resin material, was uniformly dispersed and deposited on a surface thereof with a powder-dispersing apparatus. The amount of dispersion was about 0.5 g/m², which was about 1.2% of the weight of the reinforcing fiber tows.
(3) The PPS resin film, on which the polyamide resin powder was dispersed, was joined to the reinforcing-fiber sheet material, and, together with a release sheet material, allowed to run over the heating roll and the cooling roll. Thus, the polyamide resin powder was melted and a thermoplastic-resin-reinforced sheet material formed of the reinforcing-fiber sheet material and the PPS resin film joined thereto was obtained. At this time, the temperature of the heating roll was controlled at about 200°. Release paper was fed as the release sheet material. The speed at which the reinforcing-fiber sheet material was produced, the speed at which the polyamide resin powder was dispersed and deposited on the PPS resin film, and the speed at which the thermoplastic-resin-reinforced sheet material was joined to the reinforcing-fiber sheet material to produce the thermoplastic-resin-reinforced sheet material were about 10 m/min.
<Evaluation>
Similarly to Example 9, in the resulting thermoplastic-resin-reinforced sheet material, the reinforcing fibers constituting the reinforcing-fiber sheet material were straight and uniformly distributed. In addition, the reinforcing fiber multi-filament spread threads had stable shape by being attached to the PPS resin film. In addition, the reinforcing-fiber sheet material did not have gaps or bundled fibers. Because the sheet shape of the PPS resin film was stable, an easy-to-handle thermoplastic-resin-reinforced sheet material was obtained.

Example 11

Using the following materials, a thermoplastic-resin-reinforced sheet material was produced.
<Materials Used>
(Fiber Tow Used as Reinforcing Fiber Tow)
MR60H-24K, fiber diameter: about 5.4 μm, number of fibers: 24000, produced by MITSUBISHI RAYON CO., LTD.
(Resin Used as Thermoplastic-Resin Sheet Material)
Polyetherimide (PEI) resin film, film thickness: 15 μm, produced by Mitsubishi Plastics, Inc.
(Resin Used as Bonding Thermoplastic-Resin Material)
Copolymerized polyamide resin powder, CM842P48, low-melting point (115° C.) resin, produced by Toray Industries, Inc.
<Production Process>
(1) A production apparatus having another set of a multiple-fiber-tow feeding mechanism, a multiple-fiber-tow spreading mechanism, a longitudinal-vibration applying mechanism, and a width-direction-vibration applying mechanism disposed opposite the heating mechanism of the thermoplastic-resin-reinforced sheet material producing apparatus as shown in FIG. 10 was used. Seven filaments of reinforcing fiber tow MR60H-24K were set 45 mm apart in each of the multiple-fiber-tow feeding mechanisms. While the longitudinal-vibration applying mechanisms were applying longitudinal vibration to the reinforcing fiber tows, the multiple-fiber-tow spreading mechanisms spread the reinforcing fiber tows into reinforcing fiber multi-filament spread threads having a width of about 45 mm. Then, the width-direction-vibration applying mechanisms applied vibration in the width direction to the reinforcing fiber multi-filament spread threads to form continuous reinforcing-fiber sheet materials having a width of about 315 mm and a fiber weight (fiber weight per unit area) of about 22 g/m² having no gaps between the reinforcing fiber multi-filament spread threads.
(2) Thereafter, while the reinforcing-fiber sheet materials were continuously fed from both sides of the heating mechanism, a thermoplastic-resin sheet material was continuously inserted between the reinforcing-fiber sheet materials. Then, the reinforcing-fiber sheet materials were joined to both surfaces of the thermoplastic-resin sheet material by the heating mechanism. At this time, the temperature of the heating mechanism was controlled at about 350°. The thermosetting polyimide resin film (product name: UPILEX-S, thickness: 25 μm, manufacturer: UBE INDUSTRIES, LTD.), serving as a release film, was fed together with the reinforcing-fiber sheet materials.
(3) While the sheet material, in which the reinforcing-fiber sheet materials were joined to both surfaces of the thermoplastic-resin sheet material, was allowed to run, copolymerized polyamide resin powder, serving as a bonding thermoplastic-resin material, was uniformly dispersed and deposited on a surface of the reinforcing-fiber sheet materials of the sheet material with a powder-dispersing apparatus. The amount of dispersion was about 0.4 g/m², which was about 1% of the weight of the reinforcing fiber tows. The heating temperature of the heating roll was controlled at 120°. The speed at which the reinforcing fiber tows were spread and formed into the reinforcing-fiber sheet materials, the processing speed at which the reinforcing-fiber sheet materials were joined to both surfaces of the thermoplastic-resin sheet material, and the speed at which the copolymerized polyamide resin powder was dispersed and deposited were about 10 m/min.
(4) By removing the release film from the base fabric discharged from the cooling mechanism, a thermoplastic-resin-reinforced sheet material in which the reinforcing-fiber sheet materials were joined to both surfaces of the thermoplastic-resin sheet material and in which the copolymerized polyamide resin powder, serving as a bonding thermoplastic-resin material, was deposited on a surface of one of the reinforcing-fiber sheet materials was obtained.
<Evaluation>
In the resulting thermoplastic-resin-reinforced sheet material, the reinforcing fibers constituting the reinforcing-fiber sheet materials were straight and uniformly distributed. In addition, the reinforcing-fiber sheet materials were joined to the thermoplastic-resin sheet material, which stabilized the shape of the reinforcing fiber multi-filament spread threads. No gaps or bundled fibers were formed in the reinforcing-fiber sheet materials. The copolymerized polyamide resin powder, serving as a bonding thermoplastic-resin material, was uniformly dispersed and deposited on the surface of one of the reinforcing-fiber sheet materials of the thermoplastic-resin-reinforced sheet material. Furthermore, the thermoplastic resin reinforcing-fiber sheet material had no problems, such as curling of the edges, and the flatness of the sheet was maintained.

Example 12

A multilayer thermoplastic-resin-reinforced sheet material was produced from the thermoplastic-resin-reinforced sheet material obtained by the method of Example 9.

<Materials Used>

The reinforcing fiber tow, the thermoplastic-resin sheet material, and the bonding thermoplastic-resin material were the same as those in Example 9.

<Production Process>

(1) A thermoplastic-resin-reinforced sheet material having a width of 310 mm was formed by going through (1) to (3) of Example 9. The amount of dispersion of the bonding thermoplastic-resin material was about 0.4 g/m², and an amount equivalent to about 1% of the weight of the reinforcing fiber tows was deposited.

(2) Using the production apparatus as shown in FIG. 10, copolymerized polyamide resin powder, serving as a bonding thermoplastic-resin material, was uniformly dispersed and deposited on the surface of the resulting thermoplastic-resin-reinforced sheet material on the PEI resin film side with the powder-dispersing apparatus. The amount of dispersion was about 0.2 g/m², which was about 0.5% of the weight of the reinforcing fiber tows.

(3) Using the production apparatus as shown in FIG. 14, the resulting thermoplastic-resin-reinforced sheet materials were stacked in 45° direction, 0° direction, −45° direction, and 90° direction into a laminate sheet having a width of 310 mm. Then, the copolymerized polyamide resin powder was melted by the heating mechanism, and the stacked thermoplastic-resin-reinforced sheet materials were bonded together. Thus, a multilayer thermoplastic-resin-reinforced sheet material was obtained. At this time, the temperature of the heating roll was controlled at about 120°. Release paper was fed as a release sheet material.

<Evaluation>

The resulting multilayer thermoplastic-resin-reinforced sheet material was a multiaxially reinforced sheet material that was fiber-reinforced in [45°/0°/−45°/90°], in each layer of which the PEI resin film was joined to a surface of the reinforcing fibers formed in a sheet-like structure. In the respective thermoplastic-resin-reinforced sheet materials, the reinforcing fibers were straight and uniformly distributed, and the PEI resin film hardly shrank by heating and stabilized the shape of the sheet. The respective thermoplastic-resin-reinforced sheet materials were bonded together by the copolymerized polyamide resin powder. Thus, a multilayer thermoplastic-resin-reinforced sheet material having excellent drapeability and quality was obtained. The amount of the copolymerized polyamide resin used in each thermoplastic-resin-reinforced sheet material was about 1.5% of the amount of the carbon fiber used.

Example 13

A plurality of narrow thermoplastic-resin-reinforced sheet material were obtained from the thermoplastic-resin-reinforced sheet material formed by going through (1) and (2) of Example 12. Then, a multilayer thermoplastic-resin-reinforced sheet material was produced.

<Materials Used>

The reinforcing fiber tow, the thermoplastic-resin sheet material, and the bonding thermoplastic-resin material were the same as those in Example 9.

<Production Process>

(1) A thermoplastic-resin-reinforced sheet material having a width of 310 mm was formed by going through (1) and (2) of Example 12.

(2) Using the production apparatus as shown in FIG. 15, the resulting thermoplastic-resin-reinforced sheet material was continuously cut at a width of 10 mm, and 31 strips of narrow thermoplastic-resin-reinforced sheet materials were obtained. The cutter blade and the cutting method adopted at this time were round cutter blades freely rotatable in response to running of the thermoplastic-resin-reinforced sheet material and a method in which the thermoplastic-resin-reinforced sheet material was press-cut between the cutter blades and a cutter-blade receiving roll. Then, the resulting narrow thermoplastic-resin-reinforced sheet materials were taken up in a tape-like form. The wide thermoplastic-resin-reinforced sheet material was cut at a speed of 10 m/min.

(3) The 31 strips of the narrow thermoplastic-resin-reinforced sheet materials, taken up in a tape-like form, were arranged in the width direction in wide sheet-like structures without leaving gaps. Then, using the production apparatus as shown in FIG. 14, the sheet materials were stacked in 45° direction, 0° direction, −45° direction, and 90° direction into a laminate sheet having a width of 310 mm. Then, the copolymerized polyamide resin powder was melted by the heating mechanism, and the stacked thermoplastic-resin-reinforced sheet materials were bonded together. Thus, a multilayer thermoplastic-resin-reinforced sheet material was obtained. At this time, the temperature of the heating roll was controlled at about 120°. Release paper was fed as a release sheet material.

<Evaluation>

The resulting multilayer thermoplastic-resin-reinforced sheet material was a multiaxially reinforced sheet material that was fiber-reinforced in [45°/0°/−45°/90°], in each layer of which the PEI resin film was joined to a surface of the reinforcing fibers formed in a sheet-like structure. The reinforcing fibers in the narrow thermoplastic-resin-reinforced sheet materials in the respective layers were straight and uniformly distributed, and the PEI resin film hardly shrank by heating and stabilized the shape of the sheet. In addition, fray of the reinforcing fibers at the edges of the cut narrow thermoplastic-resin-reinforced sheet materials was negligible, and handling was easy. Furthermore, because each layer consists of the narrow thermoplastic-resin-reinforced sheet materials, the multilayer thermoplastic-resin-reinforced sheet material had great drapeability.

Example 14

Using the multilayer thermoplastic-resin-reinforced sheet material produced in Example 12, a recessed thermoplastic-resin multilayer reinforced molding was produced.

<Production Process>

(1) The multilayer thermoplastic-resin-reinforced sheet material obtained in Example 12 was cut in a longitudinal direction (0° direction) into four pieces having a length of 310 mm, and stacked in a recessed shaping metal mold with sequences of [45°/0°/−45°/90°], [45°/0°/−45°/90°], [45°/0°/−45°/90°], [90°/−45°/0°/45°], [90°/−45°/0°/45°], and [90°/−45°/0°/45°]. The shaping metal mold had a recess with a width of 250 mm, a length of 250 mm, and a depth of 20 mm, and was rounded at curved portions and corners.

(2) After the recessed shaping metal mold was placed in a hot press molding apparatus, a projected shaping metal mold was lowered. Then, while a pressure of 0.1 MPa was applied, the temperature of the shaping metal mold was raised to 380° in 60 minutes.

(3) After the temperature was raised, the projected shaping metal mold was lowered and hot pressing was performed on the base fabric at a pressure of 1 MPa for 60 seconds. Then, the shaping metal molds, still applying pressure, were slowly cooled. The cooling time was about 120 minutes.

After cooling, the projected shaping metal mold was raised and a thermoplastic-resin multilayer reinforced molding was obtained.
<Evaluation>

A recessed thermoplastic-resin multilayer reinforced molding having a thickness of about 1 mm and a fiber volume content of about 60% was obtained. The surface of the molding exhibited excellent smoothness. In addition, the reinforcing fibers on the surface were straight and had excellent distribution. The molding was cut and the cross section was observed. As a result, it was confirmed that the molding exhibited excellent straightness and distribution of the reinforcing fibers and had few gaps (voids). Furthermore, it was confirmed that the molding was high quality and had no delamination at the curved portions and corners.

Example 15

Using the following materials and the molding process explained in FIG. 23, a recessed thermoplastic-resin multilayer reinforced molding was produced.
<Materials Used>
(Reinforcing Fiber Tow)
Carbon fiber tow
TR50S-15K, fiber diameter: about 7 μm, number of fibers: 15000, produced by MITSUBISHI RAYON CO., LTD.
(Thermoplastic Resin)
Polyamide Resin
Nylon 6 resin film, film thickness: 20 μm, produced by Mitsubishi Chemical Corporation
<Production Process>
(1) Sixteen filaments of reinforcing fiber tow TR50S-15K were set 20 mm apart. Using a known method for simultaneously spreading multiple filaments by air (refer to Japanese Translation of PCT International Application, Publication No. 2007-518890), each reinforcing fiber tow was spread to a width of about 20 mm.
(2) The reinforcing fiber multi-filament spread threads spread to a width of 20 mm were vibrated in the width direction and formed into a reinforcing-fiber sheet material having no gaps between the reinforcing fiber multi-filament spread threads. The resulting reinforcing-fiber sheet material had a width of about 320 mm and a fiber weight (fiber weight per unit area) of about 50 g/m$^2$.
(3) A thermoplastic-resin sheet material, while being heated, was continuously joined to the resulting reinforcing-fiber sheet material. At this time, the heating temperature was controlled at about 270° C. A thermosetting polyimide resin film (product name: UPILEX-S, thickness: 25 μm, produced by UBE INDUSTRIES, LTD.), serving as a release film, was fed together with the reinforcing-fiber sheet material. The thermoplastic-resin-reinforced sheet material was joined to the reinforcing-fiber sheet material at a speed of 10 m/min.
(4) After heating and cooling, by removing the release film from the base fabric, a thermoplastic-resin-reinforced sheet material formed of the reinforcing-fiber sheet material and the thermoplastic-resin sheet material joined to a surface thereof was obtained.
(5) From the resulting thermoplastic-resin-reinforced sheet material, sheets having a size of 320 mm square in which, assuming that the fiber direction was 0° direction, fibers are arranged in 0° direction, 90° direction, 45° direction, and −45° direction were cut out and formed into a laminated sheet material of $[(45°/0°/-45°/90°)_3]_S$.
(6) After the laminated sheet material was placed on a recessed iron shaping mold (lower mold) having a thickness of 1 mm, a projected iron shaping mold (upper mold) having a thickness of 1 mm was placed. As a release treatment, a release agent (Frekote 44-NC produced by Henkel AG & Co. KGaA) was sprayed on the mold surfaces of the shaping molds. Then, the shaping mold pair, between which the laminated sheet material was placed, was placed in a hot press. The shaping molds were placed on the lower mold of the hot press mold preliminarily heated to 270° C., then the upper mold of the hot press mold was immediately lowered to apply pressure. At this time, the lower mold of the hot press mold had a shape such that the recessed shaping mold can be fitted thereto and the upper mold of the hot press mold had a shape such that it can fit the projected shaping mold and apply pressure thereto. Hot pressing was performed at a pressure of 2 MPa for 5 minutes.
(7) After the hot pressing, the shaping molds were taken out of the hot press and placed in a cold press. The shaping molds were placed on the lower mold of the cold press mold preliminarily cooled to about 20° by water cooling, and the upper mold of the cold press mold was immediately lowered to apply pressure. Similarly to the hot press mold, the lower mold of the cold press mold had a shape such that the recessed shaping mold can be fitted thereto and the upper mold of the cold press had a shape such that it can fit the projected shaping mold and apply pressure thereto. Cold pressing was performed at a pressure of 2 MPa for 3 minutes. Then, the shaping molds were taken out of the cold press, and a thermoplastic-resin composite-material molding was obtained.
<Evaluation>

The resulting thermoplastic-resin composite-material molding was finished as a recessed molding having no warpage or the like, having a thickness of about 1.2 mm and a fiber volume content of about 58%. A part of the molding was cut and the cross section was observed. As a result, it was confirmed that the fiber tows were uniformly impregnated with the thermoplastic resin and the fibers were uniformly distributed. Furthermore, the curved shape, the corner shape, etc. of the molding were precisely formed so as to conform to the surface of the shaping mold.

Example 16

Using the laminated sheet material obtained by going through (1) to (5) of Example 15, molding was performed.
<Production Process>
(1) By going through (1) to (5) of Example 15, a laminated sheet material having a size of 320 mm square, stacked in $[(45°/0°/-45°/90°)_3]_S$ was produced.
(2) After the laminated sheet material was placed on a recessed iron shaping mold (lower mold) having a thickness of 1 mm, a projected iron shaping mold (upper mold) having a thickness of 1 mm was placed. The peripheral portions of the upper and lower shaping molds were sealed with a seal member made of heat-resisting rubber to form an airtight structure. As a release treatment, (Frekote 44-NC, produced by Henkel AG & Co. KGaA) was sprayed on the surfaces of the shaping molds. Then, the air in the shaping molds was sucked (discharged) to bring the inside of the shaping molds into a reduced pressure state of 10 Torr or less.
(3) The recessed and projected shaping molds accommodating the laminated sheet material, the inside of which being in a reduced pressure state, was placed in a hot press. The shaping molds were placed on the lower mold of the hot press mold preliminarily heated to 270° C., then the upper mold of the hot press mold was immediately lowered to apply pressure. At this time, similarly to the case of Example 15, the lower mold of the hot press mold had a shape such that the recessed shaping mold can be fitted thereto and the upper mold of the hot press mold had a shape such that it can fit the projected shaping mold and apply pressure thereto. Hot pressing was performed at a pressure of 2 MPa for 3 minutes. The air in the shaping molds was continuously sucked (discharged) during hot pressing by the hot press to maintain the inside of the shaping molds in a reduced pressure state of 10 Torr or less.

(4) After the hot pressing, the shaping molds, the inside of which was still in a reduced pressure state, were taken out of the hot press and then placed in a cold press. The shaping molds were placed on the lower mold of the cold press mold preliminarily cooled to about 20° by water cooling, and the upper mold of the cold press mold was immediately lowered to apply pressure. At this time, similarly to Example 1, the lower mold of the cold press mold had a shape such that the recessed shaping mold can be fitted thereto and the upper mold of the cold press had a shape such that it can fit the projected shaping mold and apply pressure thereto. Cold pressing was performed at a pressure of 2 MPa for 3 minutes. The air in the shaping molds was continuously sucked (discharged) while cold pressing was performed by the cold press on the shaping molds, to maintain the inside of the shaping molds in a reduced pressure state of 10 Torr or less.

(5) Then, the shaping molds were taken out of the cold press. After the inside of the shaping molds in a reduced pressure state was brought back to an atmospheric pressure state, a thermoplastic-resin composite-material molding was obtained from the inside of the shaping mold.

<Evaluation>

The resulting thermoplastic-resin composite-material molding was finished as a recessed molding having no warpage or the like, having a thickness of about 1.2 mm and a fiber volume content of about 58%. A part of the molding was cut and the cross section was observed. As a result, it was confirmed that the fiber tows were uniformly impregnated with the thermoplastic resin and the fibers were uniformly distributed, in spite of reduced hot pressing time. Furthermore, the curved shape, the corner shape, etc. of the molding were precisely formed so as to conform to the surface of the shaping mold.

Example 17

Using the following materials, a flat thermoplastic-resin multilayer reinforced molding was produced by the molding method explained in FIG. 26.
<Materials Used>
(Reinforcing Fiber Tow)
Carbon Fiber Tow
MR60H-24K, fiber diameter: about 5.4 μm, number of fibers: 24000, produced by MITSUBISHI RAYON CO., LTD.
(Thermoplastic Resin)
Polyetherimide (PEI) Resin Film
Superio UT, thickness: 15 μm, produced by Mitsubishi Plastics, Inc.
(Resin Used as Bonding Thermoplastic-Resin Material)
Copolymerized Polyamide Resin Powder
CM842P48, low-melting point (115° C.) resin, produced by Toray Industries, Inc.
<Production Process>
(1) Thirteen filaments of reinforcing fiber tow MR60H-24K were set 24 mm apart. Using a known method for simultaneously spreading multiple filaments by air (refer to Japanese Translation of PCT International Application, Publication No. 2007-518890), the reinforcing fiber tows were spread to a width of about 24 mm.

(2) The reinforcing fiber multi-filament spread threads spread to a width of 24 mm were vibrated in the width direction and formed into a reinforcing-fiber sheet material having no gaps between the reinforcing fiber multi-filament spread threads. The resulting reinforcing-fiber sheet material had a width of about 310 mm and a fiber weight of (fiber weight per unit area) about 40 g/m².

(3) Using a powder-dispersing apparatus, copolymerized polyamide resin powder, serving as a bonding thermoplastic-resin material, was uniformly dispersed and deposited on a surface of a PEI resin film, serving as a thermoplastic-resin sheet material. The amount of dispersion was about 0.4 g/m², which was about 1% of the weight of the reinforcing fiber tows.

(4) The thermoplastic-resin sheet material, on which the bonding thermoplastic-resin material is deposited, was continuously attached to a surface of the resulting reinforcing-fiber sheet material, while being heated. At this time, the heating temperature was controlled at about 150° C. Release paper (produced by Lintec Corporation) was fed together with the reinforcing-fiber sheet material. The thermoplastic-resin-reinforced sheet material was attached to the reinforcing-fiber sheet material at a speed of 10 m/min.

(5) From the resulting thermoplastic-resin-reinforced sheet material, sheets having a size of 320 mm square in which, assuming that the fiber direction was 0° direction, fibers are arranged in 0° direction, 90° direction, 45° direction, and −45° direction were cut out and formed into a laminated sheet material of $[(45°/0°/−45°/90°_3]_S$.

(6) The laminated sheet material was placed on a flat CC composite shaping mold having a thickness of 1 mm. A flat iron shaping mold having a thickness of 1 mm was placed thereon, and another laminated sheet material was placed thereon. After they are alternately stacked into three-tier-structure, the peripheral portions of the uppermost shaping mold and the lowermost shaping mold were sealed with a seal member made of heat-resisting rubber to form an airtight structure. A release sheet material (thermosetting polyimide film, produced by UBE INDUSTRIES, LTD., thickness: 50 μm) was provided between the laminated sheet materials and the shaping molds. Then, the air in the shaping mold was sucked (discharged) to bring the inside of the shaping mold into a reduced pressure state of 10 Torr or less.

(7) The shaping molds accommodating the laminated sheet materials and inside of which being in a reduced pressure state was placed in a hot press. The shaping molds were placed on the lower mold of the hot press mold preliminarily heated to 370° C., then the upper mold of the hot press mold was immediately lowered to apply pressure. At this time, the mold surfaces of the upper mold and lower mold of the hot press mold were flat such that they can fit the shaping molds and apply pressure thereto. Hot pressing was performed at a pressure of 2 MPa for 3 minutes. The air in the shaping molds was continuously sucked (discharged) while the hot press was performing hot pressing on the shaping molds, so as to maintain the inside of the shaping molds in a reduced pressure state of 10 Torr or less.

(8) After the hot pressing, the shaping molds, the inside of which was still in a reduced pressure state, were taken out of the hot press and then placed in a cold press. The shaping molds were placed on the lower mold of the cold press mold preliminarily cooled to about 20° by water cooling, and the upper mold of the cold press mold was immediately lowered to apply pressure. At this time, similarly to hot press mold, the mold surfaces of the upper mold and lower mold of the cold press mold were flat such that they can fit the shaping molds and apply pressure thereto. Cold pressing was performed at a pressure of 2 MPa for 3 minutes. The air in the shaping molds was continuously sucked (discharged) while the cold press was performing cold pressing on the shaping mold, so as to maintain the inside of the shaping molds in a reduced pressure state of 10 Torr or less.

(9) Then, the shaping molds were taken out of the cold press. After the inside of the shaping molds in a reduced pressure state was brought back to an atmospheric pressure state, three thermoplastic-resin composite-material moldings were obtained from the shaping molds.

<Evaluation>

The resulting thermoplastic-resin composite-material moldings were each finished as a flat molding having no warpage or the like, having a thickness of about 0.9 mm and a fiber volume content of about 60%. A part of the molding was cut and the cross section was observed. As a result, it was confirmed that impregnation of the thermoplastic resin into fiber tows, as well as and the distribution of the carbon fibers, were excellent in spite of the heat-resistant resin being used. In addition, high-quality moldings were obtained under molding conditions in which the hot pressing time was reduced.

REFERENCE NUMERALS

Figure 1:
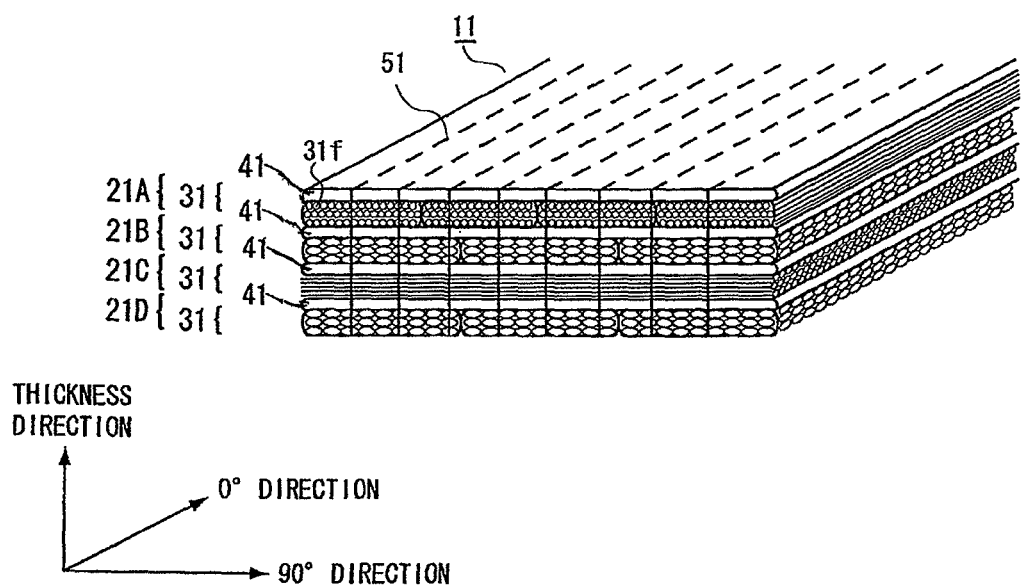
FIG. 1 is a schematic view showing a multilayer thermoplastic-resin-reinforced sheet material according to an embodiment of the present invention.
Figure 2:
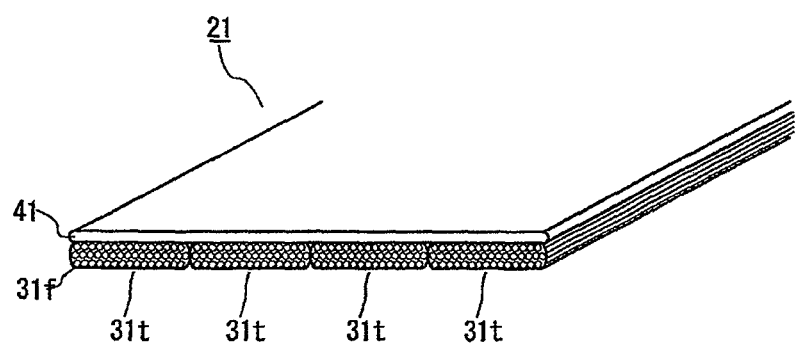
FIG. 2 is a schematic view showing a wide thermoplastic-resin-reinforced sheet material.
Figure 3A:
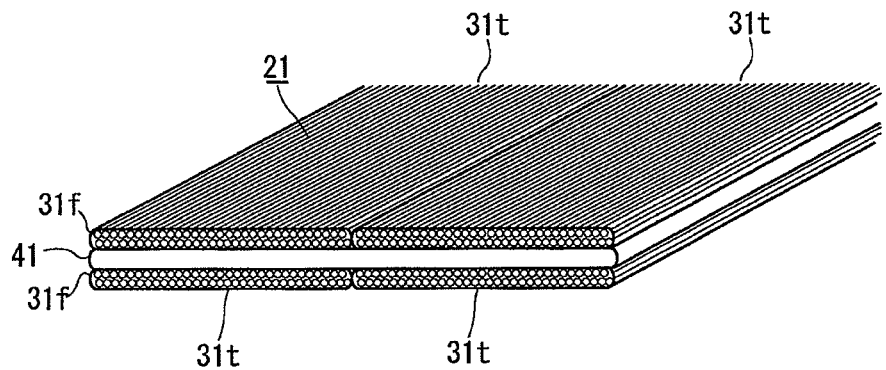
FIG. 3 is a schematic view showing another wide thermoplastic-resin-reinforced sheet material.
Figure 3B:
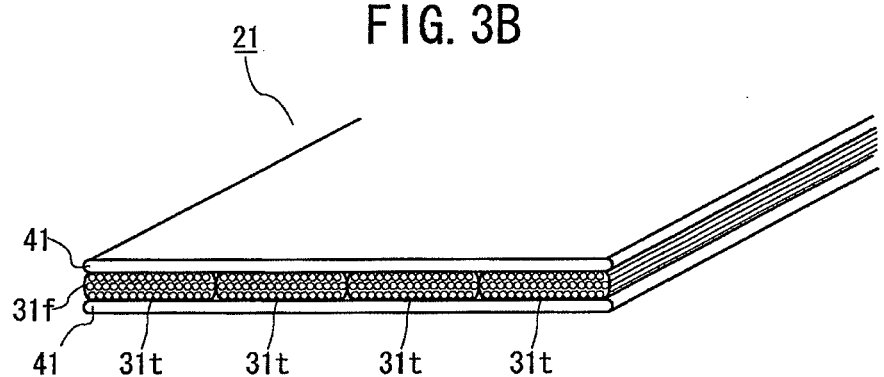
Figure 4:
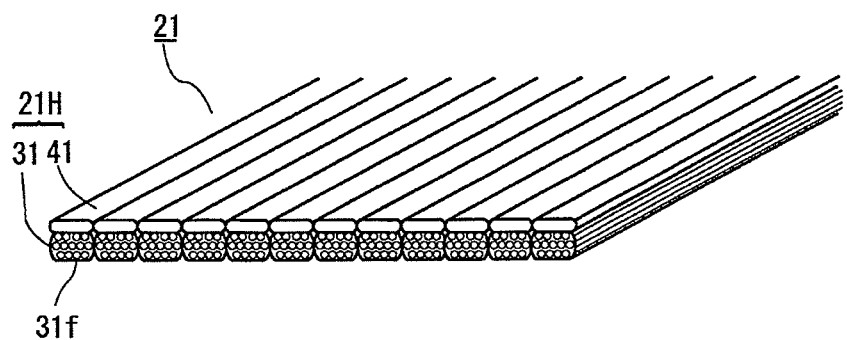
FIG. 4 is a schematic view showing a thermoplastic-resin-reinforced sheet material obtained by arranging narrow thermoplastic-resin-reinforced sheet materials in a width direction.
Figure 5:
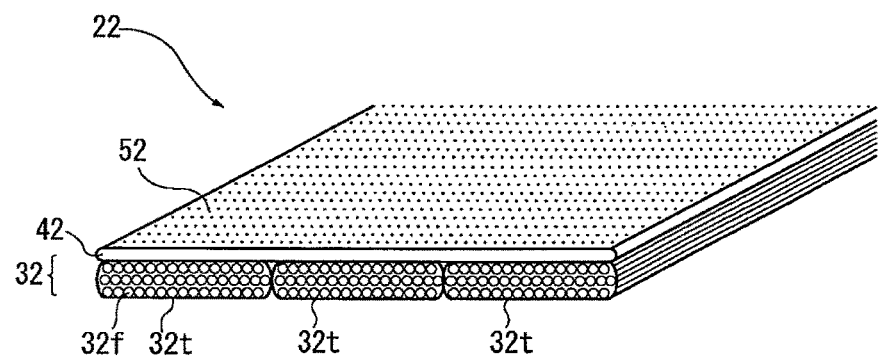
FIG. 5 is a schematic view showing another thermoplastic-resin-reinforced sheet material used in an embodiment of the present invention.
Figure 6:
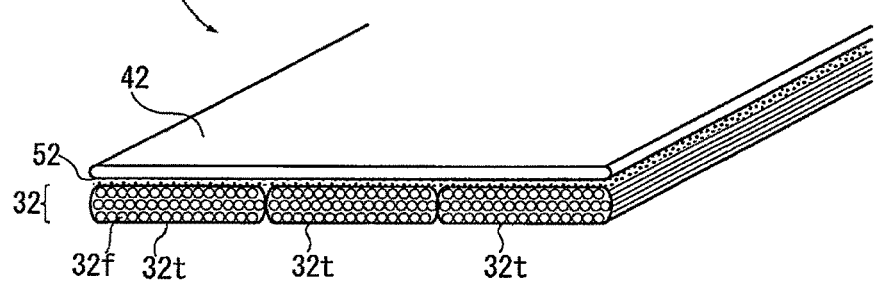
FIG. 6 is a schematic view showing another thermoplastic-resin-reinforced sheet material used in an embodiment of the present invention.
Figure 7:
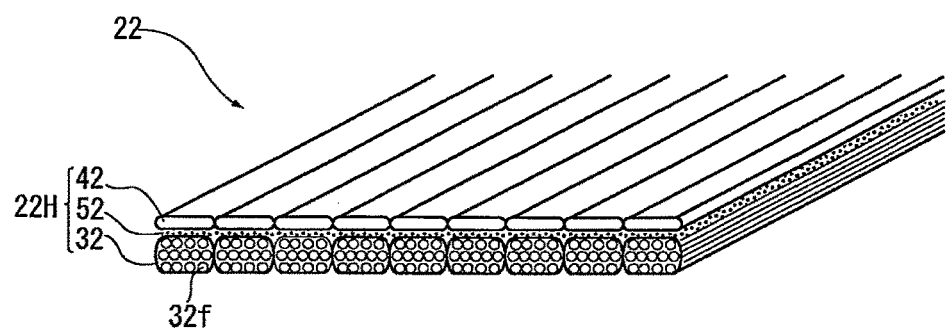
FIG. 7 is a schematic view showing a thermoplastic-resin-reinforced sheet material obtained by arranging another narrow thermoplastic-resin-reinforced sheet materials in the width direction.
Figure 8:
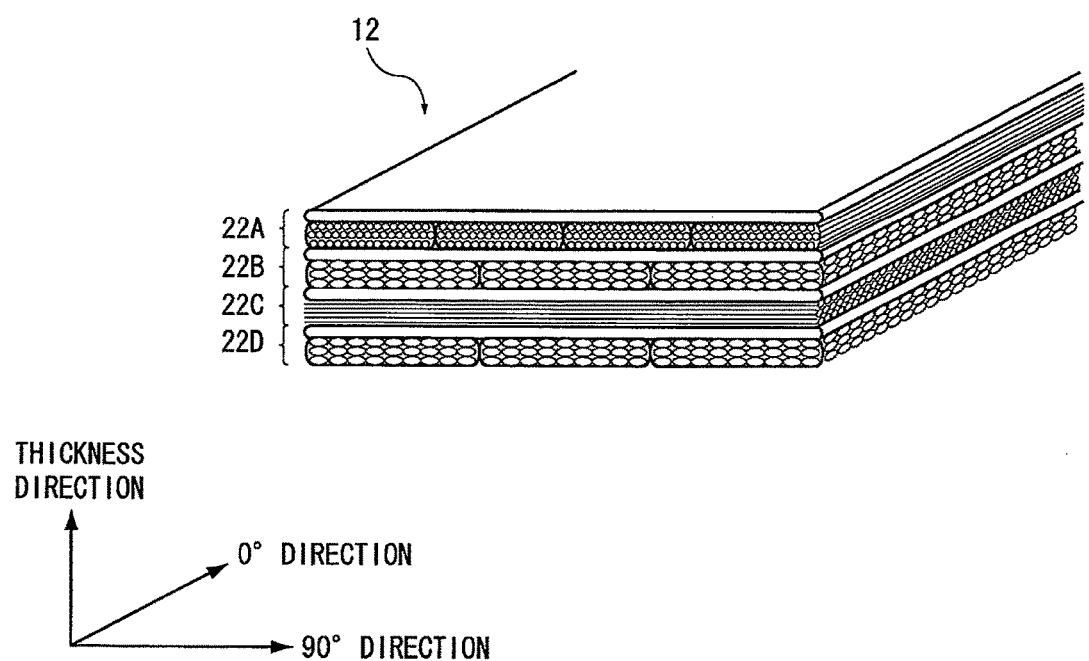
FIG. 8 is a schematic view showing a multilayer thermoplastic-resin-reinforced sheet material in which thermoplastic-resin-reinforced sheet materials are stacked and bonded together.
Figure 9A:
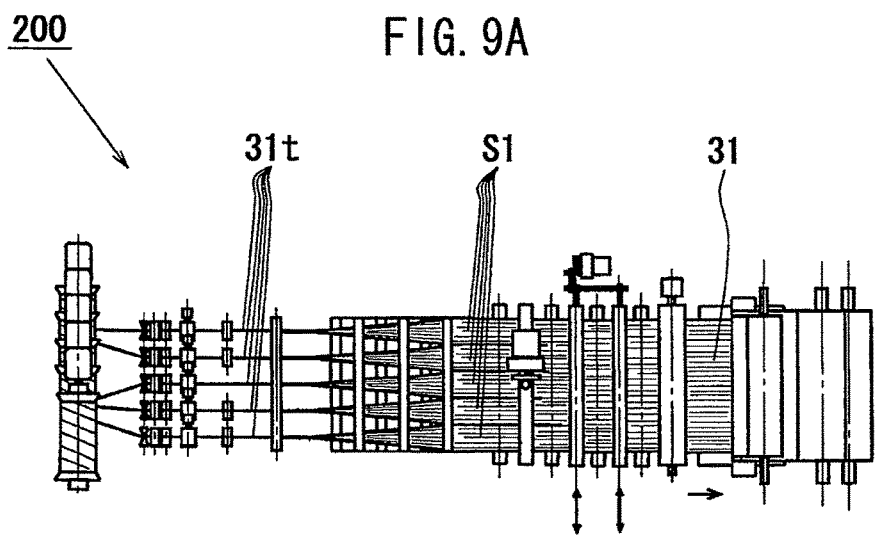
FIG. 9 is an explanatory diagram related to a method for producing a thermoplastic-resin-reinforced sheet material.
Figure 9B:
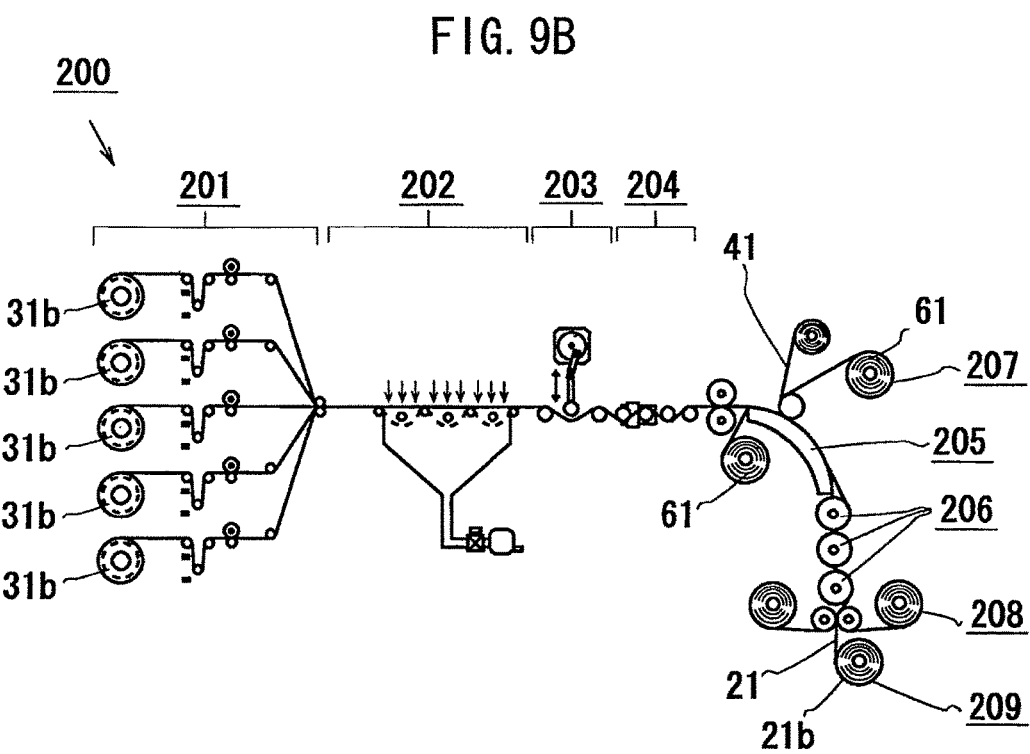
Figure 10A:
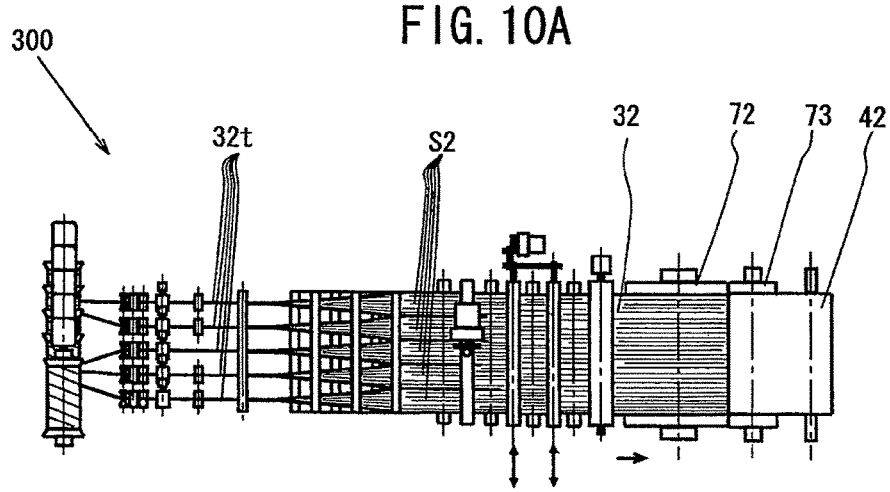
FIG. 10 is an explanatory diagram related to a method for producing another thermoplastic-resin-reinforced sheet material.
Figure 10B:
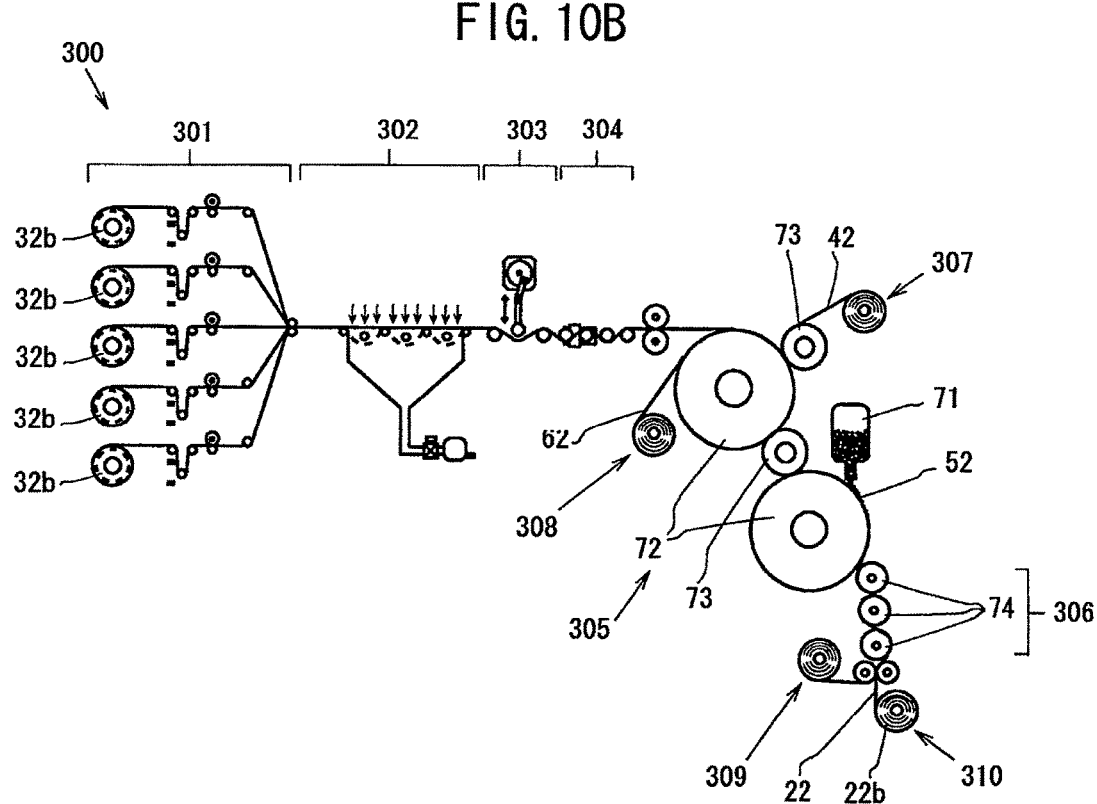
Figure 11A:
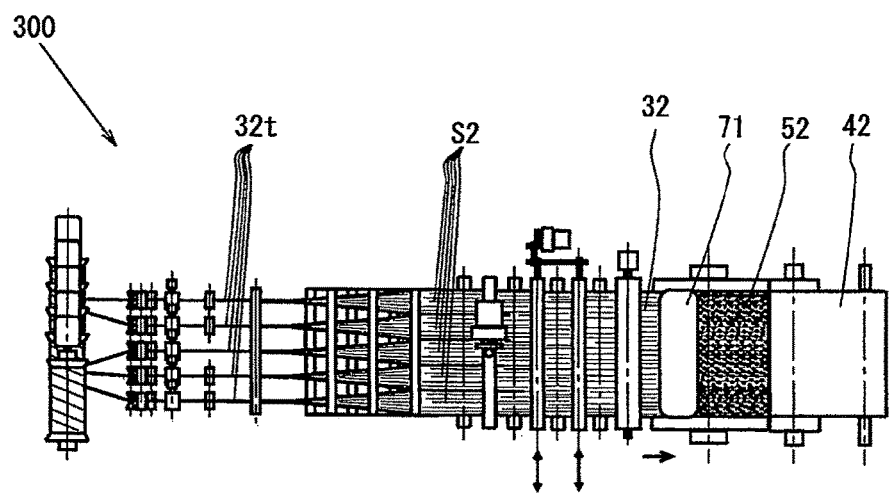
FIG. 11 is an explanatory diagram related to a method for producing another thermoplastic-resin-reinforced sheet material.
Figure 11B:
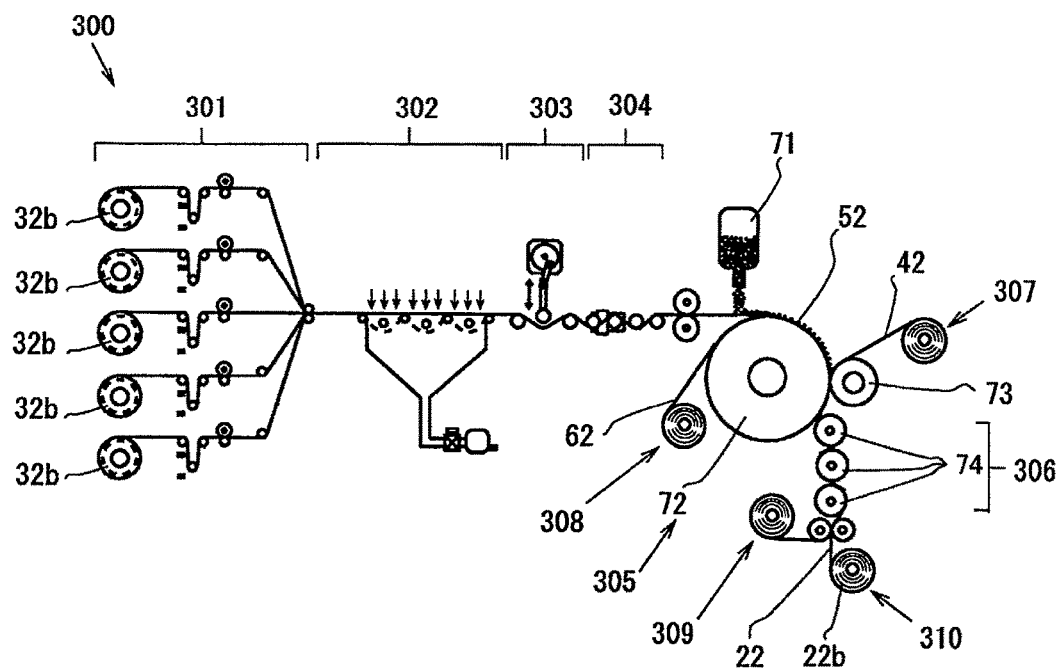
Figure 12:
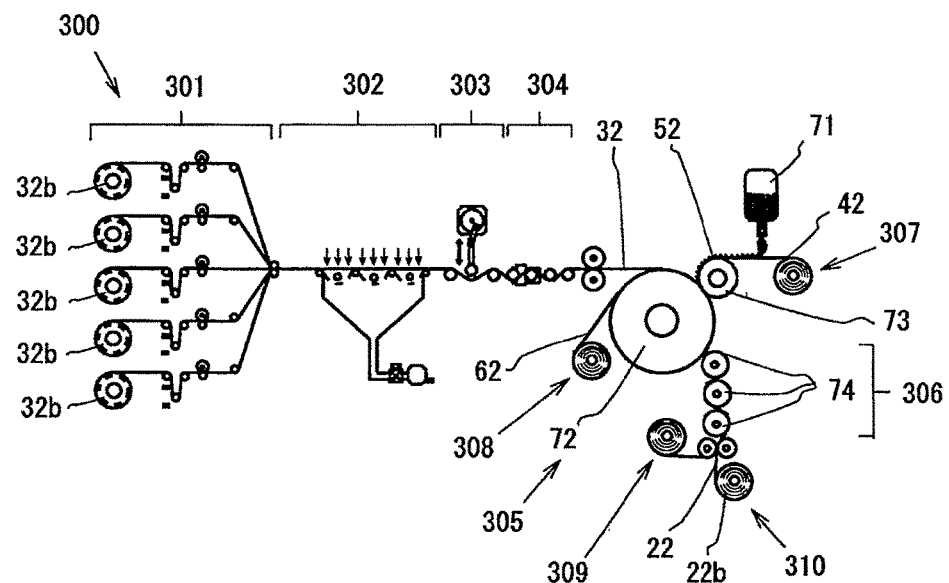
FIG. 12 is an explanatory diagram related to a method for producing another thermoplastic-resin-reinforced sheet material.
Figure 13:
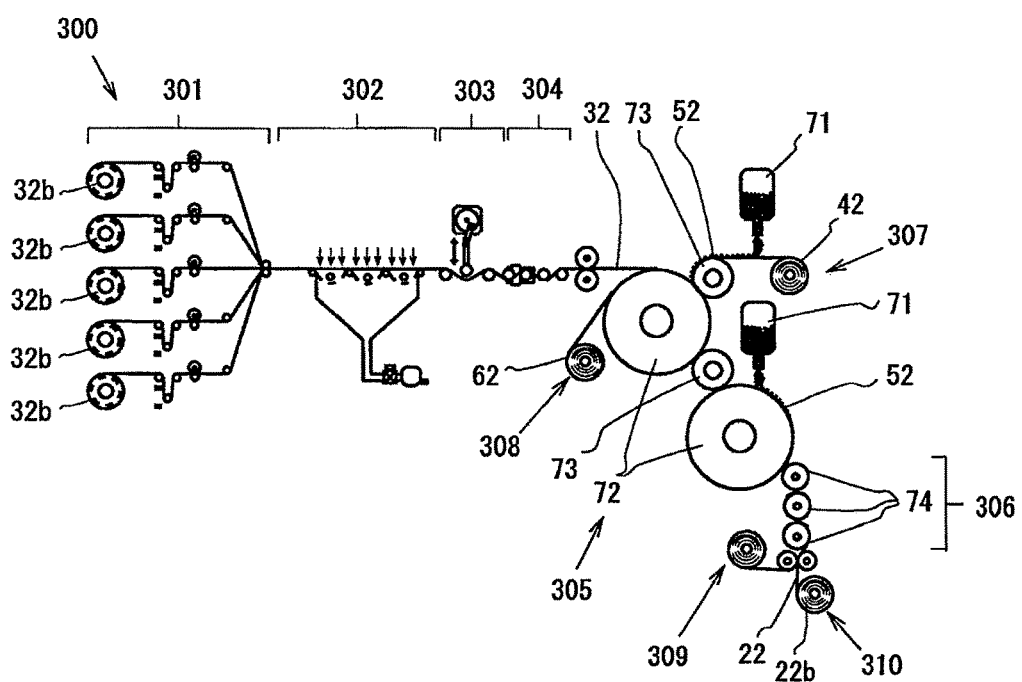
FIG. 13 is an explanatory diagram related to a method for producing another thermoplastic-resin-reinforced sheet material.
Figure 14:
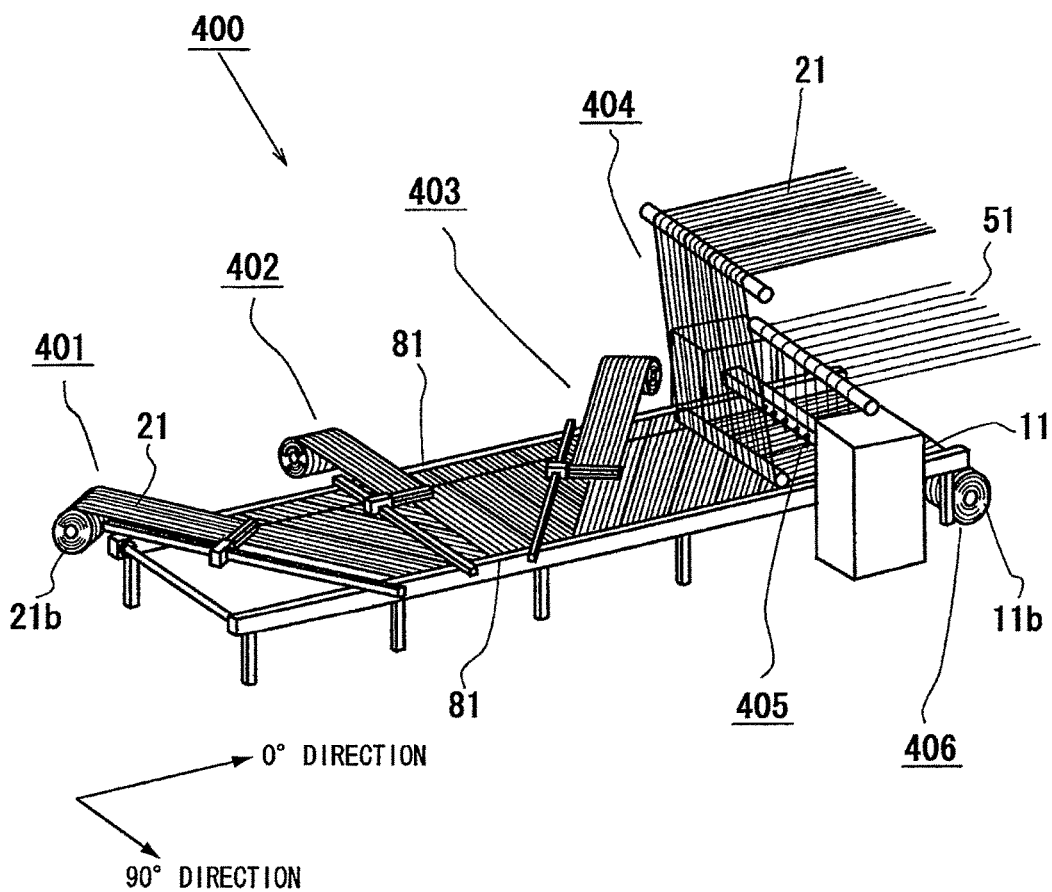
FIG. 14 is an explanatory diagram related to a method for producing a multilayer thermoplastic-resin-reinforced sheet material using a thermoplastic-resin-reinforced sheet material.
Figure 15:
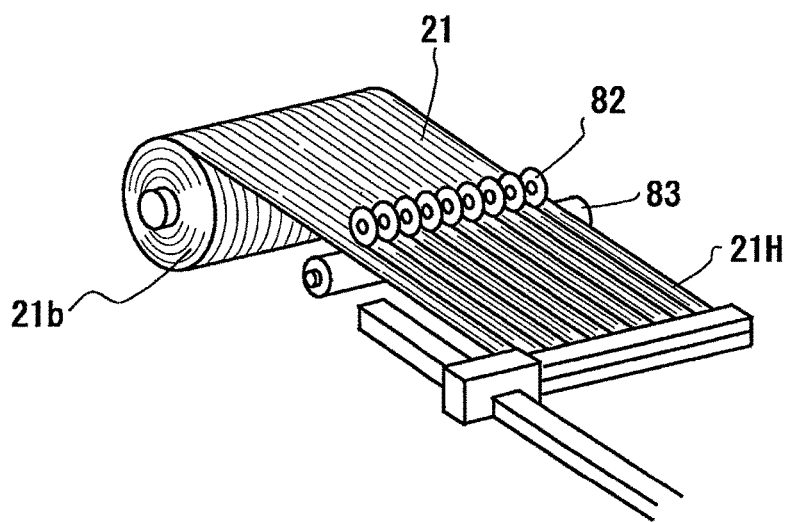
FIG. 15 is an explanatory diagram related to a method for producing a plurality of narrow thermoplastic-resin-reinforced sheet materials from a wide thermoplastic-resin-reinforced sheet material.
Figure 16:
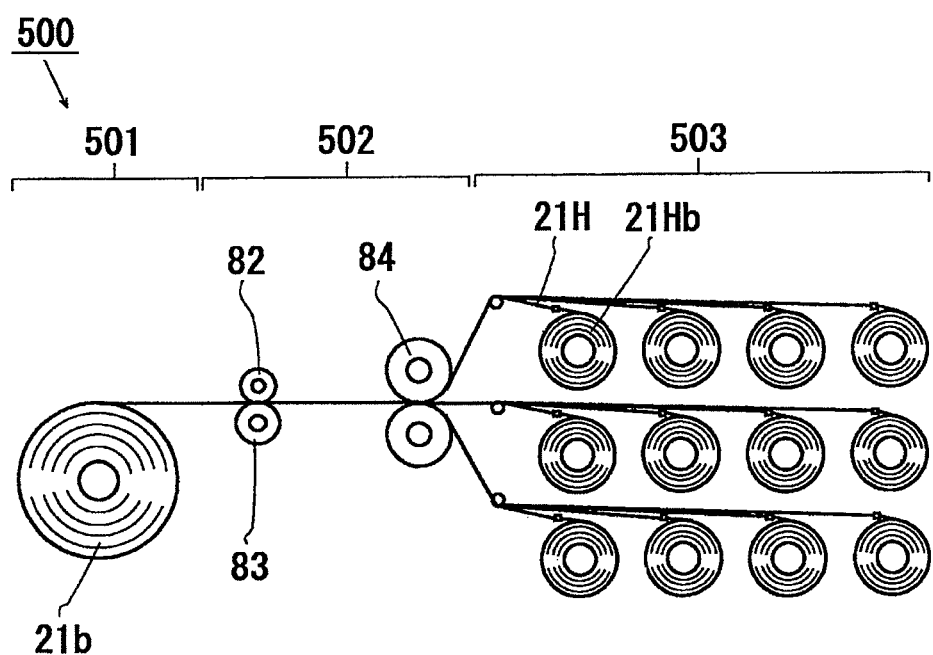
FIG. 16 is an explanatory diagram related to a method for producing a plurality of narrow thermoplastic-resin-reinforced sheet materials from a wide thermoplastic-resin-reinforced sheet material and winding them on bobbins.
Figure 17:
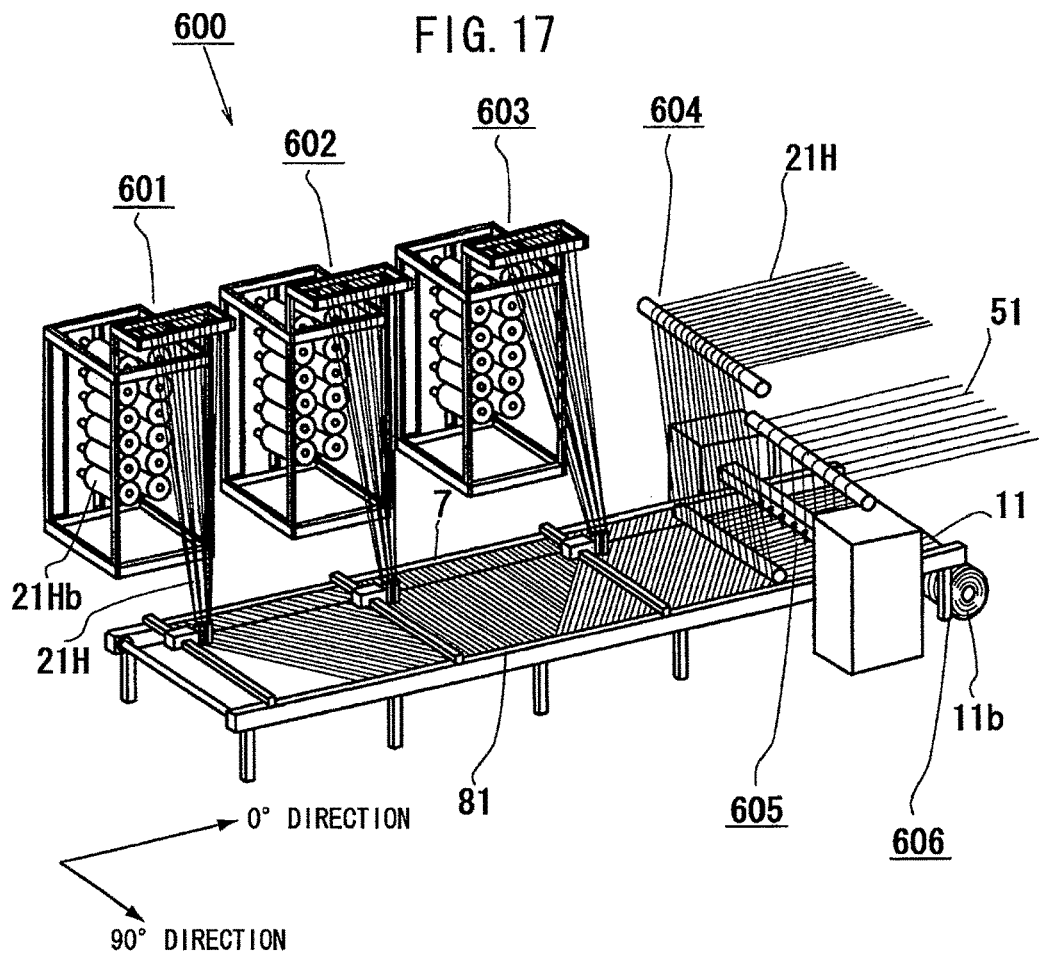
FIG. 17 is an explanatory diagram related to a method for producing a multilayer thermoplastic-resin-reinforced sheet material from narrow thermoplastic-resin-reinforced sheet materials.
Figure 18:
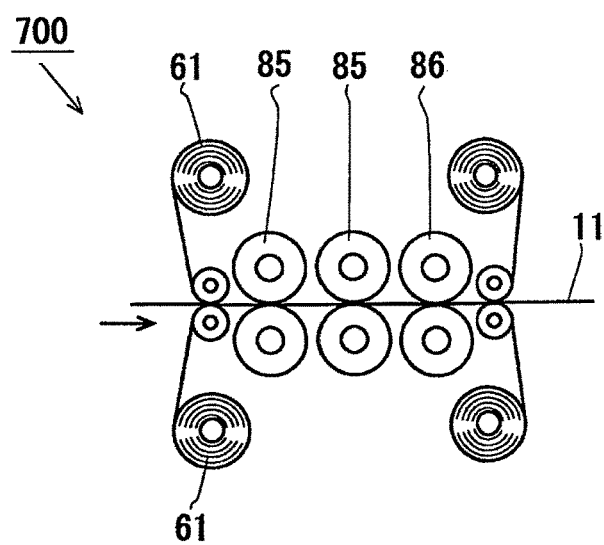
FIG. 18 is an explanatory diagram related to a production method in which a plurality of stacked thermoplastic-resin-reinforced sheet materials are subjected to heat and pressure to be bonded together.
Figure 19A:
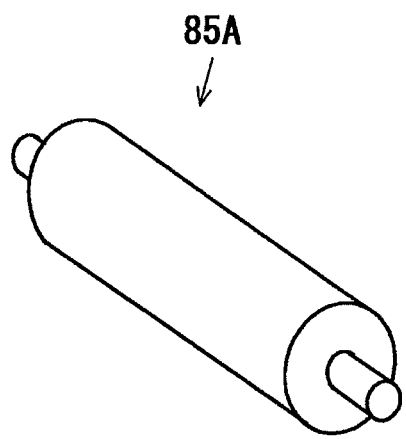
FIG. 19 is an explanatory diagram related to surface shapes of a heating roll.
Figure 19B:
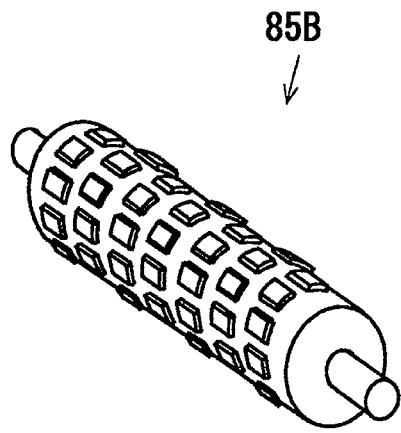
Figure 20:
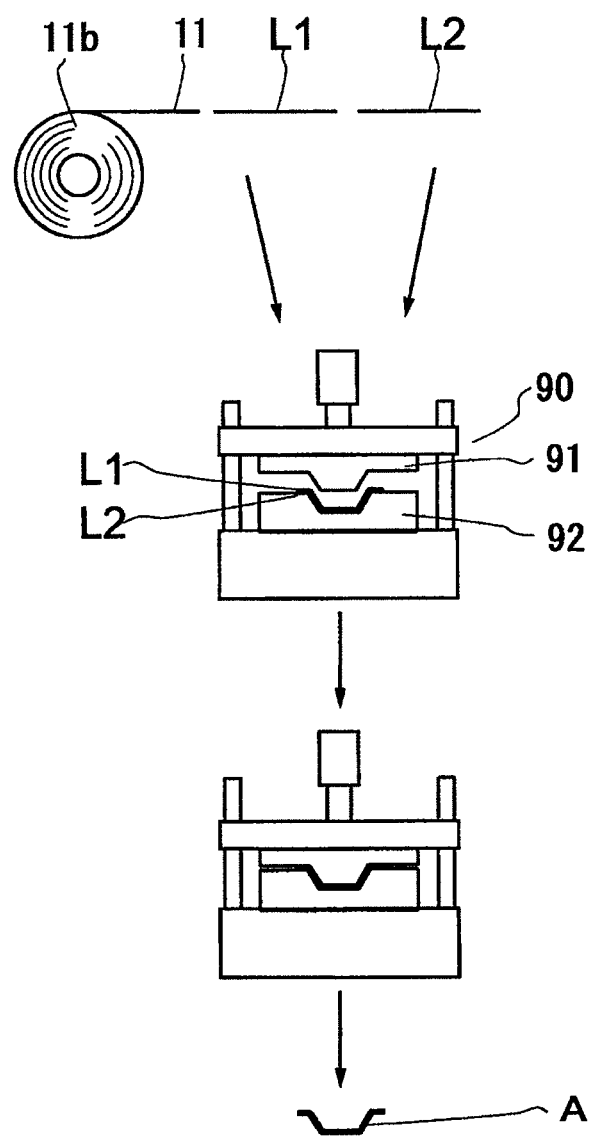
FIG. 20 is an explanatory diagram related to a method for producing thermoplastic-resin multilayer reinforced molding.
Figure 21:
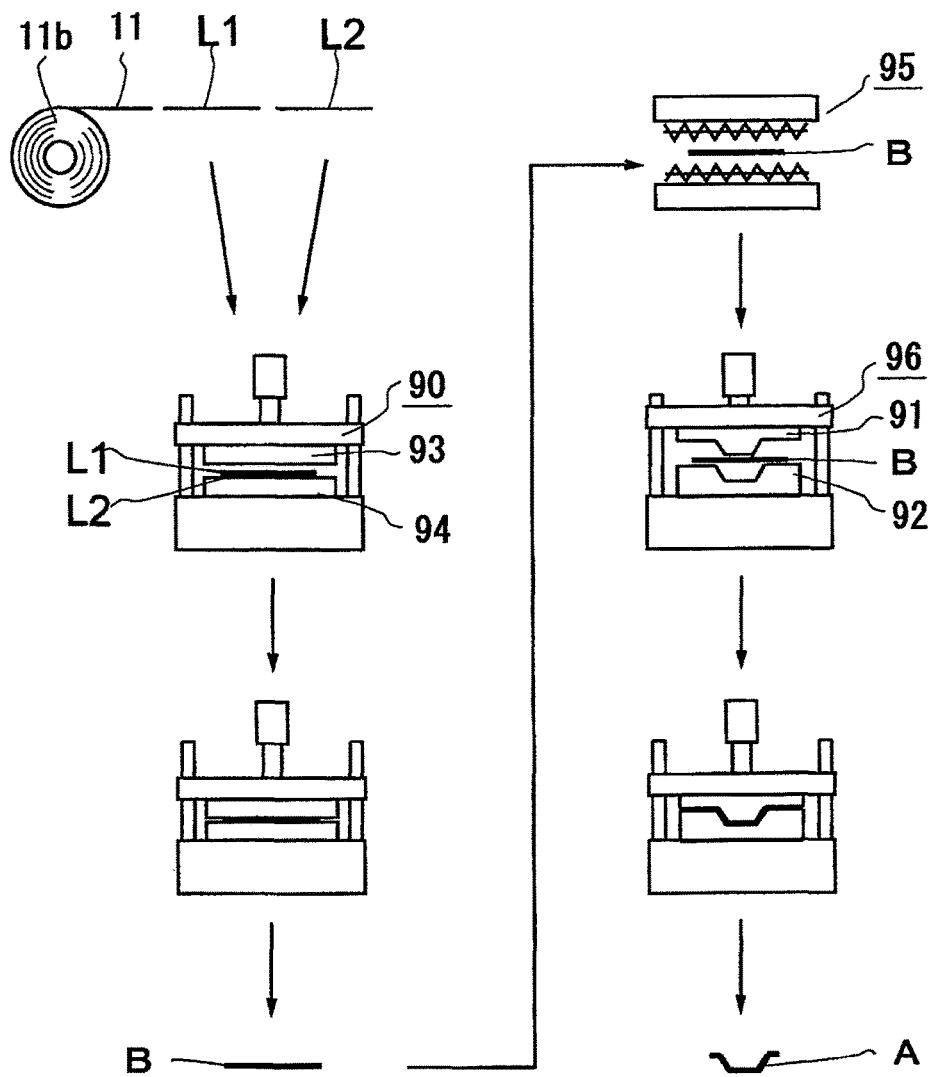
FIG. 21 is an explanatory diagram related to another method for producing a thermoplastic-resin multilayer reinforced molding.
Figure 22:
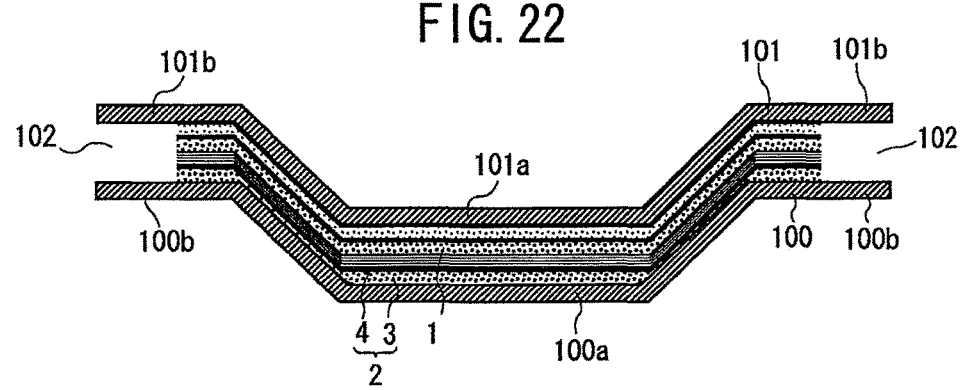
FIG. 22 is a schematic cross-sectional view showing a state in which a molding material is set in shaping molds.
Figure 23A:
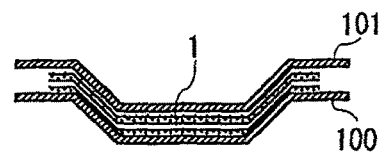
FIG. 23 is a process explanatory diagram related to an embodiment of the present invention.
Figure 23B:
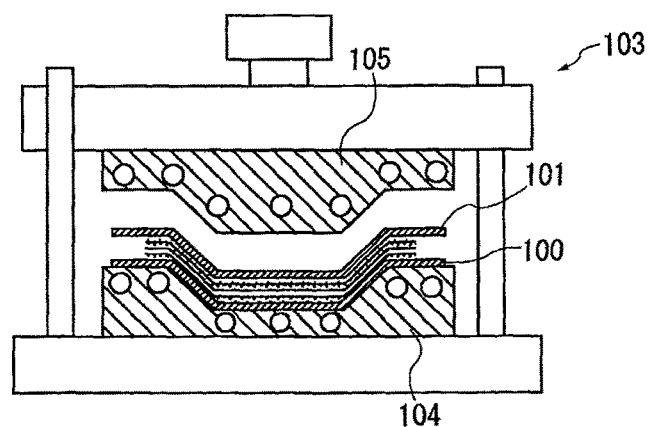
Figure 23C:
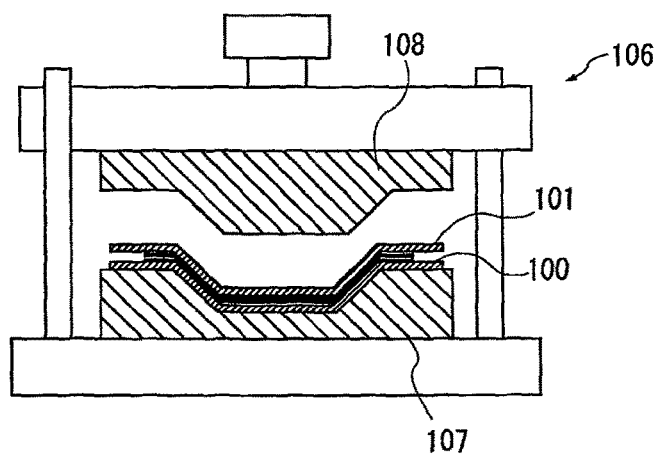
Figure 23D:
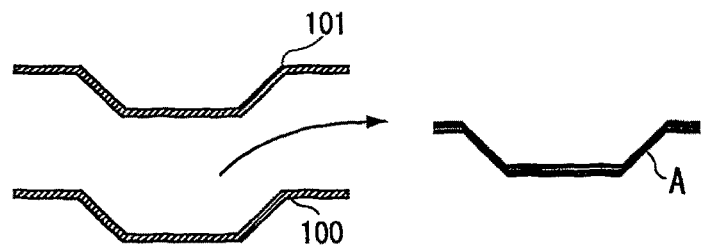
Figure 24A:
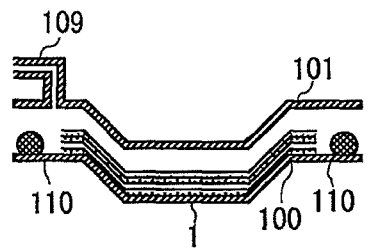
FIG. 24 is a process explanatory diagram related to another embodiment of the present invention.
Figure 24B:
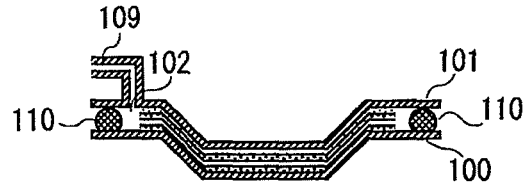
Figure 24C:
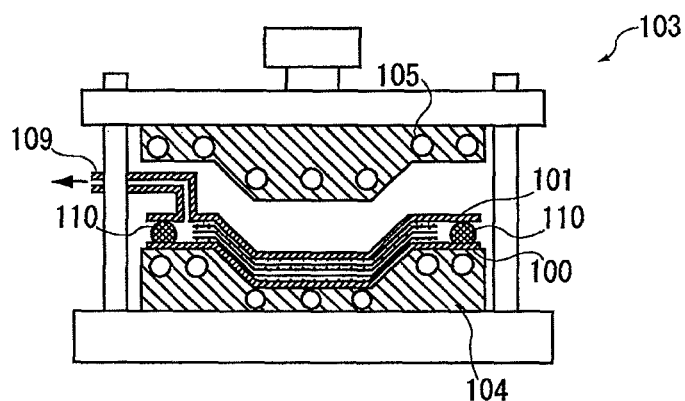
Figure 24D:
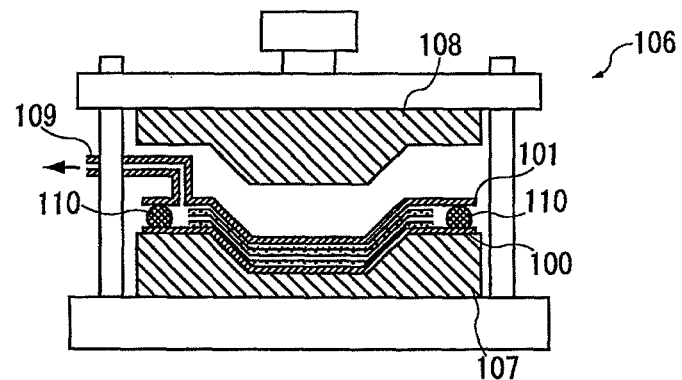
Figure 24E:
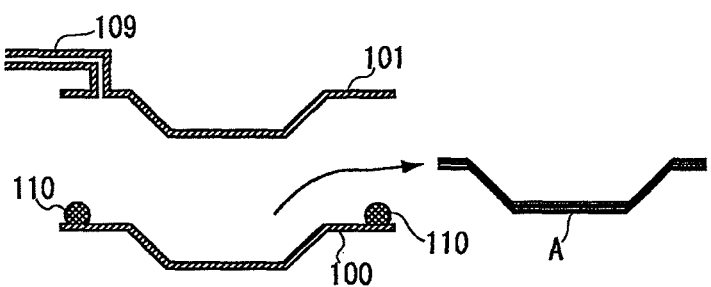
Figure 25A:
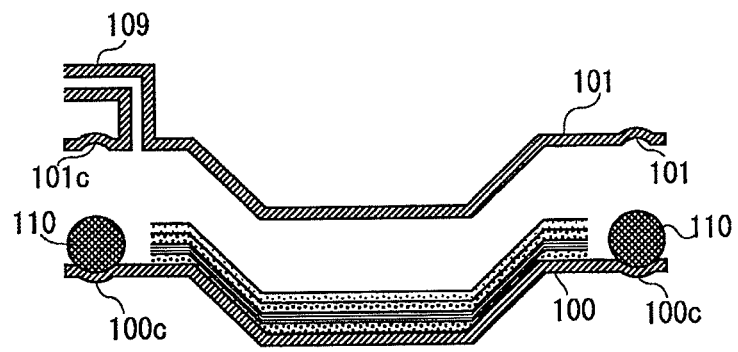
FIG. 25 is a cross-sectional view showing a modification related to attachment of a seal member in FIG. 23.
Figure 25B:
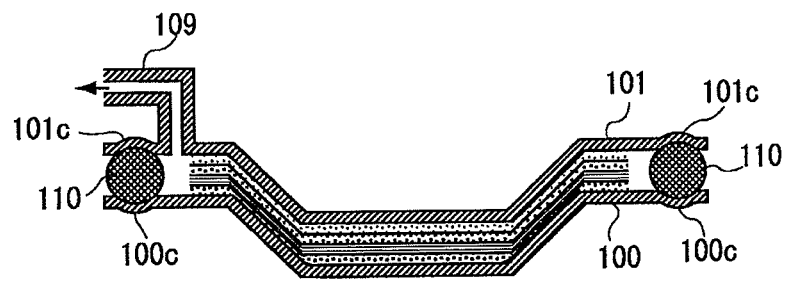
Figure 26A:
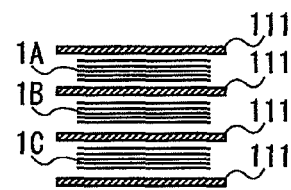
FIG. 26 is a process explanatory diagram related to yet another embodiment of the present invention.
Figure 26B:
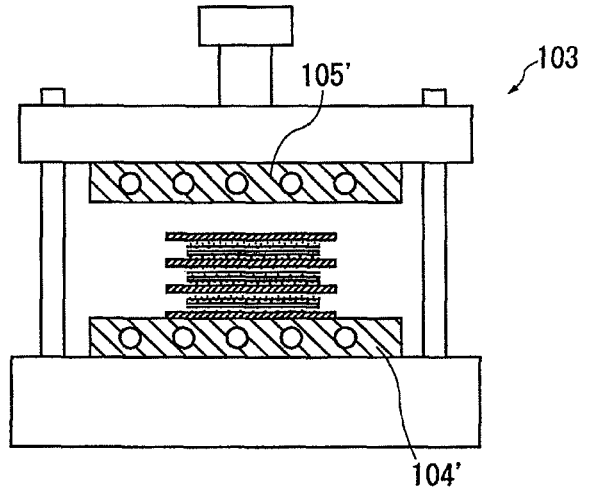
Figure 26C:
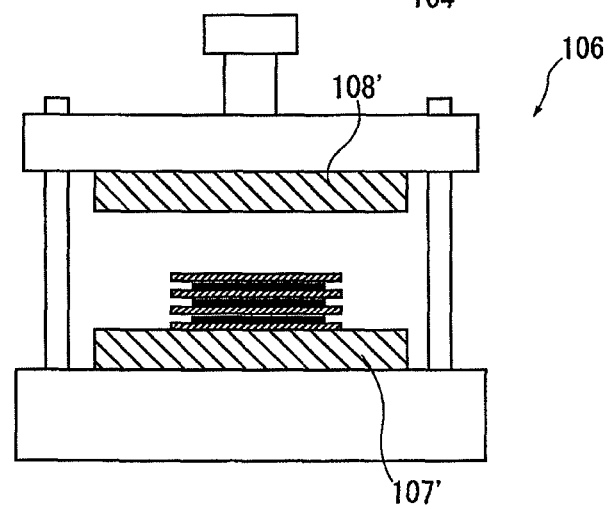
Figure 26D:
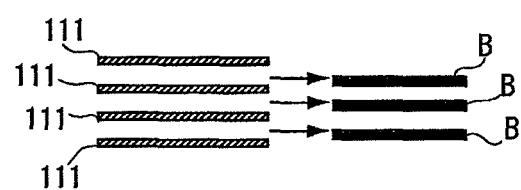

A: thermoplastic-resin multilayer reinforced molding
B: preformed laminate
S1, S2: multi-filament spread thread
11, 12: multilayer thermoplastic-resin-reinforced sheet material
21, 22: thermoplastic-resin-reinforced sheet material
31, 32: reinforcing-fiber sheet material
41, 42: thermoplastic-resin sheet material
51: integration thermoplastic-resin fiber tow
52: bonding thermoplastic-resin material
61, 62: release film
90: hot press molding apparatus
91: shaping upper metal mold
92: shaping lower metal mold
93: flat upper metal mold
94: flat lower metal mold
96: heating unit
100, 101, 111: shaping mold
102: gas-discharging space
103: hot press
106: cold press
109: tube
110: seal member
200, 300: thermoplastic-resin-reinforced sheet material producing apparatus 400: sheet-type multilayer thermoplastic-resin-reinforced sheet material producing apparatus
500: narrow thermoplastic-resin-reinforced sheet material producing apparatus
600: narrow-sheet-type multilayer thermoplastic-resin-reinforced sheet material producing apparatus
700: heat-integration mechanism

The invention claimed is:

1. A thermoplastic-resin-reinforced sheet material formed by joining a reinforcing-fiber sheet material, including a plurality of reinforcing fibers arranged in a predetermined direction, to both surfaces of a thermoplastic-resin sheet, wherein a material of the thermoplastic-resin sheet serves as matrix, only a surface layer portion of the reinforcing-fiber sheet material being impregnated with the material of the thermoplastic-resin sheet,
    wherein the cross-sectional thickness of the reinforcing-fiber sheet material is set greater than two times the diameter of each reinforcing fiber and set within ten times the diameter of each reinforcing fiber,
    wherein the thermoplastic-resin sheet is bonded to the entirety or several portions of one surface of the reinforcing-fiber sheet material by thermal adhesion,
    wherein the reinforcing-fiber sheet material is formed from multi-filament formed by continuously spreading, in a width direction, a reinforcing fiber tow including a plurality of filament-type reinforcing fibers bundled together, and
    wherein the reinforcing-fiber sheet material is formed of a plurality of reinforcing fiber tows, each including a plurality of reinforcing fibers bundled together with a sizing agent so as not to be unraveled, arranged in a sheet-like structure.

2. A thermoplastic-resin-reinforced sheet material formed of a plurality of narrow, having a width in a range of 1 mm-20 mm, thermoplastic-resin-reinforced sheet materials arranged in a width direction, the plurality of narrow, having a width in a range of 1 mm-20 mm, thermoplastic-resin-reinforced sheet materials each formed by joining a narrow, having a width in a range of 1 mm-20 mm, reinforcing-fiber sheet material, including a plurality of reinforcing fibers arranged in a predetermined direction, to both surfaces of a narrow, having a width in a range of 1 mm-20 mm, thermoplastic-resin sheet, wherein a material of the thermoplastic-resin sheet serves as matrix, only a surface layer portion of the reinforcing-fiber sheet material being impregnated with the material of the thermoplastic-resin sheet,
    wherein the cross-sectional thickness of each reinforcing-fiber sheet material is set greater than two times the diameter of each reinforcing fiber and set within ten times the diameter of each reinforcing fiber,
    wherein the thermoplastic-resin sheet material is bonded to the entirety or several portions of one surface of the reinforcing-fiber sheet material by thermal adhesion,
    wherein the reinforcing-fiber sheet material is formed from multi-filament formed by continuously spreading, in a width direction, a reinforcing fiber tow including a plurality of filament-type reinforcing fibers bundled together, and
    wherein the reinforcing-fiber sheet material is formed of a plurality of reinforcing fiber tows, each including a plurality of reinforcing fibers bundled together with a sizing agent so as not to be unraveled, arranged in a sheet-like structure.

3. A thermoplastic-resin-reinforced sheet material formed by weaving a narrow, having a width in a range of 1 mm-20 mm, thermoplastic-resin-reinforced sheet material formed by joining a narrow, having a width in a range of 1 mm-20 mm, reinforcing-fiber sheet material, including a plurality of reinforcing fibers arranged in a predetermined direction, to both surfaces of a narrow, having a width in a range of 1 mm-20 mm, thermoplastic-resin sheet, wherein a material of the thermoplastic-resin sheet serves as matrix, only a surface layer portion of the reinforcing-fiber sheet material being impregnated with the material of the thermoplastic-resin sheet,
    wherein the cross-sectional thickness of the reinforcing-fiber sheet material is set greater than two times the diameter of each reinforcing fiber and set within ten times the diameter of each reinforcing fiber,
    wherein the thermoplastic-resin sheet material is bonded to the entirety or several portions of one surface of the reinforcing-fiber sheet material by thermal adhesion,
    wherein the reinforcing-fiber sheet material is formed from multi-filament formed by continuously spreading, in a width direction, a reinforcing fiber tow including a plurality of filament-type reinforcing fibers bundled together, and
    wherein the reinforcing-fiber sheet material is formed of a plurality of reinforcing fiber tows, each including a plurality of reinforcing fibers bundled together with a sizing agent so as not to be unraveled, arranged in a sheet-like structure.

4. The thermoplastic-resin-reinforced sheet material of claim 1, wherein the cross-sectional thickness of each reinforcing-fiber sheet material being set greater than two times the diameter of each reinforcing fiber and set within ten times the diameter of each reinforcing fiber is configured to control a distance over which a thermoplastic resin flows between the plurality of reinforcing fibers.

5. The thermoplastic-resin-reinforced sheet material of claim 2, wherein the cross-sectional thickness of each reinforcing-fiber sheet material being set greater than two times the diameter of each reinforcing fiber and set within ten times the diameter of each reinforcing fiber is configured to control a distance over which a thermoplastic resin flows between the plurality of reinforcing fibers.

6. The thermoplastic-resin-reinforced sheet material of claim 3, wherein the cross-sectional thickness of each reinforcing-fiber sheet material being set greater than two times the diameter of each reinforcing fiber and set within ten times the diameter of each reinforcing fiber is configured to control a distance over which a thermoplastic resin flows between the plurality of reinforcing fibers.

* * * * *